United States Patent [19]
Omori et al.

[11] Patent Number: 5,818,399
[45] Date of Patent: Oct. 6, 1998

[54] IMAGE COMMUNICATION APPARATUS

[75] Inventors: Shigeru Omori; Tomohiko Hattori; Kunimasa Katayama; Sadayuki Sakuma; Haruhiko Kamijo, all of Nakai-machi, Japan

[73] Assignee: Terumo Kabushiki Kaisha, Tokyo, Japan

[21] Appl. No.: 385,541

[22] Filed: Feb. 8, 1995

[30] Foreign Application Priority Data

Feb. 9, 1994 [JP] Japan .................................. 6-015580

[51] Int. Cl.⁶ ........................................................ G09G 5/00
[52] U.S. Cl. ............................... 345/8; 348/51; 359/464; 359/462; 359/466
[58] Field of Search .............................. 345/7, 8; 348/42, 348/46–53; 359/462, 464, 466

[56] References Cited

U.S. PATENT DOCUMENTS

| | | |
|---|---|---|
| 3,128,339 | 4/1964 | Wupper . |
| 4,385,316 | 5/1983 | Yanagisawa . |
| 4,535,354 | 8/1985 | Rickert . |
| 4,641,178 | 2/1987 | Street . |
| 4,647,966 | 3/1987 | Phillips et al. . |
| 4,649,425 | 3/1987 | Pund . |
| 4,717,949 | 1/1988 | Eichenlaub . |
| 4,829,365 | 5/1989 | Eichenlaub . |
| 4,870,600 | 9/1989 | Hiraoka . |
| 4,890,902 | 1/1990 | Doane et al. . |
| 4,922,336 | 5/1990 | Morton . |

(List continued on next page.)

FOREIGN PATENT DOCUMENTS

| | | |
|---|---|---|
| 0505998 A3 | 9/1992 | European Pat. Off. . |
| 0 576 106A1 | 12/1993 | European Pat. Off. . |
| 0 595 023A1 | 5/1994 | European Pat. Off. . |
| 0 602 934 | 6/1994 | European Pat. Off. . |
| 0 602 934 A2 | 6/1994 | European Pat. Off. . |
| 0601308 A1 | 6/1994 | European Pat. Off. . |
| 41 02 895C1 | 1/1992 | Germany . |
| 93 00 765 | 5/1993 | Germany . |
| 63-127777 | 5/1988 | Japan . |
| 63 194497 | 8/1988 | Japan . |
| 63-194497 | 11/1988 | Japan . |
| 5-22722 | 1/1993 | Japan . |
| 2 111 798 | 7/1983 | United Kingdom . |
| 2206763 | 1/1989 | United Kingdom . |
| WO 93/02169 | 6/1983 | WIPO . |
| WO 93/19394 | 10/1993 | WIPO . |

OTHER PUBLICATIONS

Abstract: Alfred Schwartz, 1985 International Display Research Conference; "Head Tracking Stereoscopic Display"; CH2239–2/85/0000–0141 1985 IEEE.

K. Yamamoto, et al., "Automatic Viewing Range Tracing Method For Communication Equipment", IEEE Transactions on Consumer Electronics, Aug. 1991, No. 3, vol. 37, pp. 424–431.

J.R. Moore, et al., "The Implementation of a Multi–view Autostereoscopic Display", Image Technology Journal of the BKSTS, Jan./Feb. 1993, No. 1.

K.E. Jachimowicz, et al., "Stereoscopic (3–D) projection display using polarized color multiplexing," Optical Engineering, vol. 29, Aug. 1990.

*Primary Examiner*—Amare Mengistu
*Attorney, Agent, or Firm*—Burns, Doane, Swecker & Mathis, LLP

[57] ABSTRACT

A stereoscopic image communication apparatus displays a screen image for right eye and a screen image for left eye on LCD 105, outputs images of the viewer obtained by cameras 103 to the receiving side, and displays images corresponding to the right half face and the left half face of the viewer based on the viewer's images on LCD 107. The images displayed on the LCD 107 are used as figures for selectively introducing lights from the screen images on the LCD 105, by lens 106, to the right and left eyes of the viewer. This enables stereoscopic vision without glasses for separating images respectively for the viewer's right and left eyes, and allows the viewer to move from the initial position.

29 Claims, 47 Drawing Sheets

U.S. PATENT DOCUMENTS

| | | |
|---|---|---|
| 4,987,487 | 1/1991 | Ichinose et al. . |
| 5,008,658 | 4/1991 | Russay et al. . |
| 5,032,912 | 7/1991 | Sakariassen . |
| 5,059,957 | 10/1991 | Todoriki et al. . |
| 5,132,839 | 7/1992 | Travis . |
| 5,162,785 | 11/1992 | Fagard . |
| 5,311,220 | 5/1994 | Eichenlaub . |
| 5,312,839 | 5/1994 | Nakada . |
| 5,315,377 | 5/1994 | Isono et al. . |
| 5,365,370 | 11/1994 | Hudgins . |
| 5,408,264 | 4/1995 | Kurata et al. . |
| 5,421,589 | 6/1995 | Monroe . |
| 5,430,474 | 7/1995 | Hines . |
| 5,430,809 | 7/1995 | Tomitaka . |
| 5,457,574 | 10/1995 | Eichenlaub . |
| 5,459,605 | 10/1995 | Kempf . |
| 5,494,483 | 2/1996 | Adair . |
| 5,499,303 | 3/1996 | Hundt et al. . |
| 5,568,314 | 10/1996 | Omori et al. . |

FIG. 12
FIG. 13
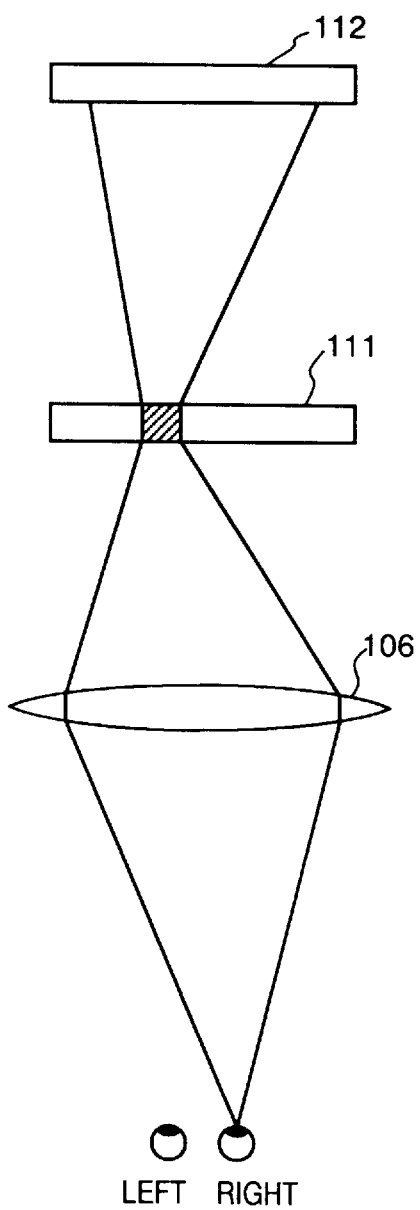
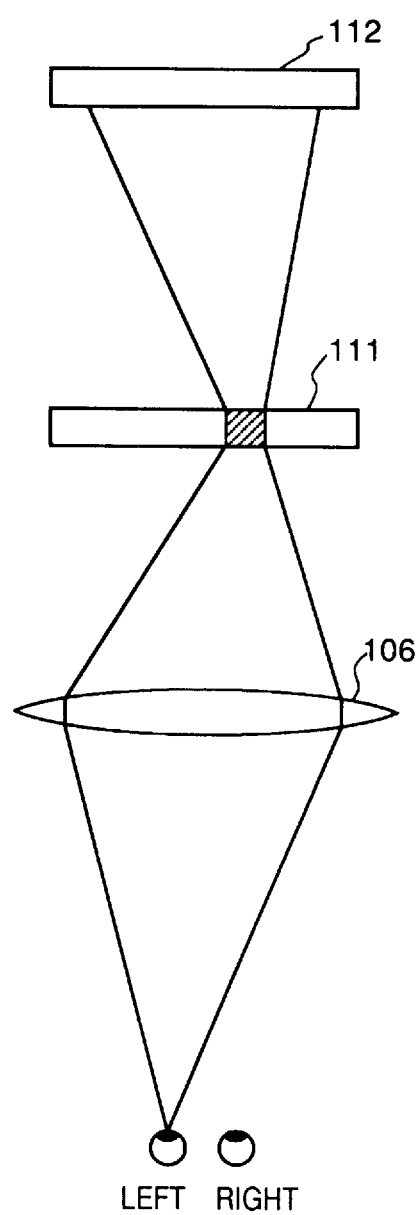

FOR RIGHT EYE

FOR LEFT EYE

F I G. 25
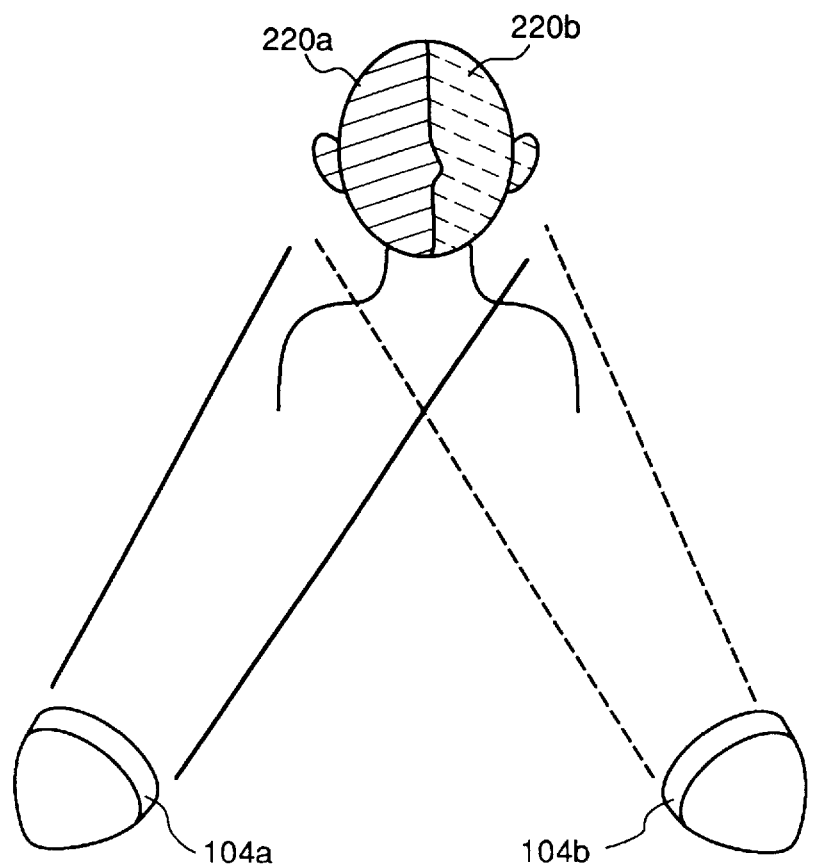

F I G. 41
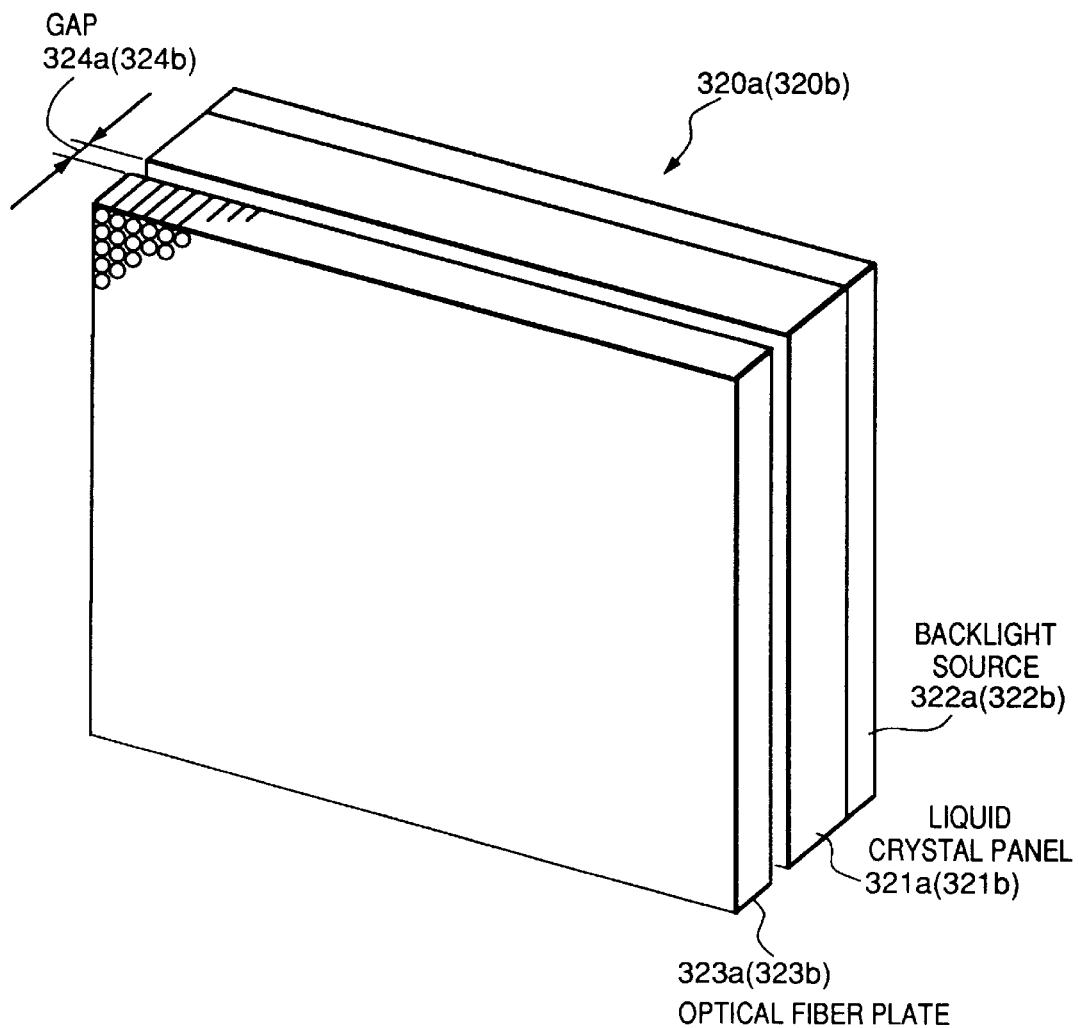

F I G. 50
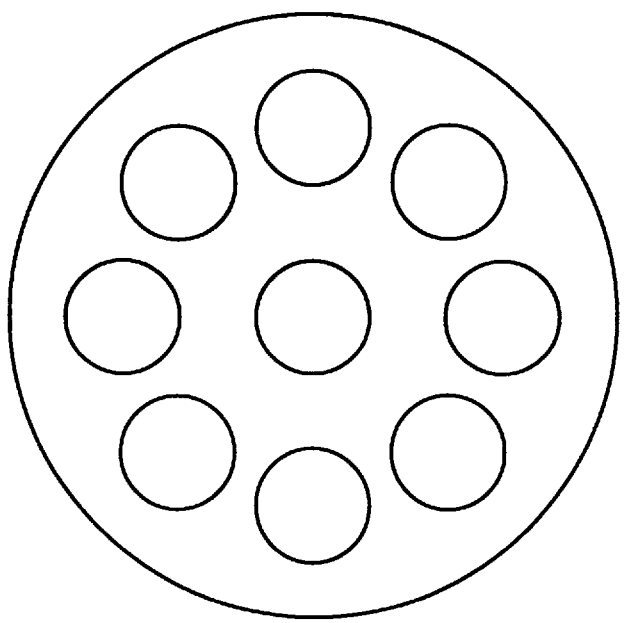
F I G. 51
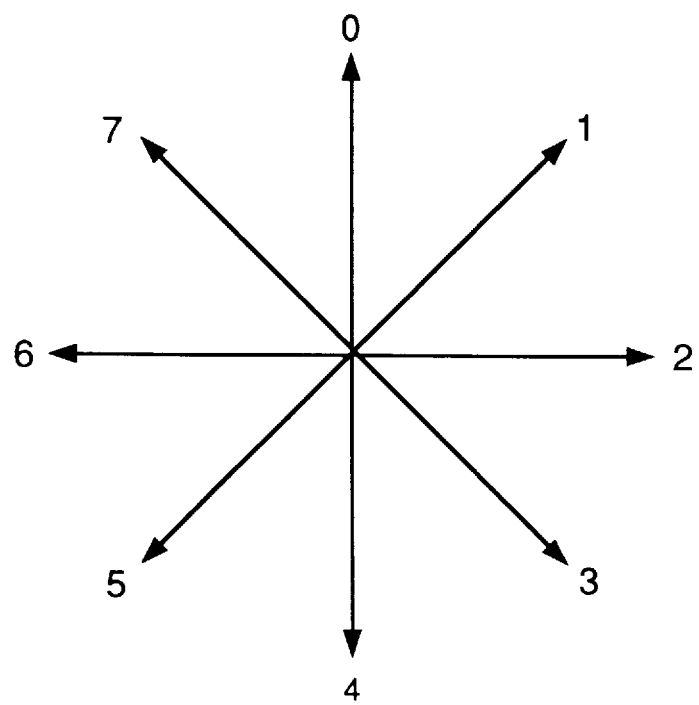

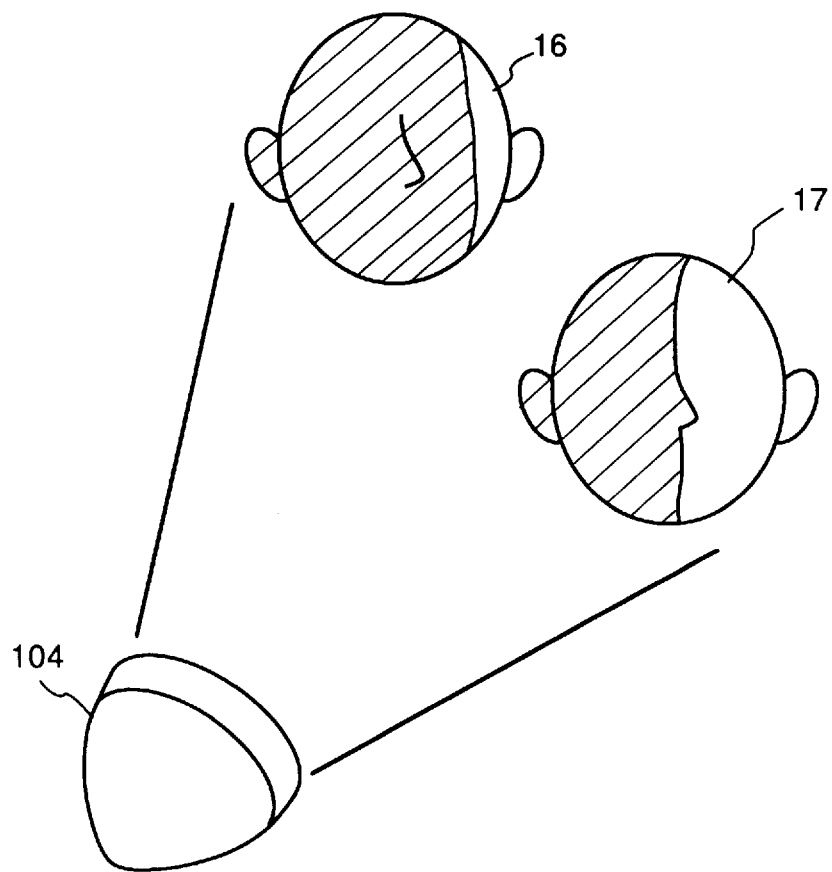
F I G. 53

F I G. 54
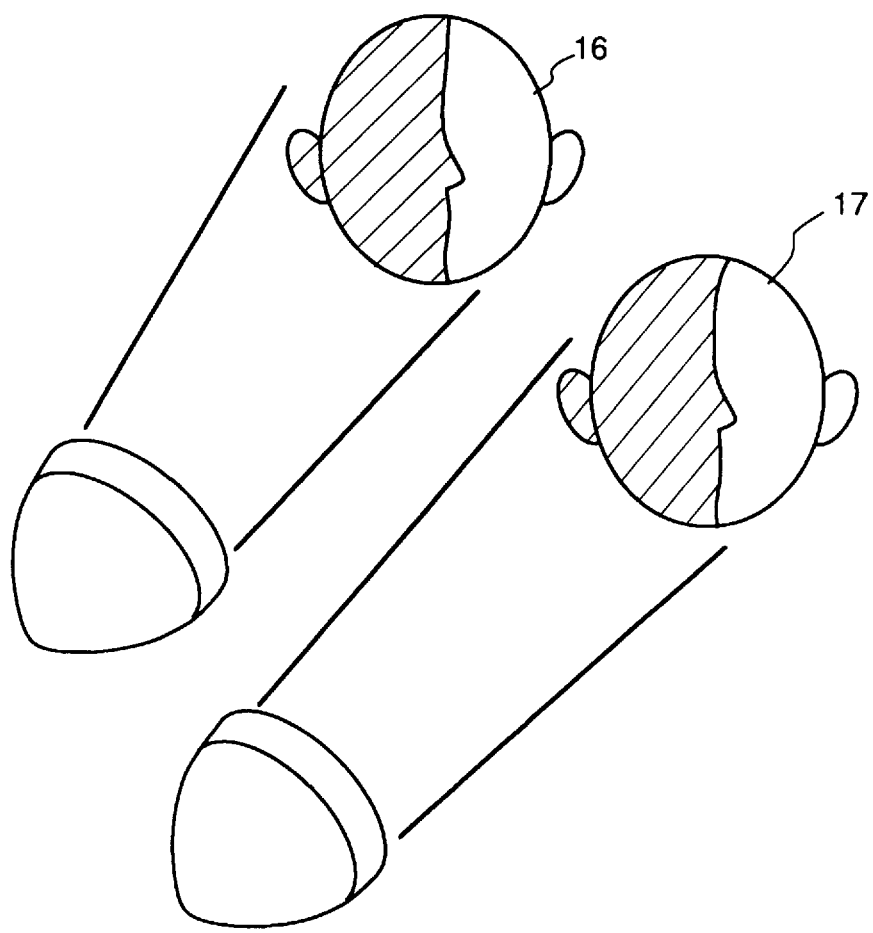

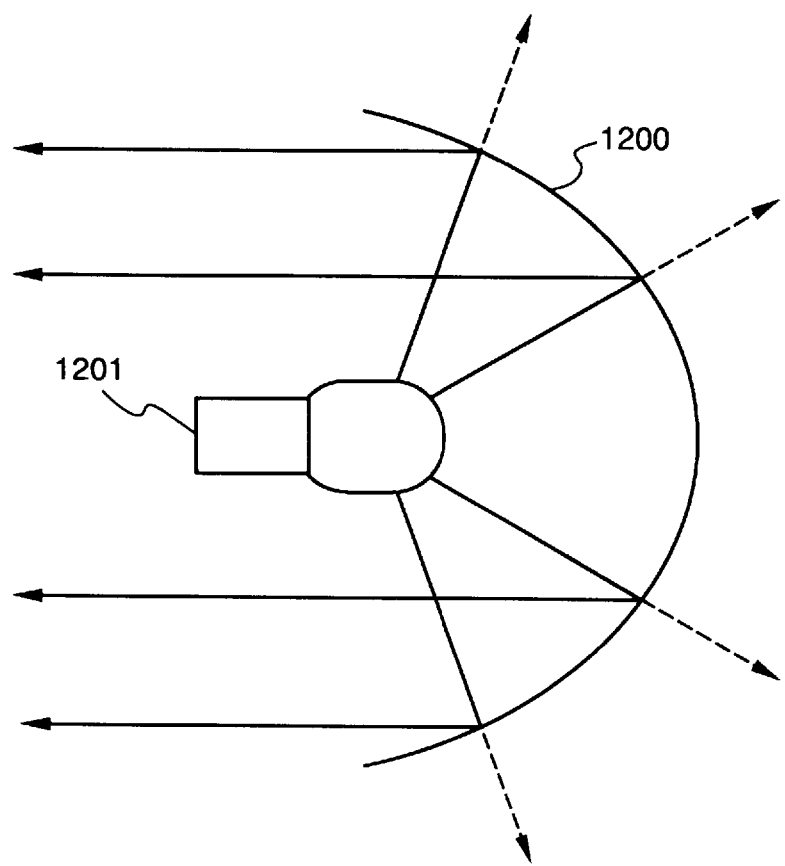
F I G. 55

IMAGE COMMUNICATION APPARATUS

BACKGROUND OF THE INVENTION

Present invention relates to an image communication apparatus which displays an image and transmits the image to an external device and, more particularly to a display device which displays and transmits a stereoscopic image used for industrial and household purposes. Especially, the image display device according to the present invention can be effectively applied to a visual telephone.

In a conventional stereoscopic display system, a viewer wears glasses for separating right and left images from each other, whereby right and left eyes of the viewer can selectively see right and left images respectively, which are displayed on an image field in a time-division fashion. In another conventional technique, a lenticular plate is attached to an image field so that the lenticular plate can separate right and left images from each other and thus right and left eyes of the viewer can selectively see right and left images, respectively.

FIG. 1 illustrates an example of the configuration of the above-described conventional stereoscopic-image display system, which includes glasses 60 capable of separating right and left images from each other, liquid crystal shutters 61a and 61b, a synchronous circuit 62, and color CRT 63 serving as an image display device.

The above first example of a stereoscopic-image display system having such a configuration operates as follows. The color CRT 63 displays stereoscopic images wherein images for right and left eyes are displayed alternately in a time-division fashion. Under the control of the synchronous circuit 62, the liquid crystal shutter 61a of the glasses 60 is opened and thus become transparent only when images for the right eye are displayed, and the liquid crystal shutter 61b is opened and become transparent only when images for the left eye are displayed. As a result, a viewer wearing the glasses 60 can observe images for the right eye with his or her right eye, and images for the left eye with the left eye. In this way, stereoscopic vision is provided.

FIG. 2 illustrates the configuration of the second example of a conventional stereoscopic-image display system, which includes a lenticular plate 71 having a large number of cylindrical lenses touching each other in parallel and a color CRT 72 serving as an image display device.

This second example of stereoscopic-image display system having such a configuration operates as follows. The color CRT 72 simultaneously displays both images for right and left eyes such that images for right and left eyes having radius-width of each cylindrical lens (slit-shaped) are displayed alternately on arbitrary positions in each cylindrical lens of the lenticular plate 71. The right eye of a viewer sees only the images for the right eye displayed on the above-described slit-shaped zones through each cylindrical lens of the lenticular plate 71, and the left eye sees only the images for the left eye displayed on the slit-shaped zones, whereby stereoscopic vision is obtained.

In the first example of the conventional stereoscopic-image display system, however, a viewer has to wear troublesome and uncomfortable glasses which separately provide images to right and left eyes of the viewer. Another problem in observing stereoscopic images using this technique is flicker due to the switching between the images for right and left eyes.

In the second example of the conventional stereoscopic-image display system, since a stripe-shaped stereoscopic image is observed via cylindrical lenses, stereoscopic vision can be obtained only when a viewer is in a limited narrow area. If the viewer moves, degradation occurs in the image. Besides, many viewers at various positions can not observe an image at the same time. Furthermore, image processing is necessary to provide a stripe-shaped image, thus requiring an expensive apparatus.

SUMMARY OF THE INVENTION

The present invention has been made in consideration of the above situation, and has as its object to provide an image communication apparatus which produces, e.g., a stereoscopic vision without glasses having a function for separating right and left images, and which enables the stereoscopy without depending upon the position of the viewer.

The aforementioned objects of the present invention is attained by an image communication apparatus having the following construction. That is, an image communication apparatus which shows a viewer a first image and a second image different from the first image, while transmitting a picked-up image of the viewer to outside, the apparatus having:

at least one image display means for displaying at least one of the first and second images; and light guide means for selectively distributing the first and second images to the right eye and the left eye of the viewer, the image display means comprising:

image sensing means for image-sensing the viewer to obtain the viewer's image;

transmission means for transmitting the image of the viewer obtained by the image sensing means to the outside so that the viewer's image can be used at the outside of the apparatus; and generation means for generating at least one figure indicative of a position of one of the right eye and a position of the left eye of the viewer, based on the viewer's image obtained by the image sensing means, wherein the light guide means selectively separates from the first and second images based on the figure generated by the generation means, and guides the separated images to the right and left eyes of the viewer.

When the image communication apparatus having the above construction is used on the transmitting side, the apparatus separately introduces the first and second images to the right and left eyes of the viewer based on the viewer's image obtained by the image sensing means. The viewer's image is transmitted to the apparatus on the receiving side and used for, e.g., reproducing the transmitting-side viewer's image on the receiving side.

According to a preferred aspect of the present invention, the apparatus further comprising input means for inputting the first and second images from the outside of the apparatus to the image display means.

According to another preferred aspect of the present invention, in the transmission means transmits the viewer's image in the form of a television signal, and wherein the input means inputs the first and second images in the form of a television signal from the outside of the apparatus.

According to another preferred aspect of the present invention, the figure is an image of the viewer's face.

According to another preferred aspect of the present invention, the figure has a predetermined shape generated from the image of the viewer's face.

According to another preferred aspect of the present invention, the light guide means comprises:

a display unit for displaying the figure generated by the generation means on a display surface thereof and emitting light only at a portion of the display surface where the figure is displayed; and an optical device having directivity for introducing light from the figure displayed on the display unit into the right eye or the left eye of the viewer.

According to another preferred aspect of the present invention, the display unit has a backlight source for irradiating the display surface from the rear of the display surface.

According to another preferred aspect of the present invention, the image display means has one display surface for displaying the first and second images in a time-divisional manner, the image sensing means obtains an image corresponding to the right half face of the viewer and an image corresponding to the left half face of the viewer, and the generation means generates a figure for the viewer's right eye and a figure for the viewer's left eye based on one of the image corresponding to the viewer's right half face and the image corresponding to the viewer's left half face, and the display unit displays the figure for the viewer's right eye and the figure for the viewer's left eye in time-divisional manner, in synchronization with display of the first and second images by the image display means.

According to another preferred aspect of the present invention, the image display means has one display surface for displaying the first and second images in a time-divisional manner, the image sensing means obtains an image corresponding to the right half face of the viewer and an image corresponding to the left half face of the viewer, the generation means generates a figure for the viewer's right eye and a figure for the viewer's left eye based on the image corresponding to the viewer's right half face and the image corresponding to the viewer's left half face respectively, and the display unit displays the figure for the viewer's right eye and the figure for the viewer's left eye in time-divisional manner, in synchronization with display of the first and second images by the image display means.

According to another preferred aspect of the present invention, the apparatus further comprising combining means for combining two images by bringing two optical paths of the images into one optical path, wherein the image display means has a first display device and a second display device for displaying the first and second images respectively, the generation means generates a first figure indicative of a position of the viewer's right eye and a second figure indicative of a position of the viewer's left eye based on the viewer's image obtained by the image sensing means, the display unit has a third display device and a fourth display device for displaying the first and second figures respectively, and the combining means brings first light, from a light-emitting area of the first figure on the third display device, that passes through a portion where the first image is displayed on the first display device, and second light, from a light-emitting area of the second figure on the fourth display device, that passes through a portion where the second image is displayed on the second display device, into one optical path.

According to another preferred aspect of the present invention, the light guide means comprises:

a space modulating device for displaying the figure generated by the generation means as an image transmission area; and an optical device having directivity for introducing light from the image transmission area on the space modulating device into one of the viewer's right eye or the viewer's left eye.

According to another preferred aspect of the present invention, the image display means has one display surface for displaying the first and second images in a time-divisional manner, the image sensing means obtains an image corresponding to the right half face or the left half face of the viewer, the generation means generates a figure for the viewer's right eye and a figure for the viewer's left eye based on the obtained image corresponding to the viewer's right half face or the viewer's left half face, and wherein the space modulating device displays the figure for the viewer's right eye and the figure for the viewer's left eye in time-divisional manner, in synchronization with display of the first and second images by the image display means.

According to another preferred aspect of the present invention, the image display means has one display surface for displaying the first and second images in a time-divisional manner, the image sensing means obtains an image corresponding to the right half face of the viewer and an image corresponding to the left half face of the viewer, the generation means generates a figure for the viewer's right eye and a figure for the viewer's left eye based on the image corresponding to the viewer's right half face and the image corresponding to the viewer's left half face, and the space modulating device displays the figure for the viewer's right eye and the figure for the viewer's left eye in time-divisional manner, in synchronization with display of the first and second images by the image display means.

According to another preferred aspect of the present invention, the apparatus further comprising combining means for combining two images by bringing two optical paths of the images into one optical path, wherein the image display means has a first display device and a second display device for displaying the first and second images simultaneously, the generation means generates a first figure indicative of a position of the viewer's right eye and a second figure indicative of a position of the viewer's left eye based on the viewer's image obtained by the image sensing means, the space modulating device has a third display device and a fourth display device for displaying the first and second figures as image transmission areas, and the combining means brings first light, from the first image on the first display device, that passes through the first figure as an image transmission area on the third display device, and second light, from the second image on the second display device, that passes through the second figure as an image transmission area on the fourth display device, into one optical path.

According to another preferred aspect of the present invention, the image display means has a first display device for displaying the first image and emitting first polarized light and a second display device for displaying the second image and emitting second polarized light different from the first polarized light, and wherein the space modulating device has a first image transmission area for passing only the first polarized light and a second image transmission area for passing only the second polarized light.

According to another preferred aspect of the present invention, the space modulating device include:

a light-transmitting type display device for displaying an image; and a polarizing plate, provided on one surface of the display device, the polarizing plate having polarizing direction parallel to one of the polarized direction of the first polarized light and the polarized direction of the second polarized light.

According to another preferred aspect of the present invention, the display device is a light-transmitting type monochromatic liquid crystal display device, and when a voltage is applied to the display device, the display device passes one of the first and second polarized lights, while when no voltage is applied to the display device, the display device passes one of the first and second polarized lights, different from the polarized light passed when the voltage is applied to the display device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 12 and 13 respectively show an example of a light path in the stereoscopic image communication apparatus of the third embodiment;

FIG. 25 is an explanatory view showing the operation of the stereoscopic image communication apparatus of the eighth embodiment;

FIG. 41 is a perspective view showing the detailed construction of a light-emitting display device in the thirteenth embodiment;

FIG. 50 shows a construction example of light-point tracking sensors in the fifteenth embodiment;

FIG. 51 illustrates light point moving directions in the fifteenth embodiment;

FIG. 53 is an explanatory views showing irradiation of plural users' faces by a LED light for irradiating a right half face;

FIG. 54 is an explanatory views showing irradiation of plural users' faces according to a sixteenth embodiment of the present invention; and FIG. 55 shows the construction of an irradiation device of the sixteenth embodiment.

DETAILED DESCRIPTION OF THE PREFERRED EMBODIMENT(S)

Preferred embodiments of the present invention will be described in detail in accordance with the accompanying drawings.

<First Embodiment>

Figure 1:
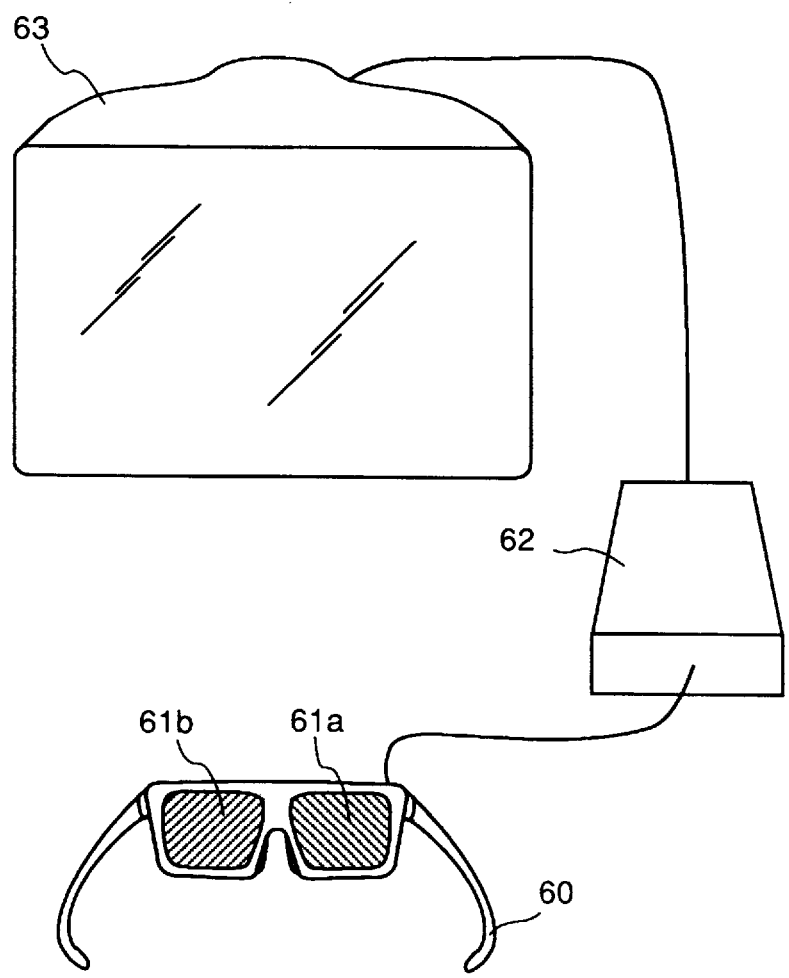
FIG. 1 illustrates a stereoscopic image display device as the first example of conventional art.
Figure 2:
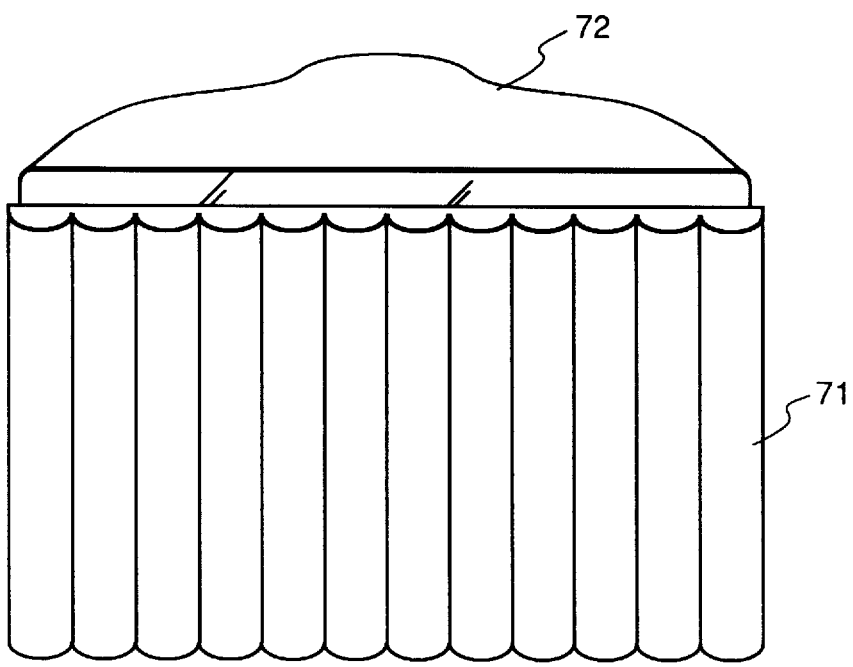
FIG. 2 illustrates a stereoscopic image display device as the second example of conventional art.
Figure 3:
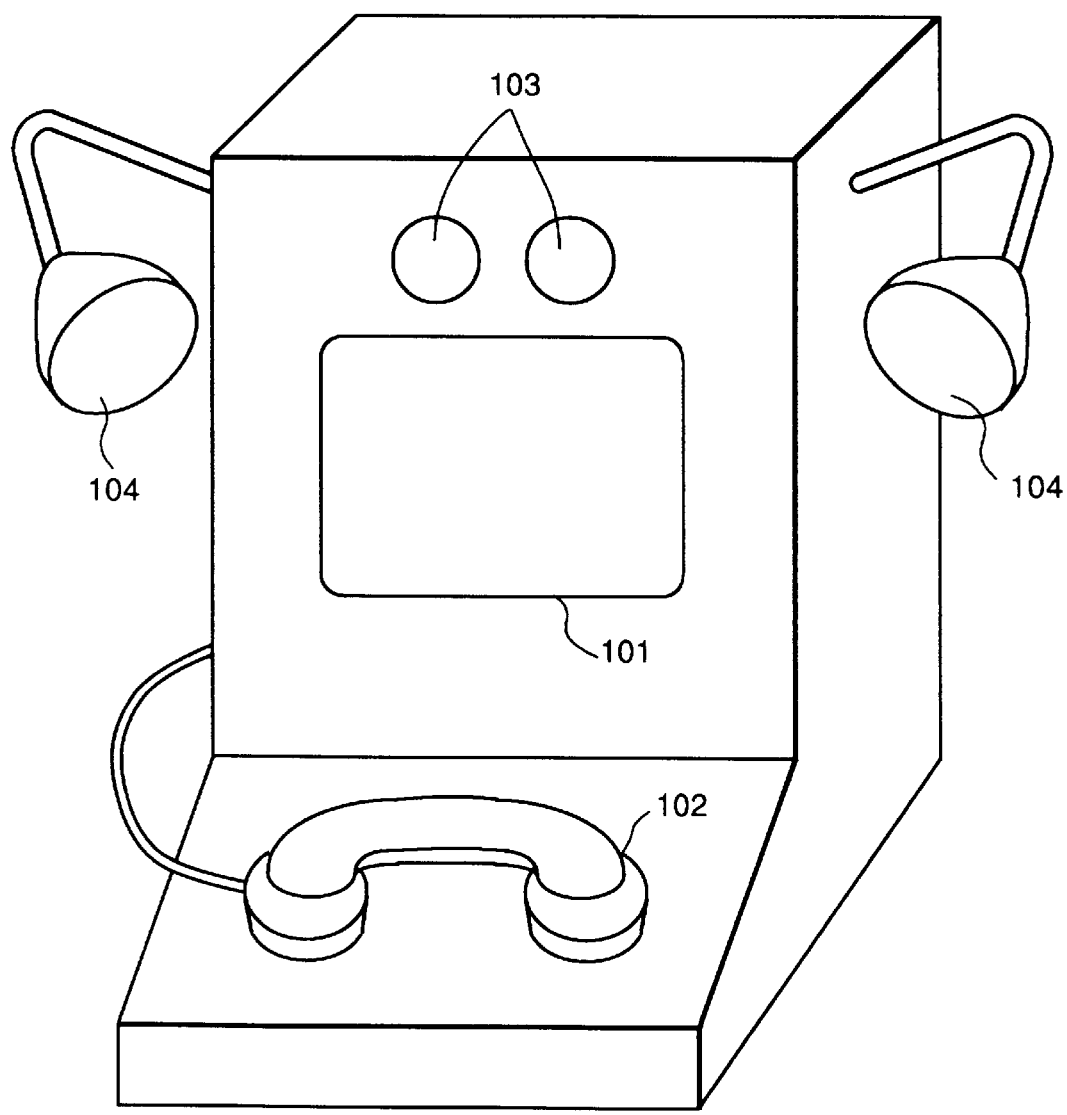
FIG. 3 is an overview of a stereoscopic image communication apparatus according to a first embodiment of the present invention.

FIG. 3 shows the overview of a stereoscopic image communication apparatus according to a first embodiment of the present invention, where an image display apparatus of the present invention applied to a visual telephone which perform communication with displaying stereoscopic images. The apparatus according to the first embodiment comprises a plurality of displays. The displays are set "normally" unless otherwise specified. It is meant by "normally" that a luster scan starts at an upper left point of the display screen of the "normally" set display when it is set upright. If a display is set with the screen surface placed horizontally, a luster scan starts at an upper left point (from the view point of viewer) of the screen surface of the "normally" set display. In the figures, arrows "→" and indicators "ⓢ" are used to describe another method of setting the displays, which will be described later.

In FIG. 3, reference numeral 101 denotes a display screen which displays a stereoscopic image of, e.g., the face of a speaker on the communication destination side (hereinafter, referred to as a "receiving-side speaker" or "receiving-side viewer"); 102, a handset used for communication; 103, a pair of CCD cameras for image sensing the speaker of this visual telephone (hereinafter referred to as "transmitting-side speaker" or simply "viewer"); and 104, an LED light for irradiating the transmitting-side speaker. The CCD cameras 103 are set at predetermined convergence angles so that a stereoscopic image of the face of the transmitting-side speaker is obtained by an angular parallax.

In the present specification, an objective image which are seen by the right or left eye of viewer for stereoscopic vision are referred to as "screen image". Therefore, "screen images" are not limited to images which are displayed on a screen, they encompasses images on films.

Figure 4:
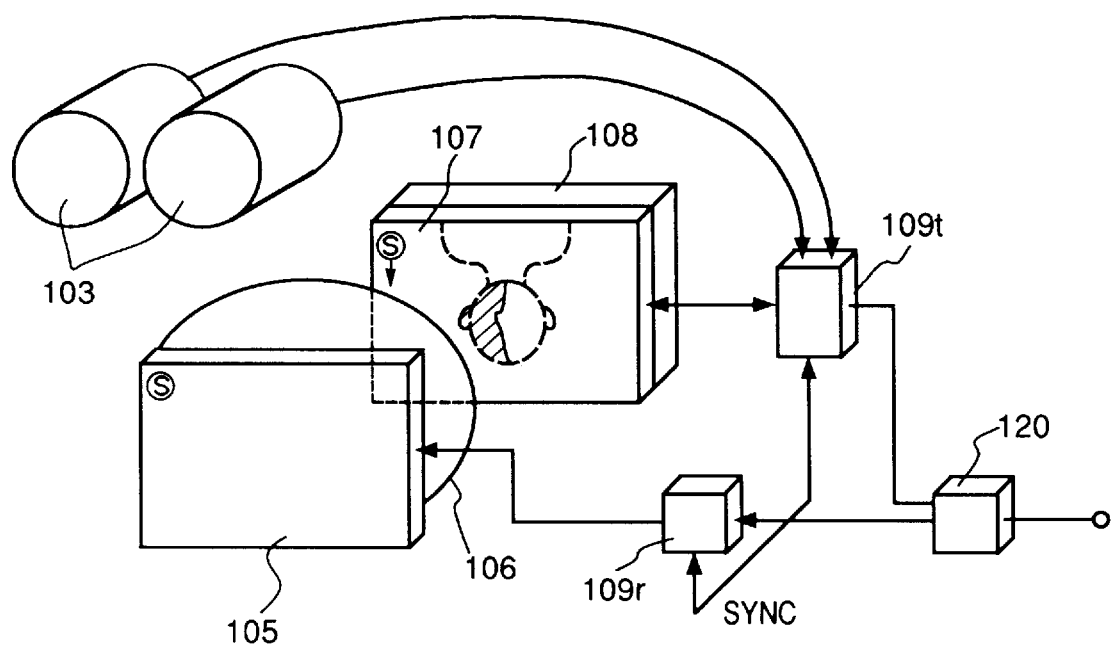
FIG. 4 is a perspective view showing the construction of the stereoscopic image communication apparatus of the first embodiment.

FIG. 4 is a block diagram showing the construction of the visual telephone in FIG. 3. In FIG. 4, numeral 105 denotes a light-transmitting type liquid crystal display (LCD) as a space modulator. The LCD 105 displays screen images for stereoscopic vision. Numeral 106 denotes a Fresnel lens having a 150 mm focal distance, located behind the LCD 105; 107, an LCD for monochromatic display, located at a position 160 mm (longer than the focal distance of the lens 106) distant from the lens 106, opposite to the LCD 105. The monochromatic LCD 107 displays the images of the transmitting-side speaker obtained by the cameras 103 as "backlight control figures" (to be described later). Numeral 108 denotes a backlighting device for irradiating the rear surface of the monochromatic LCD 107.

Numeral 120 denotes an image communication controller function for transmitting images to the visual telephone on the receiving side and receiving images from the receiving side; 109t, an image processor for performing image processing to be described later on the images of the transmitting-side speaker obtained by the cameras 103, outputting the processed images to the LCD 107. Also, the image communication controller 120 outputs the images from the cameras 103 to the image communication controller 120 for transmitting the images to the receiving side.

The image communication controller 120 receives images of the receiving-side speaker from the receiving side visual telephone (not shown), and outputs the received images to an image processor 109r.

The image processor 109t for processing images of the transmitting-side speaker and the image processor 109r for receiving images of the receiving-side speaker via the image communication controller 120 operate in synchronization with each other by a synchronizing signal SYNC.

The operation of the stereoscopic image communication apparatus having the above construction will be described with reference to FIG. 4.

The image communication controller 120 receives images of the face of the transmitting-side speaker obtained by the cameras 103 via the image processor 109r, then adds a synchronizing signal to each image signal for identification of the images for right and left eyes, and then transmits the images to the receiving-side visual telephone via a communication line (not shown).

A couple of screen images for the transmitting-side speaker, i.e., a screen image for right eye (hereinafter referred to as "screen image (R)") and a screen image for left eye (hereinafter referred to as "screen image (L)") are transmitted from the receiving-side visual telephone. Specifically, the two screen images are from the image of the receiving-side speaker obtained by a pair of cameras of the receiving-side visual telephone, and are received together with synchronizing signals which serve respectively as identification of images for right/left eyes, by the image communication controller 120. The image processors 109*t* and 109*r* have a time-division function. More specifically, when the image processor 109*t* displays a "backlight control figure" for left eye (hereinafter referred to as "backlight control figure (L)") on the LCD 107, the image processor 109*r* displays the screen image (L) on the LCD 105 which is the image of the receiving-side speaker, received by the image communication controller 120 from the receiving-side visual. On the other hand, when the image processor 109*t* displays a "backlight control figure" for right eye (hereinafter referred to as "backlight control figure (R)") on the LCD 107, the image processor 109*r* displays the screen image (R) (i.e., the image of the receiving-side speaker) on the LCD 105. As described above, the image processors 109*t* and 109*r* are synchronized with each other by the synchronizing signal SYNC. The image processor 109*r* judges whether a screen image from the receiving-side to be displayed on the LCD 105 is a screen image (L) or screen image (R), in accordance with the synchronizing signal added to the image from the receiving side.

Preferably, the time-divisional display is made by alternatively displaying 10–25 frames per a second. If the number of frames is less than ten, the displayed image has flicker of an unbearable level. If the number of frames is more than twenty-five, the LCD 105 cannot display images at a required speed, which may result in crosstalk of screen images, e.g., a screen image (R) is seen by the left eye.

The images of the viewer obtained by the pair of CCD cameras 103 are outputted as screen images which will be observed by the receiving-side viewer as a stereoscopic vision, and are also used for generating figure images for backlight irradiation (i.e., "backlight control figures") by the image processor 109*t*. The "backlight control figure" is generated as follows. That is, the image processor 109*t* displays the obtained image of the viewer's face on a built-in small-sized LCD (not shown), detects the coordinates of illuminated points on the LCD, and generates figure images respectively corresponding to the right half face and the left half face of the viewer. These figure images are called "backlight control figure" because they allow the LCD 107 to perform function with the backlight 108. When the light 104 irradiates the right half face of the viewer, a generated backlight control figure is the viewer's face in which each pixel of the figure has a value "1" (backlight control figure (R)), while when the light 104 irradiates the left half face of the viewer, the generated backlight control figure is the viewer's face in which each pixel of the figure has a value "1" (backlight control figure (L)). The LCD 107 comprises liquid crystal which passes light at a point where a predetermined voltage is applied. When the value of a pixel in the backlight control figure is "1", the voltage is applied to the corresponding portion of the LCD. Accordingly, the LCD 107 passes light from the backlight device 108 provided behind the LCD 107, at the portions corresponding to the pixels of value "1". Note that the luminance and the contrast of the LCD 107 should be adjusted in advance so that the corresponding half-face area of a backlight control figure is displayed with high luminance.

Figure 5:
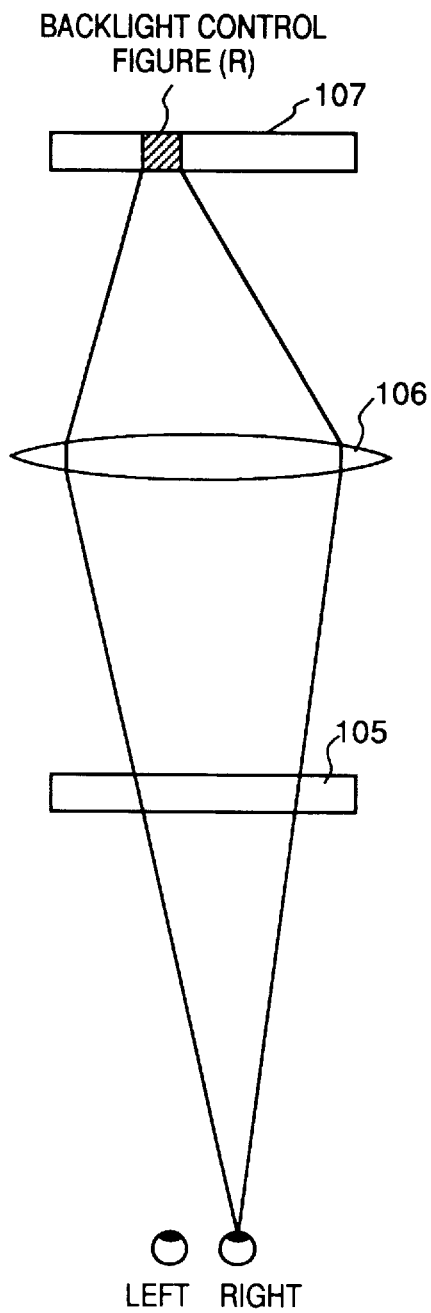
FIGS. 5 and 6 respectively show an example of a light path in the stereoscopic image communication apparatus of the first embodiment.
Figure 6:
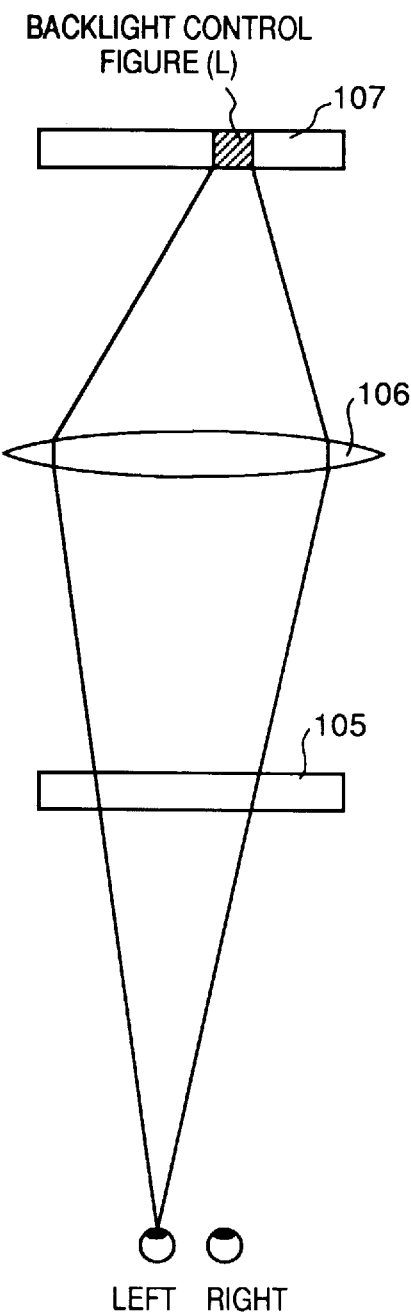

FIG. 5 shows an example of a light path where the screen image (R) is introduced to the viewer's right eye. FIG. 6 shows an example of a light path where the screen image (L) is introduced to the viewer's left eye. As described above, since the present visual telephone uses a time-division displaying method, FIG. 5 shows a light path at a time point (e.g., time T1) where the LCD 107 displays the backlight control figure (R), and the LCD 105 displays the screen image (R). FIG. 6 shows a light path at a time point (e.g., time T2≠T1) where the LCD 107 displays the backlight control figure (L) and the LCD 105 displays the screen image (L). The Fresnel lens 106 gives directivity to transmitting light. Accordingly, as shown in FIG. 5, the backlight control figure (R) functions as a backlight for the viewer's right eye, however, it does not function as a backlight control figure to the viewer's left eye. Similarly, the backlight control figure (L) functions as a backlight for the viewer's left eye, however, does not function as a backlight for the viewer's right eye.

In FIG. 4, the backlight control figure is displayed turned upside down on the LCD 107. The reason for this display is as follows. As described above, the Fresnel lens 106 gives directivity to transmitting light. The viewer may move in a up-and-down direction. If the viewer moves in a downward direction (e.g., if the viewer crouches a little), the LCD 107 must display the backlight control figure at a position shifted in an upward direction. On the other hand, if the viewer moves in the upward direction (e.g., if the viewer stands up a little), the LCD 107 must display the backlight control figure at a position shifted in the downward direction. That is, when the viewer moves in an up-and-down direction, the backlight control figure must be displayed at a position shifted in a direction opposite to the direction of the viewer's movement. To achieve this, the LCD 107 may display the backlight control figure turned upside down. Thus, as the backlight control figure is turned upside down, when the viewer's face is on the light axis of the lens 106, the backlight control figure is displayed at a position on the LCD 107 on the extended light axis; when the viewer moves to a lower position from the light axis of the lens 106, the LCD 107 displays the backlight control figure at an upper position from the light axis; and when the viewer moves to an upper position from the light axis, the LCD 107 displays the backlight control figure at a lower position from the light axis. Thus, turning a backlight control figure upside down allows to follow the movement of the viewer in an up-and-down direction.

Next, the operation of the Fresnel lens 106 will be described. The Fresnel lens 106 is set so that the viewer sees the 180° turned backlight control figure on the LCD 107 as a virtual image. As the distance between the Fresnel lens 106 and the LCD 107 is longer than the focal distance of the lens 106, the right/left-half face areas displayed on the LCD 107 are enlarged within the effective diameter of the lens 106 to the viewer's right/left eyes. As shown in FIGS. 5 and 6, the backlight control figure (R) functions as illumination of a size corresponding to the effective diameter of the Fresnel lens 106 for the viewer's right eye. At this time, the left-half face area does not pass the backlight, the light from the LCD 107 does not enter the viewer's left eye. When the backlight control figure (L) of the viewer is displayed, the left-half face area passes the backlight, as illumination of a size corresponding to the effective diameter of the Fresnel lens 106 for the viewer's left eye. At this time, as the right-half face area does not pass the backlight, the light from the LCD 107 does not enter the viewer's right eye.

In the above-described operation of the present apparatus, the screen image (R) displayed on the display screen 101 in FIG. 3 is backlighted to be visible to the viewer's right eye, and the screen image (L) displayed on the display screen 101 is backlighted to be visible to the viewer's left eye, thus the viewer can have a stereoscopic vision. If the viewer moves, the backlight control figures displayed on the LCD 107 move corresponding to the movement of the viewer, thus the stereoscopic vision is continued.

Note that in the present embodiment, the image processor 109t detects coordinates of illuminated points in the internal small-sized LCD to obtain right and left backlight control figures from the viewer's images from the camera 103, however, the LED light 104 may emit lights having two kinds of wavelengths, and image sensing and display may be selectively controlled with respect to each wavelength.

In the visual telephone of the present embodiment, the liquid crystal passes light at positions having a pixel in a backlight control figure of value "1", however the liquid crystal may pass the light at positions having a pixel in the backlight control figure of value "0". In this case, a backlight control figure (L) is generated for the viewer's right eye, and a backlight control figure (R) is generated for the viewer's left eye, because a human face is nearly symmetrical and there is no problem in generating backlight control figures in this manner.

Displaying arrangement of the screen images on the displays according to the present embodiment will be explained below.

Since the display 105 is positioned before the lens 106, screen images do not go through the lens. Thus, the screen images should be input to the CRT 105 so that the images are displayed on upright.

When the backlight control figure (R) which has been derived from the right half face of the viewer is input to the display 107, the control figure (R) is displayed in a relatively left region of the display 107, as shown in FIG. 5. When the backlight control figure (L) is input to the display 107, the figure (L) is displayed in a relatively right region of the display 107, as shown in FIG. 6. Therefore, the image processor 109t do not have to perform right-to-left inversion of the control figures to output the display 107. It only have to perform upside down inversion of the control figures.

The CRT's and LCD's are an electronic display. They are able to display inverted images the data of which are electronically inverted in longitudinal and right-to-left directions. Such inversions can be made just by rotating the display body by 180 degrees.

Further example as to how to achieve displaying arrangement of screen images and control figures according to the first embodiment will be described below. In FIG. 4, the displays 105, 108 are indicated with a indicator "Ⓢ". The indicators mean a starting point of luster scanning on the respective displays. For example, the display 108 for the control figure starts to luster-scan at the upper right position in a left to right direction. The display 105 for the screen image also luster-scans from the upper right position in a left to right direction. Further, in FIG. 4, arrows mean the direction of inversion of image data. For example, the arrow attached to display 108 means that an electronic data inversion is made in the direction indicated by the arrow, namely in a vertical direction.

According to such indications, when data of screen images are normally inputted to the display 105, they are displayed on the display 105 normally. As the image data of the control figures are inputted into the display 108 with the data inversion only in the vertical direction, the control figure R which is displayed on a relatively left region of the display 108 ensures the R screen image to track the right eye, while the control figure L which is displayed on a relatively right region of the display 108 ensures the L screen image to track the left eye. The control figures R and L which are displayed on the display 107 with turned in the vertical direction ensures the P and L image screens to follow the movement of the viewer in the vertical direction.

<Second Embodiment>

Figure 7:
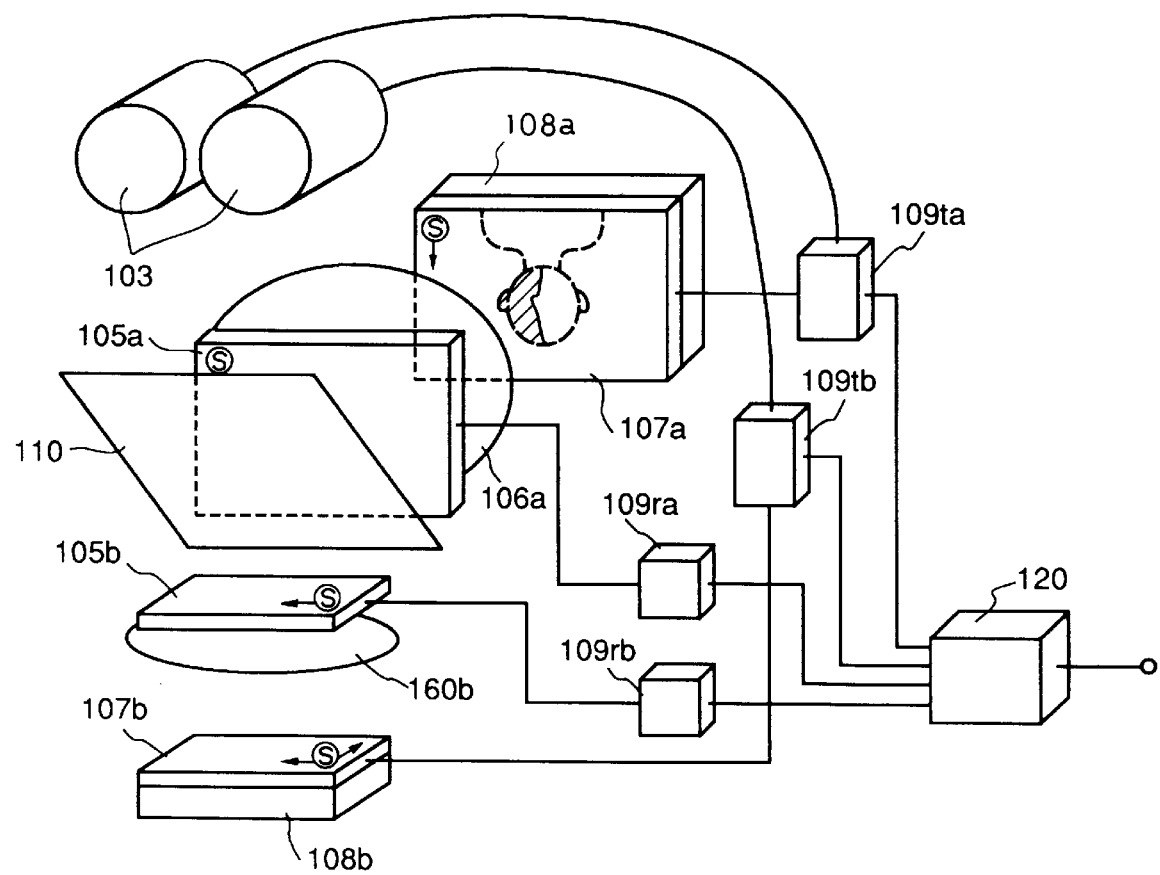
FIG. 7 is perspective view showing the construction of a stereoscopic image communication apparatus according to a second embodiment of the present invention.

FIG. 7 shows the construction of a stereoscopic image communication apparatus according to a second embodiment of the present invention. Note that the outer appearance of the apparatus is the same as that of the first embodiment. In the first embodiment, the time-divisional display method is employed; in the second embodiment, a screen image (L) and a screen image (R) are simultaneously displayed, and the displayed images are combined by a half mirror. Similar to the previous embodiments, in the apparatus according to the present embodiment comprises a plurality of displays. The displays are set "normally" unless otherwise specified.

In FIG. 7, numerals 105a and 105b denote light-transmitting type LCD's as space modulators; 106a and 106b, Fresnel lenses respectively having a 150 mm focal distance, located behind the LCD's 105a and 105b; 107a and 107b, monochromatic LCD's as display devices for backlight control figures having light-passing function, located at positions 160 mm (longer than the focal distance of the lenses 106a and 106b) distant from the lenses 106a and 106b, opposite to the LCD's 105a and 105b; 108a and 108b, backlights for the monochromatic LCD's 107a and 107b; 109a and 109b, image processors; and 110, a half mirror for combining images displayed on the LCD's 105a and 105b.

The operation of the stereoscopic image communication apparatus having the above construction is basically the same as that of the apparatus of the first embodiment shown in FIG. 4, therefore, the elements corresponding to those in the first embodiment have the same reference numerals, the explanations of these elements will be omitted, and only the difference from the operation in the first embodiment will be described.

Similar to the first embodiment, the image communication controller 120 transmits the images of the viewer obtained by the cameras 103 via image processors 109ta and 109tb to the receiving-side apparatus as a screen image (R) and a screen image (L). The image processors 109ta and 109tb generate a backlight control figure (R) and a backlight control figure (L) respectively, and display the figures on the LCD's 107a and 107b. The LCD's 105a and 105b receive screen images from the receiving side via the image communication controller 120, image processors 109ra and 109rb, and display the received images. The two images displayed on the LCD's 105a and 105b are combined by the half mirror 110 into one image to be visible to the viewer.

Figure 8:
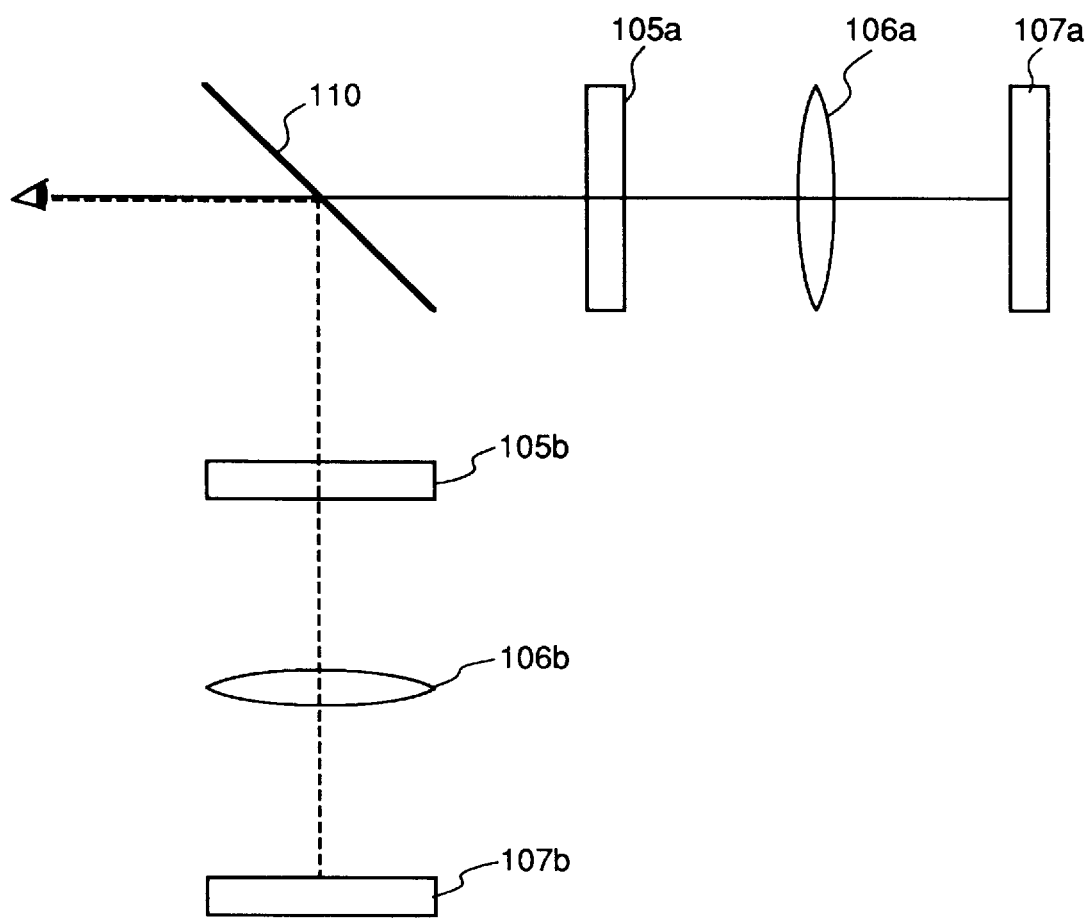
FIGS. 8 to 10 respectively show an example of a light path in the stereoscopic image communication apparatus of the second embodiment.
Figure 9:
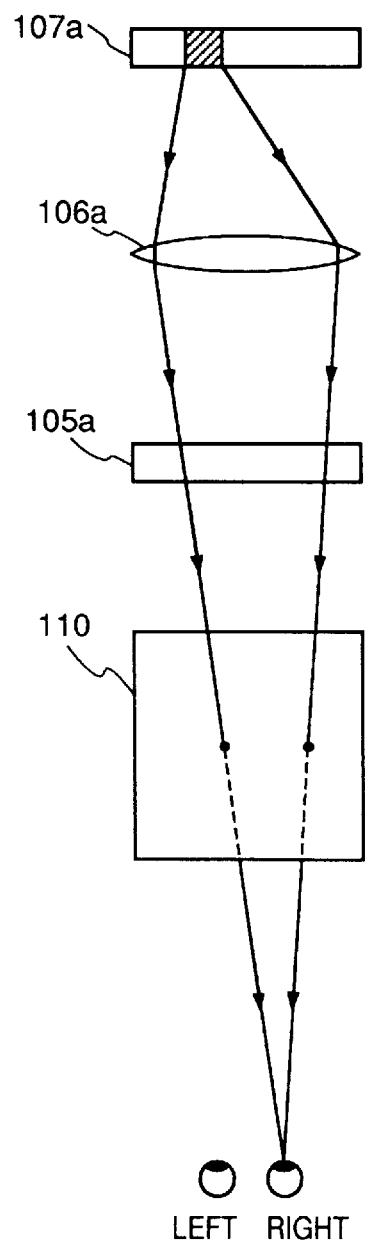
Figure 10:
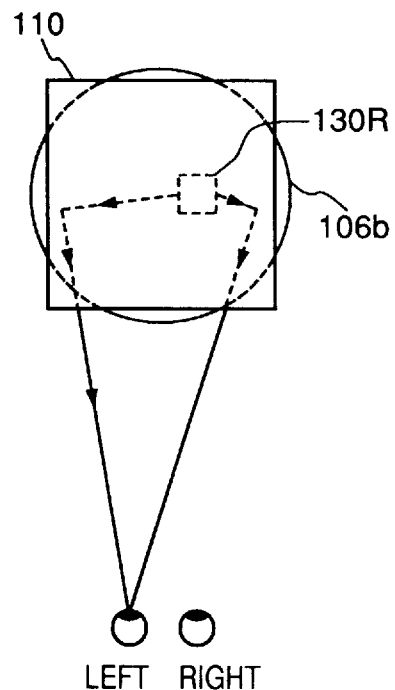

FIG. 8 shows two light paths from the inside of the visual phone of the second embodiment to the viewer's eye. FIG. 9 shows a light path where the screen image (R) displayed on the LCD 105a is irradiated with the backlight control figure (R) displayed on the LCD 107a, and introduced to the right eye through the half mirror 110. FIG. 10 shows a light path where the screen image (L) displayed on the LCD 105b is irradiated with the backlight control figure (L) displayed on the LCD 107b, then reflected by the half mirror 110, and introduced to the left eye.

In the second embodiment, the backlight control figures are turned upside down on the LCD's 107a and 107b to follow the movement of the viewer in an up-and-down direction. As shown in FIGS. 8 and 10, the screen image (L) displayed on the LCD 105b, reflected by the half mirror 110, has been turned upside down in advance at the image processor 109rb. The screen image (R) has not been turned upside down since the image merely passes through the half mirror 110.

Displaying arrangement of screen images and control figures on the displays according to the present embodiment will be explained below.

The screen image (R) is input to the LCD 106a so that the image is displayed upright thereon. Therefore, the image processor 109ra outputs the screen images (R) to the display 105a as it receives them from the receiving side apparatus through the controller 120. The screen image (L) on the display 105b is reflected by the mirror 110. Therefore, the image processor 109rb converts the screen images (L) into mirror images to output them to the display 105b.

The control figures (R and L) are turned upside down by the lenses 106a, 106b, respectively. However, when the backlight control figure (R) which has been derived from the right half face of the viewer is input to the display 107a, it is displayed in a relatively left region of the display 107a, as shown in FIG. 9. When the backlight control figure (L) is input to the display 107b, the figure (L) is displayed in a relatively right region of the display 107b, as shown in FIG. 10. Therefore, the image processor 109ta, 109tb do not have to perform right-to-left inversion of the control figures to output the displays 107a, 107b. The image processor 109ta for the control figure (R) has to perform upside down inversion of the control figure (R), as described above. However, the control figure (L) is reflected by the mirror 110, the image processor 109tb for the control figure (L) generates data so that the lower portion of the control figure L is displayed at a region of the display close to the viewer and that the right portion is illuminated.

The CRT's and LCD's used in the second embodiment are an electronic display. Similar to the first embodiment, they are able to display inverted images the data of which are electronically inverted in longitudinal and right-to-left directions. The inversion can be made just by rotating the display body by 180 degrees.

Further example as to how to achieve displaying arrangement of screen images and control figures according to the second embodiment will be described below.

In FIG. 7, the display 107a, 107b, 105a, and 105b are indicated with a indicator "(s)". Similar to the first embodiment, the indicators in FIG. 7 mean a starting point of luster scanning on the respective displays. Further, in FIG. 7, arrows "→" mean the direction of image data inversion. For example, the displays 107a, 105a with "(s)" start to luster-scans at the upper right position thereof in a left to right direction. The displays 105b, 107b with "(s)" start to luster-scans at the lower right position in a right to left direction. Data of the control figure R are inputted with electronically inverted vertically into the display 107a with an arrow "→". Data of the control figure L are inputted with inverted longitudinally and horizontally into the display 107b with two arrows. Data of the screen image L are inputted to the display 105b with electronically inverted in the horizontal direction.

The above arrangement of the displays ensures tracking of screen images R and L with respect to movements of the right and left eyes of the viewer.

Furthermore, the display 107b may be provided so that the starting point of luster scan may be set at upper left position in FIG. 7. In this case, data inversions in both the longitudinal and horizontal directions are not necessary.

<Third Embodiment>

Figure 11:
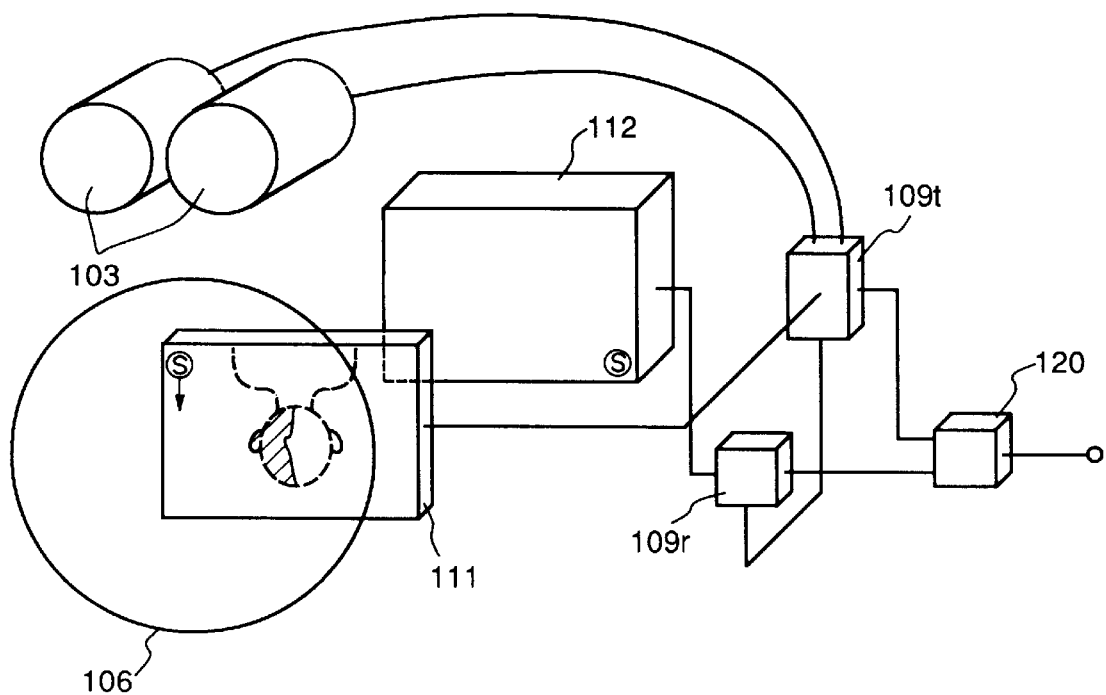
FIG. 11 is a perspective view showing the construction of a stereoscopic image communication apparatus according to a third embodiment of the present invention.

FIG. 11 shows the construction of a stereoscopic image communication apparatus according to a third embodiment of the present invention. Note that the outer appearance of the apparatus is the same as that of the apparatus of the first embodiment in FIG. 3. In the first and second embodiments, the screen images are irradiated through backlight control figures displayed behind the screen images; in the third embodiment, screen images are displayed on a CRT set behind the Fresnel lens and the space modulator. The viewer sees the screen images through "transmission control figures" to be described later displayed on the space modulator. Similar to the first embodiment, the third embodiment employs the time-divisional display method for the purpose of simplifying the apparatus construction. Similar to the previous embodiments, in the apparatus according to the present embodiment comprises a plurality of displays. The displays are set "normally" unless otherwise specified.

In FIG. 11, numeral 103 denotes CCD cameras as a pair of image sensing devices; 111, a light-transmitting type LCD as a space modulator; 106, a Fresnel lens having a 150 mm focal distance, located between the LCD 111 and the viewer; 109t and 109r, image processors; and 112, an image display device such as a color CRT for displaying screen images for stereoscopic vision.

The operation of the stereoscopic image communication apparatus having the above construction is basically the same as that of the first embodiment shown in FIG. 4, therefore, the elements corresponding to those in the first embodiment have the same reference numerals, the explanations of these elements will be omitted, and only the difference from the first embodiment will be described.

Similar to the first embodiment, the image communication controller 120 transmits the images obtained by the cameras 103 to the receiving-side apparatus as screen images via the image processor 109t, which generates "transmission control figures" respectively corresponding to the right-half face and left-half face of the viewer based on the images from the cameras 103. The LCD 111 displays the "transmission control figures" in a time-divisional manner. The image display device 112 displays screen images from the receiving side in a time-divisional manner in synchronization with the display operation at the LCD 111.

FIG. 12 shows a light path where the "transmission control figure" for right eye (hereinafter referred to as "transmission control figure (R)") blocks the light from the screen image (R) to the left eye. FIG. 13 shows a light path where the "transmission control figure" for left eye (hereinafter referred to as "transmission control figure (L)") blocks the light from the screen image (L) to the right eye. Note that the transmission control figure (R) has light-blocking function to the left eye and the transmission control figure (L) has light-blocking function to the right eye by virtue of the directivity of the Fresnel lens 106.

The transmission control figures displayed on the LCD 111 are turned upside down for the same reason stated about the backlight control figures in the first and second embodiments. Further, as the viewer sees the screen image displayed on the image display device 112 via the Fresnel lens 106 as a virtual image, the screen image on the image display device 112 has been turned upside down in advance.

Displaying arrangement of screen images and control figures on the displays according to the present embodiment will be explained below.

The screen images (R and L) are input to the display 112 so that the images are turned upside down, thus inverted right to left. They are inverted in both the longitudinal and right to left directions to enter the viewer's eyes properly.

The control figures (R and L) are input to the display 111 so that they are displayed with inverted only longitudinal direction.

Further example as to how to achieve displaying arrangement of screen images and control figures according to the present embodiment will be described below.

In FIG. 11, the display 112 for screen images is indicated with a indicator "(S)" at the lower right position. This means that the case of the display 112 is turned upside down, thus causes the images are displayed on the display 112 with inverted in vertical and right-to-left directions. The lens 106 functions to invert the images on the display 112 in the vertical and right-to-left directions. Therefore, the viewer can see the screen images properly.

The display 111 starts to luster-scan at upper left position thereon, further data of the control figures are inputted with electronically inverted in a vertical direction. Therefore, the control figures on the display 11 ensure the viewer's eyes to track the screen images on the display 112.

<Fourth Embodiment>

Figure 14:
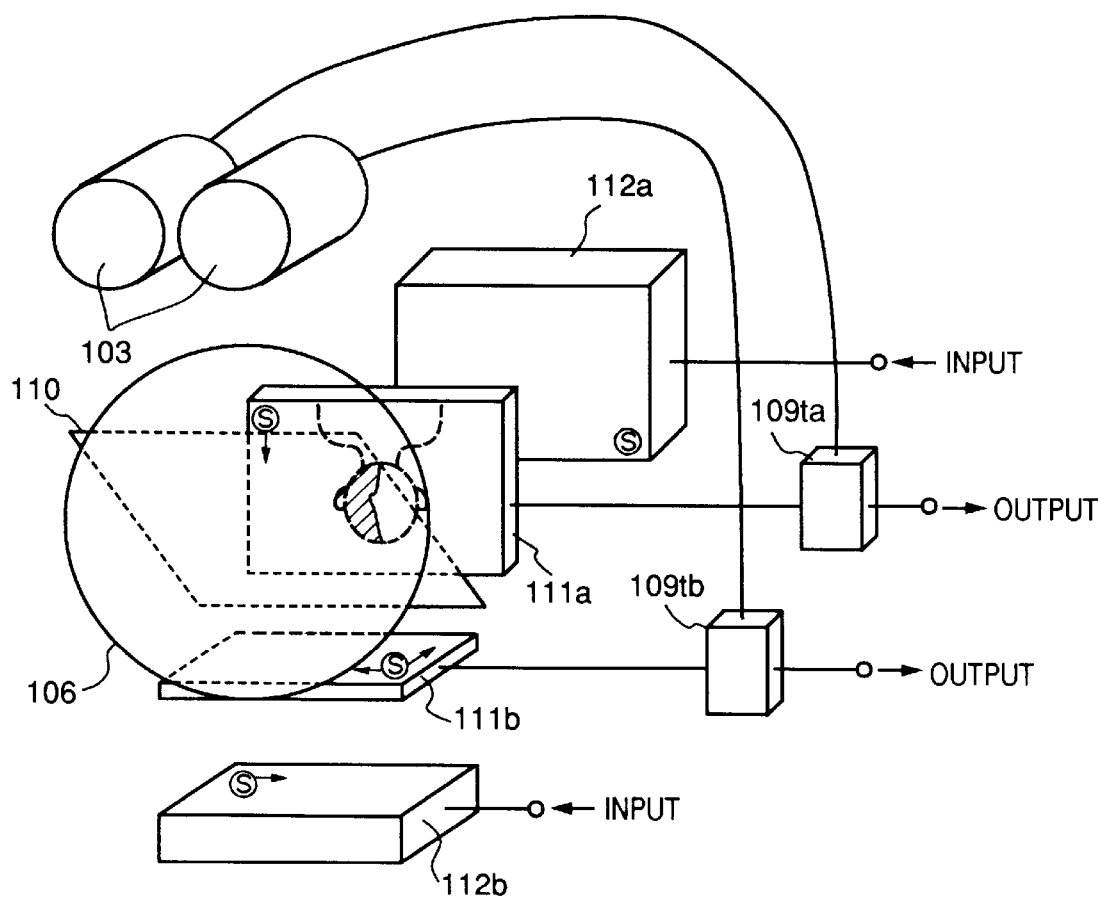
FIG. 14 is a perspective view showing the construction of a stereoscopic image communication apparatus according to a fourth embodiment of the present invention.

FIG. 14 shows the construction of a stereoscopic image communication apparatus according to a fourth embodiment of the present invention. The outer appearance of the apparatus is the same as that of the apparatus of the first embodiment. In the fourth embodiment, the visual telephone of the third embodiment further has the image combining function using a half mirror as described in the second embodiment. Similar to the previous embodiments, in the apparatus according to the present embodiment comprises a plurality of displays. The displays are set "normally" unless otherwise specified.

In FIG. 14, numeral 103 denotes CCD cameras as a pair of image sensing devices; 110, a half mirror for combining two screen images; 111a and 111b, light-transmitting type LCD's as space modulators; 106, a Fresnel lens having a 150 mm focal distance, located between the viewer and the LCD's 111a and 111b; 109ta and 109tb, image processors; and 112a and 112b, image display devices such as a color CRT for displaying the screen images for stereoscopic vision.

The operation of the stereoscopic image communication apparatus having the above construction is basically the same as that of the third embodiment shown in FIG. 11, therefore, the elements corresponding to the third embodiment have the same reference numerals, the explanations of these elements will be omitted, and only the difference from the third embodiment will be described.

Similar to the third embodiment, the images of the viewer from the cameras 103 are transmitted as screen images to the receiving side. The image processors 109ta and 109tb generate transmission control figures corresponding to the right-half face and left-half face of the viewer based on the images from the cameras 103, and the LCD's 111a and 111b display the transmission control figures only in the longitudinal direction. The display devices 112a and 112b display screen images from the receiving side, and the half mirror 110 combines the images to a visible image to the viewer. Note that the screen image displayed on the LCD 111b and the display 112b have been converted into mirror image in consideration of reflection by the half mirror 110.

Displaying arrangement of screen images and control figures on the displays according to the present embodiment will be explained below.

The screen image (R) is input to the display 112a so that the image is displayed on it with turned upside down, thus inverted right to left. The screen image on display 112a is inverted by the lens 106 in both the longitudinal and transverse directions to properly enter the right eye. Therefore, an image processor (not shown) for R screen image performs the inversion of the screen images (R) to output it to the display 112a. The screen image (L) on the display 112b is turned upside down by the lens 106, and is converted into enantioimage by the mirror 110. Therefore, an image processor (not shown) for L screen image outputs data to the display 112b so that the lower portion og the viewer image is positioned close to the viewer.

The control figure (R) is turned upside down by the lens 106. However, when the control figure (R) which has been derived from the right half face of the viewer is input to the display 111a, it is displayed in a relatively left region of the display 111a. When the control figure (L) is input to the display 111b, it is displayed in a relatively right region of the display 111b. Therefore, the image processor 109ta, 109tb do not have to perform right-to-left inversion of the control figures to output the displays 107a, 107b. Instead, the image processor 109ta for the control figure (R) has to perform upside down inversion of the control figure (R), as described above. However, the control figure (L) is reflected by the mirror 110, the image processor 109tb for the control figure (L) does not have to perform upside down inversion of the control figure (L), because the mirror does it instead.

FIG. 14 further illustrates how to set the displays 111a, 111b, 112a, and 112b in order to achieve the inversions of screen images and control figures according to the present embodiment.

The luster scan of the display 112a is set at lower right position thereon. The data of R screen images are inputted into the display 112a without electronic inversions. The luster scan of the display 111a is set at upper left position thereon. The data of R control figures are inputted into the display 111a with electronically inverted in a vertical direction. The luster scan of the display 112b is set at upper left position thereon. The data of L screen images are inputted into the display 112b with electronically inverted in a right-to-left direction. The luster scan of the display 111b is set at lower right position thereon. The data of L control figures are inputted into the display 111b with electronically inverted in longitudinal and right-to-left directions.

<Fifth Embodiment>

Figure 15:
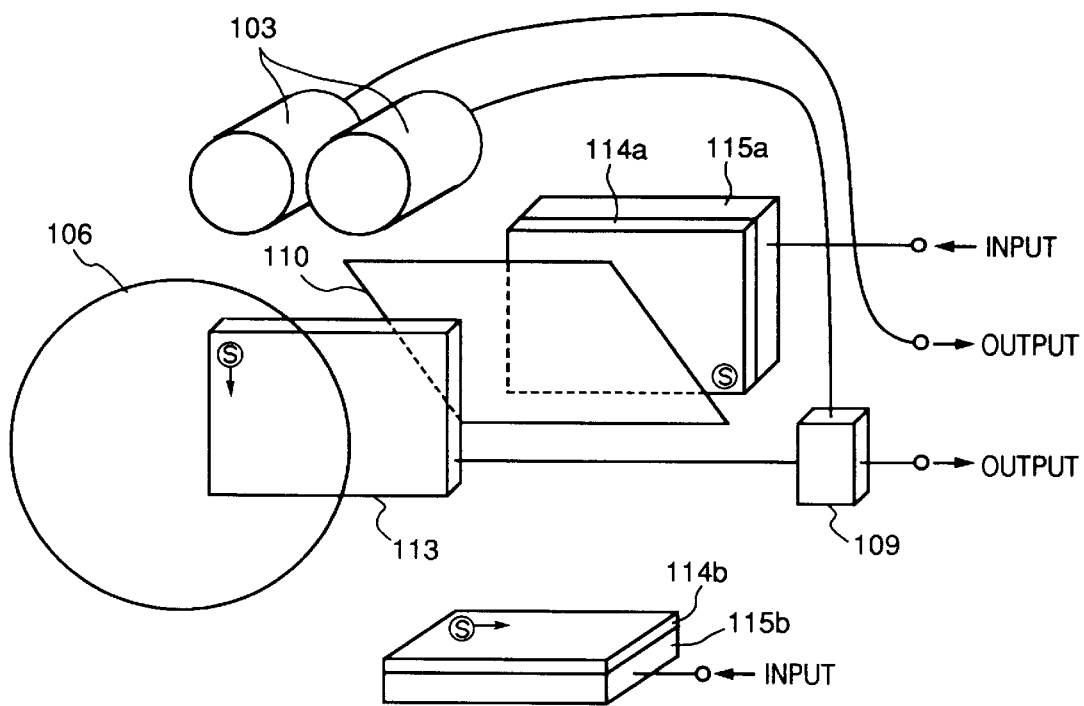
FIG. 15 is a perspective view showing the construction of a stereoscopic image communication apparatus according to a fifth embodiment of the present invention.

FIG. 15 shows the construction of a stereoscopic image communication apparatus according to a fifth embodiment of the present invention. The outer appearance of the apparatus is the same as that of the apparatus of the first embodiment in FIG. 3. Similar to the previous embodiments, in the apparatus according to the present embodiment comprises a plurality of displays. The displays are set "normally" unless otherwise specified.

In FIG. 15, numeral 103 denotes CCD cameras as a pair of image sensing devices; 110, a half mirror for combining screen images; 113, a light-transmitting type monochromatic LCD; 106, a Fresnel lens having a 150 mm focal distance; 109, an image processor; 115a and 115b, image display devices such as a color CRT for displaying the screen images for stereoscopic vision; and 114a and 114b, polarizing plate having polarizing characteristics orthogonal to each other, attached to the display surface of the image display devices 115a and 115b. For the purpose of simplification, elements such as the image communication controller are omitted from FIG. 15.

The operation of the stereoscopic image communication apparatus having the above construction is basically the same as that of the fourth embodiment shown in FIG. 14, therefore, the elements corresponding to the those in the fourth embodiment have the same reference numerals, the explanations of these elements will be omitted, and only the difference from the fourth embodiment will be described.

In the fifth embodiment, the color display device 115a displays a screen image (R), while the color display device 115b displays a screen image (L). The monochromatic LCD 113 displays a figure having a similar function to that of the transmission control figure of the third and fourth embodiments. The figure displayed on the display 113 of this embodiment is referred to as "polarized-light control figure".

Similar to the fourth embodiment, the images of the viewer obtained by the cameras 103 are transmitted to the receiving side as screen images for stereoscopic vision. The image processor 109 generates a figure corresponding to any of the right-half face and the left-half face based on the images from the cameras 103, and displays a figure on the LCD 113 as the polarized-light control figure.

Figure 16:
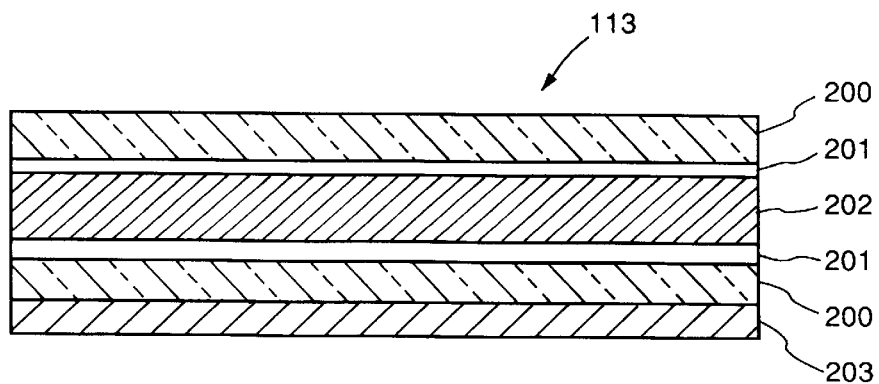
FIG. 16 is a cross-sectional views showing a liquid crystal display device (LCD) used in the stereoscopic image communication apparatus of the fifth embodiment.

Next, the construction and operation of the LCD 113 will be described with reference to FIGS. 16 to 18. As shown in FIG. 16, the orientation of a liquid crystal 202 inserted between glass plates 200 is controlled by applying a predetermined voltage to a transparent electrode 201. A polarizing plate 203 is attached to the outer surface of one of the glass plates 200.

Figure 17:
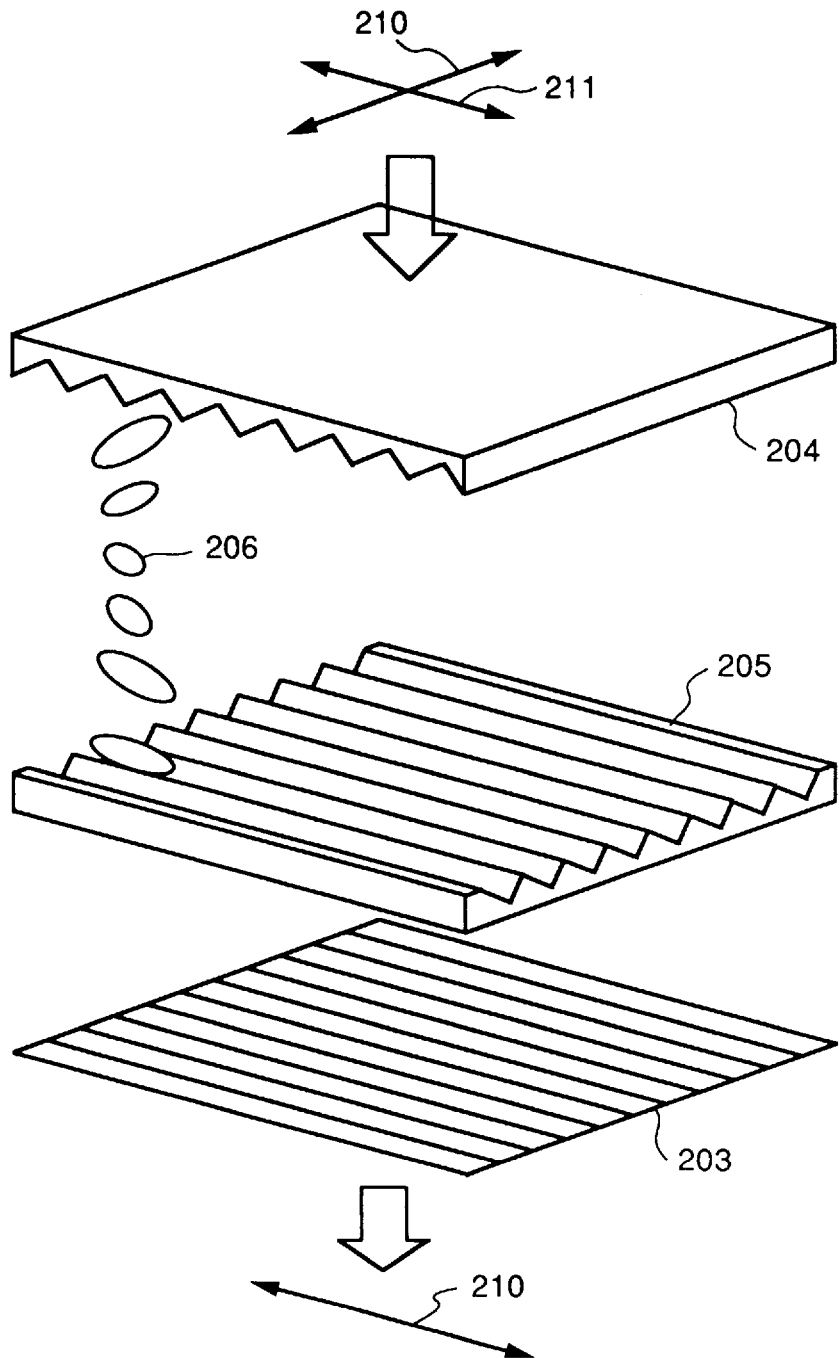
FIGS. 17 and 18 are explanatory views respectively showing the operation of the LCD used in the stereoscopic image communication apparatus of the fifth embodiment.

As shown in FIG. 17, in a state where the voltage is not applied to the LCD 113, incident polarized light having a polarized direction 210 is 90° rotated around its light axis in accordance with the orientation of the liquid crystal molecule 206. As a result, the polarized direction of the incident light corresponds with the polarized-light passing characteristic of the polarizing plate 203, and the light passes through the polarizing plate 203. On the other hand, the incident polarized light having a polarized direction 211 orthogonal to the polarized direction 210 can not pass through the polarizing plate 203.

Figure 18:
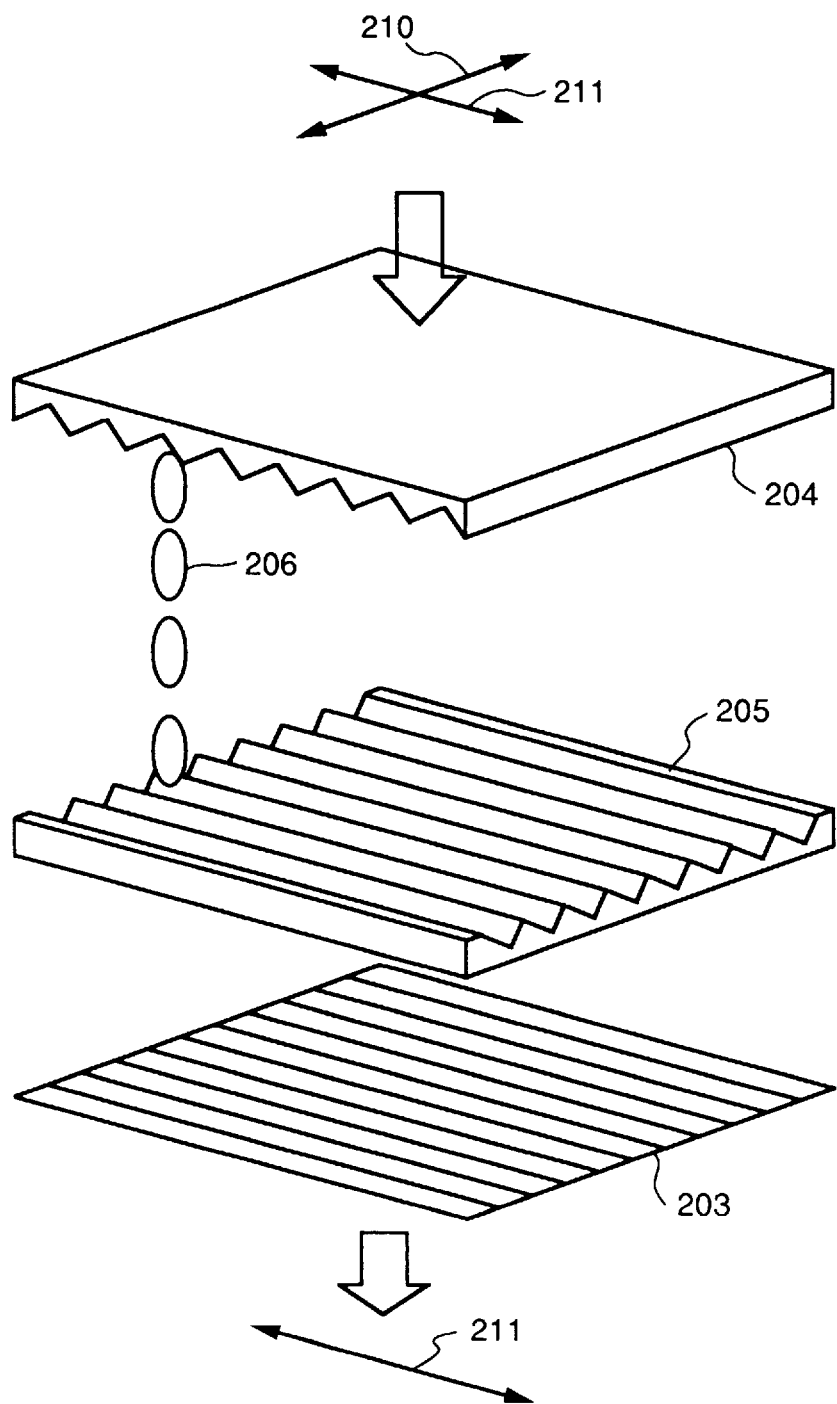

As shown in FIG. 18, in a state where the voltage is applied, the orientation of the liquid crystal molecule 206 changed in accordance with the direction of voltage application. Any incident light passes through the liquid crystal 202, however, the incoming light having the polarized direction 210 can not pass through the polarizing plate 203, while the incident light having the polarized direction 211 corresponding with the polarized-light passing characteristic of the polarizing plate 203, passes through the polarizing plate 203.

That is, when two incoming lights having polarized directions orthogonal to each other enter the light-transmitting type LCD 113, the display surface of the LCD 113 passes one of the polarized light at a portion where the voltage is applied, and passes the other polarized light at a portion where the voltage is not applied.

In the fifth embodiment, it is assumed that the polarization direction where the LCD 113 passes light at portion where the voltage is applied is set to "direction X", while the polarization direction where the LCD 113 passes light at a portion where the voltage is not applied is set to "direction Y". At the LCD 113, the voltage is applied at pixel positions corresponding to a bright portion (irradiated half face area) within the image of the viewer's face. In the apparatus in FIG. 15, only the image of the viewer's face where the right half face is irradiated, obtained from the cameras 103 is inputted into the image processor 109. Accordingly, at the LCD 113, the liquid crystal is applied only at the portion corresponding to the right-half face area. That is, the LCD 113 passes light polarized in the direction X (hereinafter referred to as "X-polarized light") at this right-half face area, while passes light polarized in the direction Y (hereinafter referred to as "Y-polarized light") at the area except the right-half face area.

In this example, as passing characteristic of the polarized-light at the right-half face area of the image displayed on the LCD 113 corresponds with the polarization direction of the polarizing plate 114a attached to the image display device 115a, the viewer can see the screen image (R) displayed on the image display device 115a with only the right eye. On the other hand, as the polarized-light passing characteristic at the area other than the right-half face area of the image displayed on the LCD 113 corresponds with the polarization direction of the polarizing plate 114b attached to the image display device 115b, the viewer can see the screen image (L) displayed on the image display device 115b with only the left eye.

Note that the screen image displayed on the image display device 115b has been turned converted into mirror image in consideration of reflection by the half mirror 110.

The apparatus in the first to fourth embodiments generates backlight control figures or transmission control figures based on the images of the viewer obtained by the cameras 103; the apparatus in the fifth embodiment generates a polarized-light control figure based on only the image where the right-half face is irradiated. This is because the LCD 113 selectively passes the X-polarized light and the Y-polarized light. With the polarized-light control figure, the LCD 113 passes the X-polarized light at the right-half face area corresponding to pixel value "1" area, and passes the Y-polarized light at the area other than the right-half face area corresponding to pixel value "0" area. The Y-polarized light that can pass the LCD 113 does not need a polarized light control figure based on the image where the left half face is irradiated. Note that in the polarized-light control figure, the value "0" area is wider than the value "1" area, i.e., the area where the LCD 113 passes the Y-polarized light (screen image (L)) is wider than the area where the LCD 113 passes the X-polarized light (screen image (R)), however, by virtue of the directivity of the Fresnel lens 106, the screen image (L) does not enter the viewer's right eye.

Note that in this embodiment, the polarized-light control figure can be generated using the image where the left-half face is irradiated. In this case, the LCD 113 passes the Y-polarized light at a portion of liquid crystal where the voltage is applied.

Displaying arrangement of screen images on the display according to the present embodiment will be explained below.

The screen image (R) is input to the display 115a so that the image is displayed on it with turned upside down, thus inverted right to left. The screen image on display 115a is inverted by the lens 106 in both the longitudinal and transverse directions to properly enter the right eye. Therefore, an image processor (not shown) for the R screen image performs the inversion of the screen images (R) to output it to the display 115a. The screen image (L) on the display 115b is turned upside down by the lens 106, and is converted into a mirror image by the mirror 110. Therefore, an image processor (not shown) for the L screen image converts the stereo images into mirror images to output the data to the display 115b so that the lower portion of the viewer image is displayed close to the viewer.

The control figure is turned upside down by the lens 106. However, when the control figure which has been derived from the right half face of the viewer is input to the display 113, the control area of the figure for right eye is displayed in a relatively left region of the display 113. Therefore, the image processor 109t does not have to perform right-to-left inversion of the control figure to output the display 113. Instead, the image processor 109 has to perform only upside down inversion of the control figure.

FIG. 15 further illustrates how to set the displays 113, 115a, and 115b in order to achieve the inversions of screen images and control figures according to the present embodiment.

The luster scan of the display 115a is set at lower right position thereon. The data of R screen images are inputted into the display 115a without electronic inversions. The luster scan of the display 113 is set at upper left position thereon. The data of R and L control figures are inputted into the display 113 with electronically inverted in a vertical direction. The luster scan of the display 115b is set at upper left position thereon. The data of L screen images are inputted into the display 115b with electronically inverted in a right-to-left direction.

<Sixth Embodiment>

Figure 19:
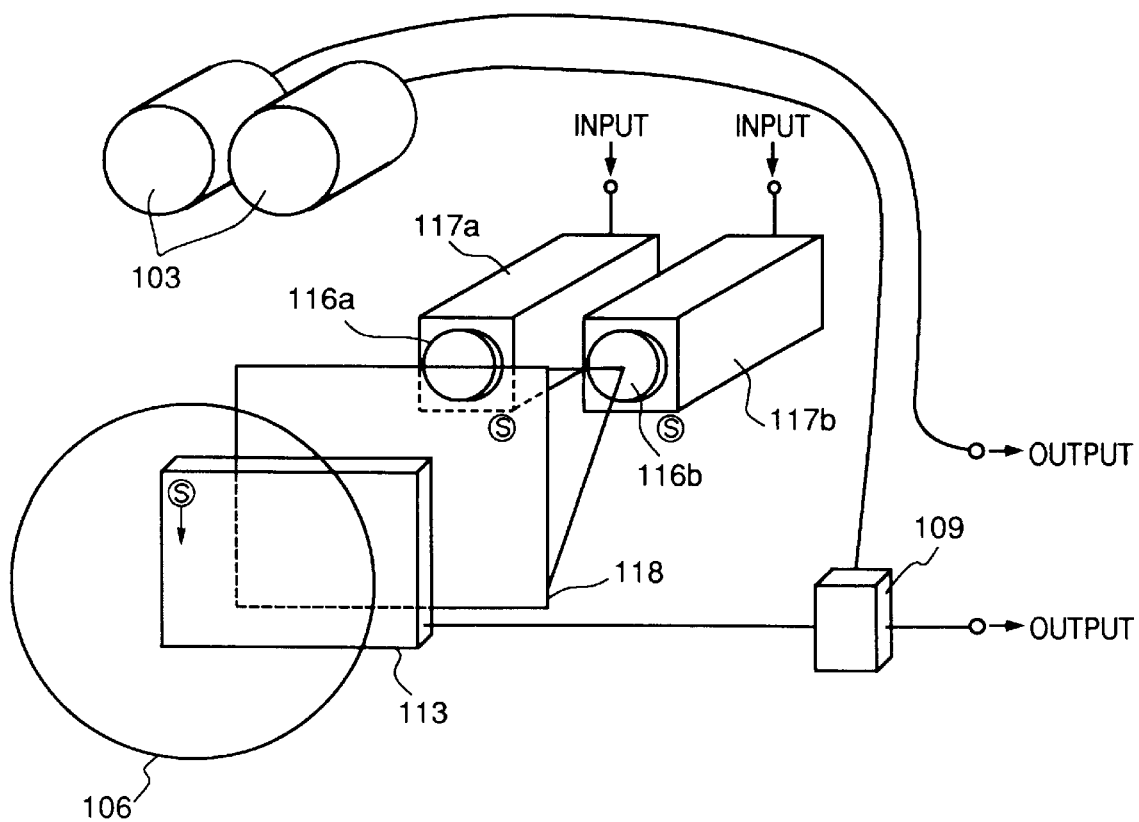
FIG. 19 is a perspective view showing the construction of a stereoscopic image communication apparatus according to a sixth embodiment of the present invention.

FIG. 19 shows the construction of a stereoscopic image communication apparatus according to a sixth embodiment of the present invention. The outer appearance of the apparatus is the same as that of the apparatus of the first embodiment. The sixth embodiment combines a screen image (R) and a screen image (L) using a screen in place of a half mirror. Similar to the previous embodiments, in the apparatus according to the present embodiment comprises a plurality of displays. The displays are set "normally" unless otherwise specified.

In FIG. 19, numeral 103 denotes CCD cameras as a pair of image sensing devices; 118, a screen for combining two screen images; 113, a light-transmitting type monochromatic LCD; 106, a Fresnel lens having a 150 mm focal distance; 109, an image processor; 117a and 117b, projection televisions (TV's) as image display devices for displaying screen images for stereoscopic vision; 116a and 116b, polarizing plates having polarizing characteristics orthogonal to each other, attached to the image display screens of the projection TV's 117a and 117b. For the purpose of simplification, the elements such as the image communication controller are omitted from FIG. 19.

The operation of the stereoscopic image communication apparatus having the above construction is the same as that of the fifth embodiment shown in FIG. 15, therefore, the elements corresponding to those in the fifth embodiment have the same reference numerals, the explanations of these elements will be omitted, and only the difference from the fifth embodiment will be described.

The projection TV's 117a and 117b respectively display a screen image (R) and a screen image (L) received from the receiving-side visual telephone. The polarizing plates 116a and 116b polarize the transmitted lights from the projection TV's 117a and 117b in specific polarization directions. That is, the polarizing plate 116a polarizes the image light from the projection TV 117a in the direction X, while the polarizing plate 116b polarizes the image light from the projection TV 117b in the direction Y orthogonal to the direction X. The X-polarized light from the projection TV 117a and the Y-polarized light from the projection TV 117b are superposed on the screen 118. The LCD 113 has the same construction as that of the LCD 113 of the fifth embodiment. Similar to the fifth embodiment, the LCD 113 passes the X-polarized light only at a portion where a predetermined voltage is applied, and passes the Y-polarized light at a portion where the voltage is not applied. Also similar to the fifth embodiment, image processor 109 generates a "polarized-light control figure" based on only the viewer's image where the right-half face is irradiated, and displays the polarized-light control figure on the LCD 113. The LCD 113 passes the X-polarized light (screen image (R)) at a portion corresponding to pixel value "1" area (right-half face area) of the polarized-light control figure. The X-polarized light passed through the LCD 113 enters only the viewer's right eye. On the other hand, the LCD 113 passes the Y-polarized light (screen image (L)) at a portion corresponding to pixel value "0" area (area except the right-half face area) of the polarized-light control figure. The Y-polarized light passed through the LCD 113 enters only the viewer's left eye.

Note that similar to the fifth embodiment, the sixth embodiment employs the LCD 113 that can selectively pass the X-polarized light and the Y-polarized light in real time manner, which omits generation of a polarized-light control figure based on the viewer's image where the left-half face is irradiated.

Further, as a modification to the sixth embodiment, the polarized-light control figure can be generated based on the viewer's image where the left-half face is irradiated. In this case, the LCD 113 passes the Y-polarized light at positions of liquid crystal where the voltage is applied.

Displaying arrangement of screen images and control figures on the displays according to the present embodiment will be explained below.

The screen images should be input to the projectors 117a, 117, so that they are displayed on screen 118 with turned upside down. The screen images are turned upside down by the lens 106 to enter the right and left eyes properly upright.

The image processor 109 perform the longitudinal inversion to the control figure data as in the previous embodiment.

FIG. 19 further illustrates another example as to how to set the displays 117a, 117b, 113 in order to achieve the inversions of screen images and control figures according to the present embodiment.

The projectors 117a, 117b are rotated by 180 degrees, thus they display the screen images with inverted in both the vertical and right-to-left directions.

<Seventh Embodiment>

Figure 20:
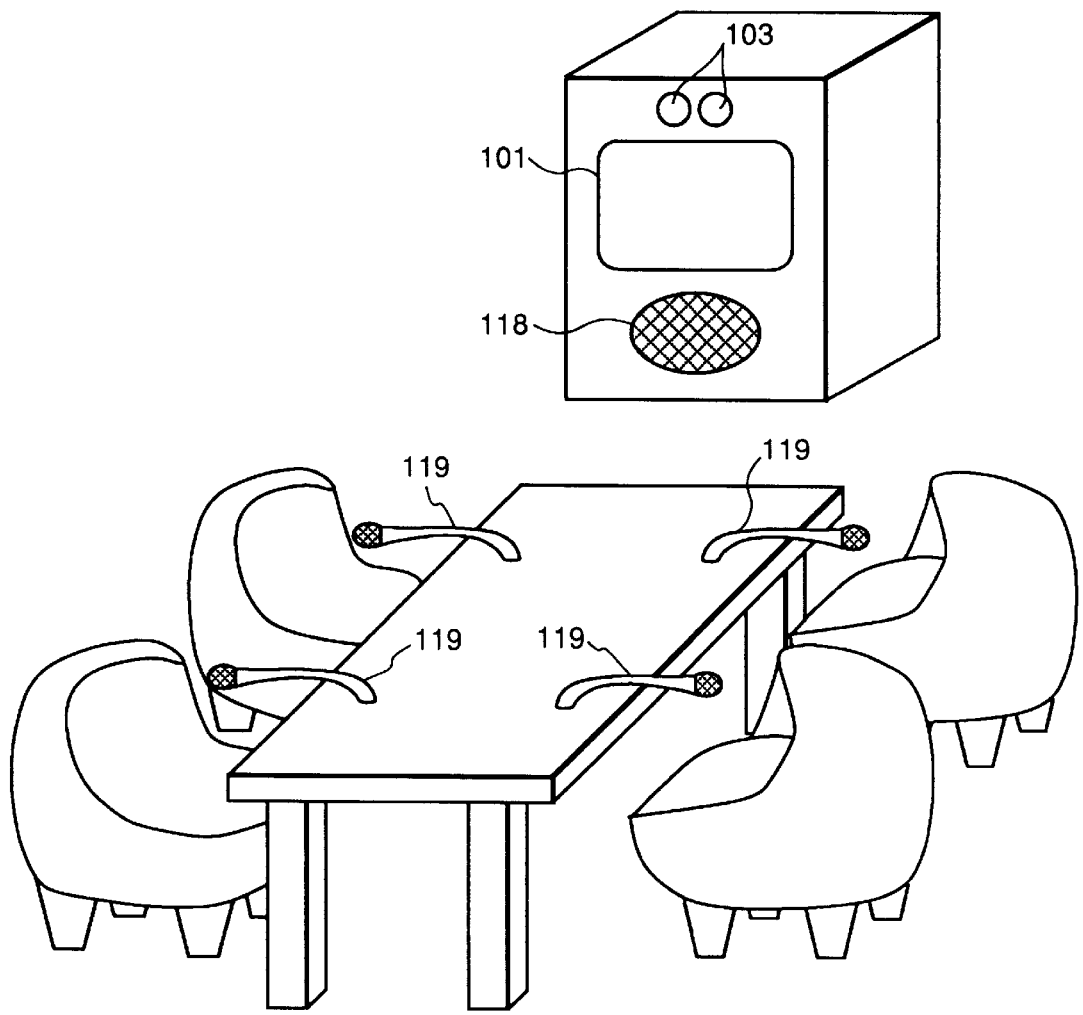
FIG. 20 is an overview of a stereoscopic image communication apparatus according to a seventh embodiment of the present invention.

FIG. 20 shows the outer appearance of a stereoscopic image communication apparatus according to a seventh embodiment of the present invention applied to a teleconference system. Similar to the previous embodiments, in the apparatus according to the present embodiment comprises a plurality of displays. The displays are set "normally" unless otherwise specified.

In FIG. 20, numeral 101 denotes a display screen for displaying screen images of an attendant group from the receiving side (hereinafter referred to as "receiving-side attendant group" or "receiving-side viewers") for stereoscopic vision; 103, CCD cameras as a pair of image sensing devices; 118, a speaker for outputting voices from the receiving-side attendant group; and 119, a microphone for inputting voices from an attendant group on the transmitting-side (hereinafter simply referred to as "viewers").

The CCD cameras 103 are set at predetermined convergence angles so that stereoscopic images of the viewers are obtained by an angular parallax.

Figure 21:
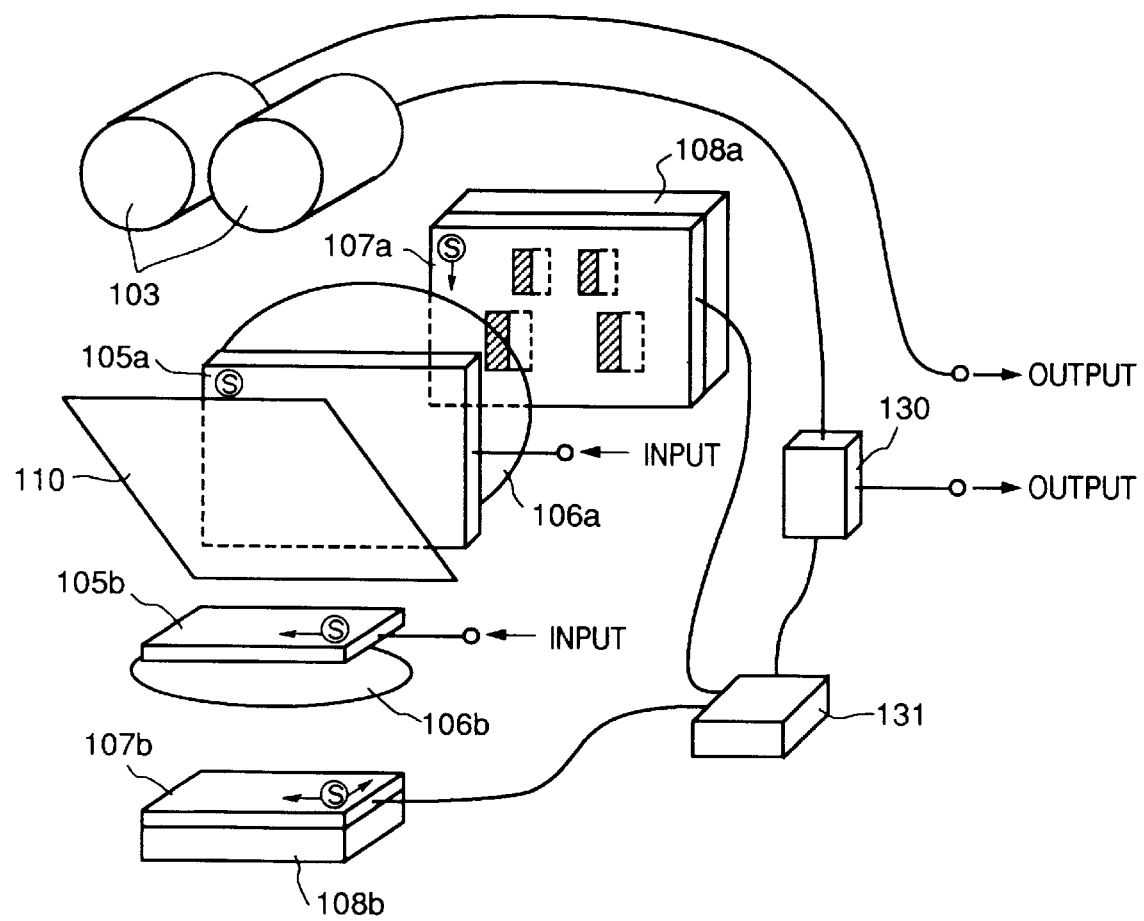
FIG. 21 is a perspective view showing the construction of a stereoscopic image communication apparatus of the seventh embodiment.

FIG. 21 shows the construction of the stereoscopic image communication apparatus according to the seventh embodiment. Numerals 105a and 105b denote light-transmitting type LCD's as space modulators, for displaying the screen images of the receiving-side attendant group; 106a and 106b, Fresnel lenses respectively having a 150 mm focal distance, located behind the LCD's 105a and 105b; 107a and 107b, monochromatic LCD's located at positions 160 mm (longer than the focal distance of the lenses 106a and 106b) distant from the lenses 106a and 106b, respectively opposite to the LCD's 105a and 105b, for displaying "backlight control figures"; 108a and 108b, backlights for the LCD's 107a and 107b; 110, a half mirror for combining screen images displayed on the LCD's 105a and 105b into an image for stereoscopic vision; 130, a signal divider for dividing signals from the cameras 103; and 131, an image processor.

The operation of the stereoscopic image communication apparatus having the above construction is the same as that of the first embodiment shown in FIG. 4, therefore, the elements corresponding to those in the first embodiment have the same reference numerals, the explanations of these elements will be omitted, and only the difference from the first embodiment will be described.

In FIG. 21, the LCD 107*a* displays a plurality of "backlight control figures" each similar to the backlight control figure in the first embodiment. These backlight control figures correspond to the plural viewers. Note that the LCD 107*b* also displays backlight control figures, however, the figures on the LCD 107*b* are omitted for the purpose of simplification.

The signal divider 130 transmits images obtained by one of the cameras 103 as screen images (L) to the receiving-side teleconference apparatus, and transmits images from one of the cameras 103 as screen images (R) to the receiving-side apparatus. The image processor 131 generates images of the viewers corresponding to the images where the right-half faces are irradiated (backlight control figures (R)), and displays the images on the LCD 107*a*. Note that in the seventh embodiment, backlight control figures to be displayed on the LCD 107*b* are generated using negative/positive inversion.

Next, the negative/positive inversion by the image processor 131 will be described. Assuming that the resolution of the cameras 103 is eight bits, the density level of an image signal outputted from the cameras 103 is "0" to "255". The negative/positive inversion is made by calculating the complement of the density level of the image signal from the cameras 103. For example, if the density level is "30", the "negative/positive inverted" complement value is "225".

Figure 22:
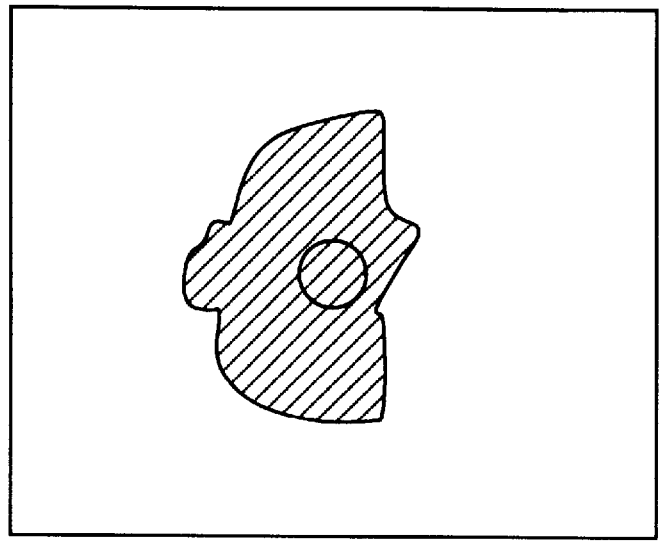
FIG. 22 illustrates a backlight control figure for a viewer's right eye used in the seventh embodiment.

The images of the viewers where the right-half faces are irradiated are displayed on the LCD 107*a* as backlight control figures (R) via the signal divider 130 and the image processor 131. FIG. 22 shows the backlight control figure (R) of one viewer. In FIG. 22, the image is upside down for the same reason as stated in the first embodiment. In the backlight control figure (R), the hatched area corresponds to the right-half face area where the pixel values are "1" (i.e., area corresponding to the irradiated right half face). Similar to the first embodiment, in the backlight control figure (R) displayed on the LCD 107*a*, the right-half face area (the hatched area) passes light from the backlight 108*a*, and the light passed through the LCD 107*a* functions as backlight to the viewer's right eye.

Figure 23:
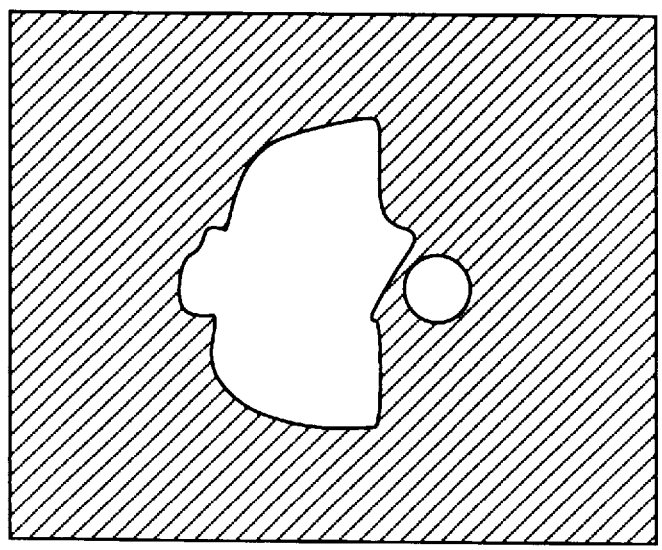
FIG. 23 illustrates a backlight control figure for the viewer's left eye generated by negative/positive-conversion according to the seventh embodiment.

FIG. 23 shows a figure negative/positive-inverted from the backlight control figure (R). In FIG. 23, an area corresponding to the left eye is bright. The LCD 107*b* displays this figure as a backlight control figure (L), and passes light from the backlight 108*b* through the area corresponding to the left-half face to the viewer's left eye.

Thus, similar to the backlight control figure (L) in the first and second embodiments, the backlight control figure (L) generated by negative/positive inverting the backlight control figure (R) passes backlight at the portion corresponding to the viewer's left half face, but does not pass the backlight at the portion corresponding to the viewer's right half face. This negative/positive-inverted backlight control figure (L) can fulfill the same function as that of the backlight control figure (L) in the first and second embodiments, therefore, it can be applied to a visual telephone.

Also, the apparatuses of the second to sixth embodiments can be applied to a teleconference system.

In generation of backlight control figure, it is advantageous that both of backlight control figure (R) and backlight control figure (L) can be generated from one of the viewer's images obtained by the cameras 103. In the seventh embodiment, the image processor 131 inputs only the viewer's image where the right half face is irradiated via the signal divider 130, as shown in FIG. 21.

The screen images and control figures are input to the displays in a similar manner to the FIG. 7 embodiment.

Although not shown, in the first to seventh embodiments, the Fresnel lens can be replaced by a concave mirror to obtain the same advantage. In this case, the light axis of incident light is 90° rotated, the arrangement of the respective elements is changed in correspondence with the light-axis rotation by the concave mirror.

FIG. 21 further illustrates another example as to how to set the displays 107*a*, 107*b*, 105*a*, and 105*b* in order to achieve the inversions of screen images and control figures according to the present embodiment. The arrangement of the displays, and electronic data inversions of the control figures and screen images are similar to those of the second embodiment illustrated in FIG. 7.

<Eighth Embodiment>

Figure 29:
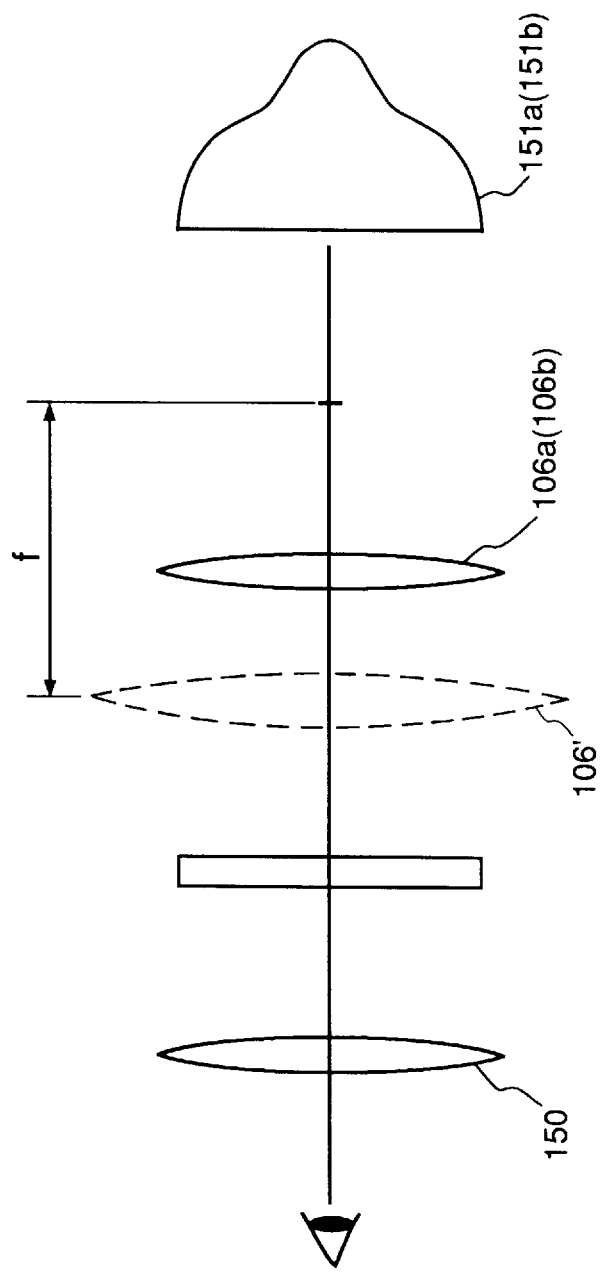
FIG. 29 is an explanatory view showing the positional relation among lenses, a CRT and an LCD in the eighth embodiment.

FIG. 29 shows the construction of a stereoscopic image communication apparatus according to an eighth embodiment of the present invention. Similar to the second embodiment shown in FIG. 7, the eighth embodiment employs backlight control figures. Similar to the previous embodiments, in the apparatus according to the present embodiment comprises a plurality of displays. The displays are set "normally" unless otherwise specified. In the second embodiment, the optical devices are respectively arranged at the position facing the viewer and at the position 90° rotated downward from the former position; in the eight embodiment, the optical devices are respectively arranged at a position facing the viewer and at a position 90° rotated leftward from the former position. Further, the eighth embodiment employs a convex lens for magnification in front of a half mirror 110.

Figure 24:
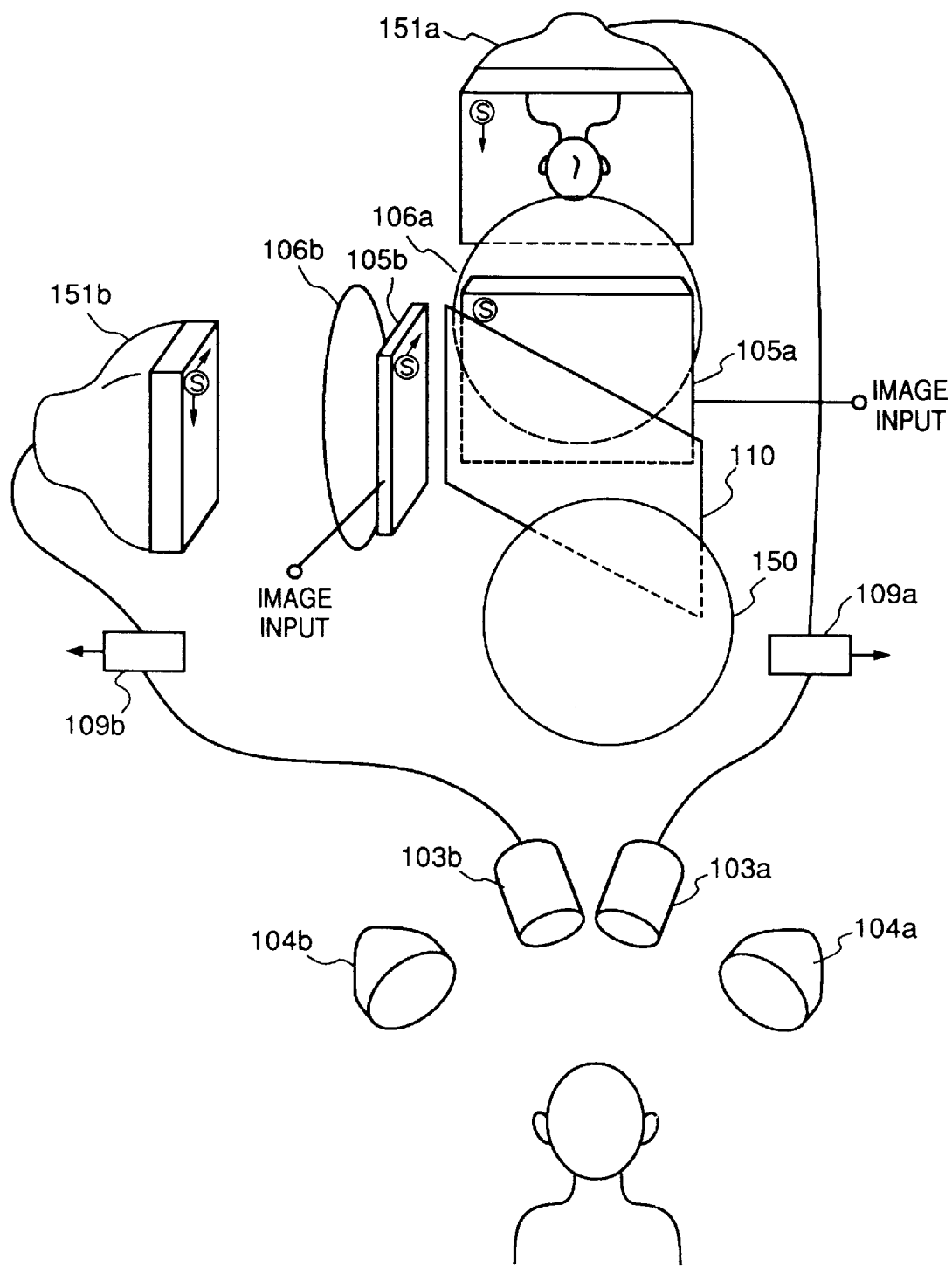
FIG. 24 shows the construction of a stereoscopic image communication apparatus according to an eighth embodiment of the present invention.

In FIG. 24, numerals 105*a* and 105*b* denote light-transmitting type LCD's as space modulators; 106*a* and 106*b*, Fresnel lenses respectively having a 150 mm focal distance, located behind the LCD's 105*a* and 105*b*; 151*a* and 151*b*, monochromatic CRT's as display devices for irradiating control figures, located at positions 160 mm (longer than the focal distance of the Fresnel lenses 106*a* and 106*b*) distant from the lenses 106*a* and 106*b*, opposite to the LCD's 105*a* and 105*b*; 104*a* and 104*b*, LED lights respectively for emitting light of 850 nm wavelength and light of 950 nm wavelength; 103*a* and 103*b*, CCD cameras as image sensing devices; and 110, a half mirror for combining screen images displayed on the LCD's 105*a* and 105*b*.

Numeral 150 denotes a group of lenses for enlarging or reducing the images on the LCD's 105*a* and 105*b*. For this purpose, the lens group 150 comprises convex lens(es) and concave lens(es). Preferably, the lens group 150 functions as a combination lens to reduce aberration. If only enlarged images are needed, the combination of convex lenses may be employed to reduce costs.

The image processors 109*a* and 109*b* have the same function of those in the second embodiment. The LCD's 105*a* and 105*b* as image displaying means display images of the receiving-side speaker from the receiving-side visual telephone. The images displayed on the LCD's 151*a* and 151*b* function as "backlight control figures" as described in the second embodiment.

FIG. 25 shows the viewer irradiated by the LED's 104*a* and 104*b*. In the viewer's face, an area 220*a* is irradiated by the LED 104a, while an area 220b is irradiated by the LED 104b. In consideration of the fact that the top plan view of a human head is oval-shaped, the LED's 104a and 104b are set at two positions away from each other in a transverse direction to generate the right-half face area 220a and the left-half face area 220b by irradiating the viewer's face from the right hand and the left hand. Further, in consideration of crossing of sights of the areas 220a and 220b viewed through the lenses 106a and 106b, the areas 220a and 220b are irradiated respectively corresponding to the right eye and left eye of the viewer. In other words, the areas 220a and 220b can be taken separately, so that they are used as a backlight control figure (R) for right eye and a backlight control figure (L) for left eye.

Figure 26:
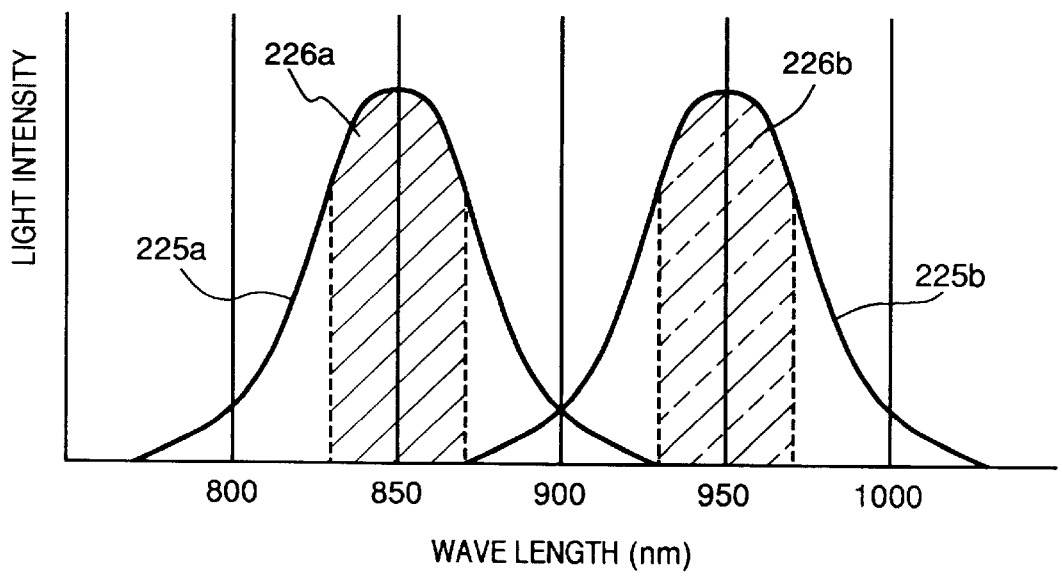
FIG. 26 is a graph showing wavelength distribution of emitted light in the stereoscopic image communication apparatus of the eighth embodiment.

FIG. 26 shows light-emitting characteristics of the LED's 104a and 104b, where a line 225a represents the wavelength distribution of the LED 104a; a line 225b, the wavelength distribution of the LED 104b; an area 226a, a wavelength band where light passes through an interference filter 231a attached to the CCD camera 103a; and an area 226b, a wavelength band where light passes through an interference filter 231b attached to the CCD camera 103b.

Figure 27:
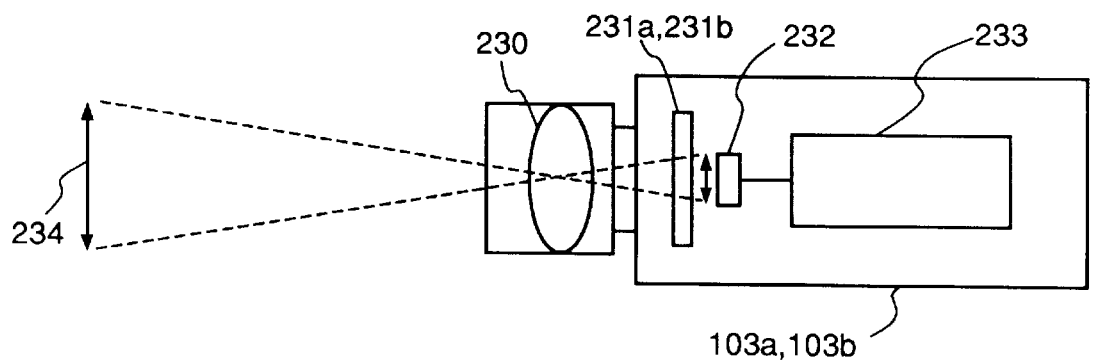
FIG. 27 is a cross-sectional view showing the construction of an image sensing device used in the stereoscopic image communication apparatus of the eighth embodiment.

FIG. 27 shows the cross section of the CCD cameras 103a and 103b. In FIG. 27, numeral 230 denotes a lens; 231a and 231b, interference filters as wavelength band filters; 232, an image sensing device having a CCD chip; 233, a driver for the image sensing device; and 234, an object of image sensing. When image sensing of the viewer is made by the COD camera 103a with the interference filter 231a, the obtained image corresponds only to the area 220a, while when image sensing is made by the CCD camera 103b with the interference filter 231b, the obtained image corresponds only to the area 220b.

Figure 28:
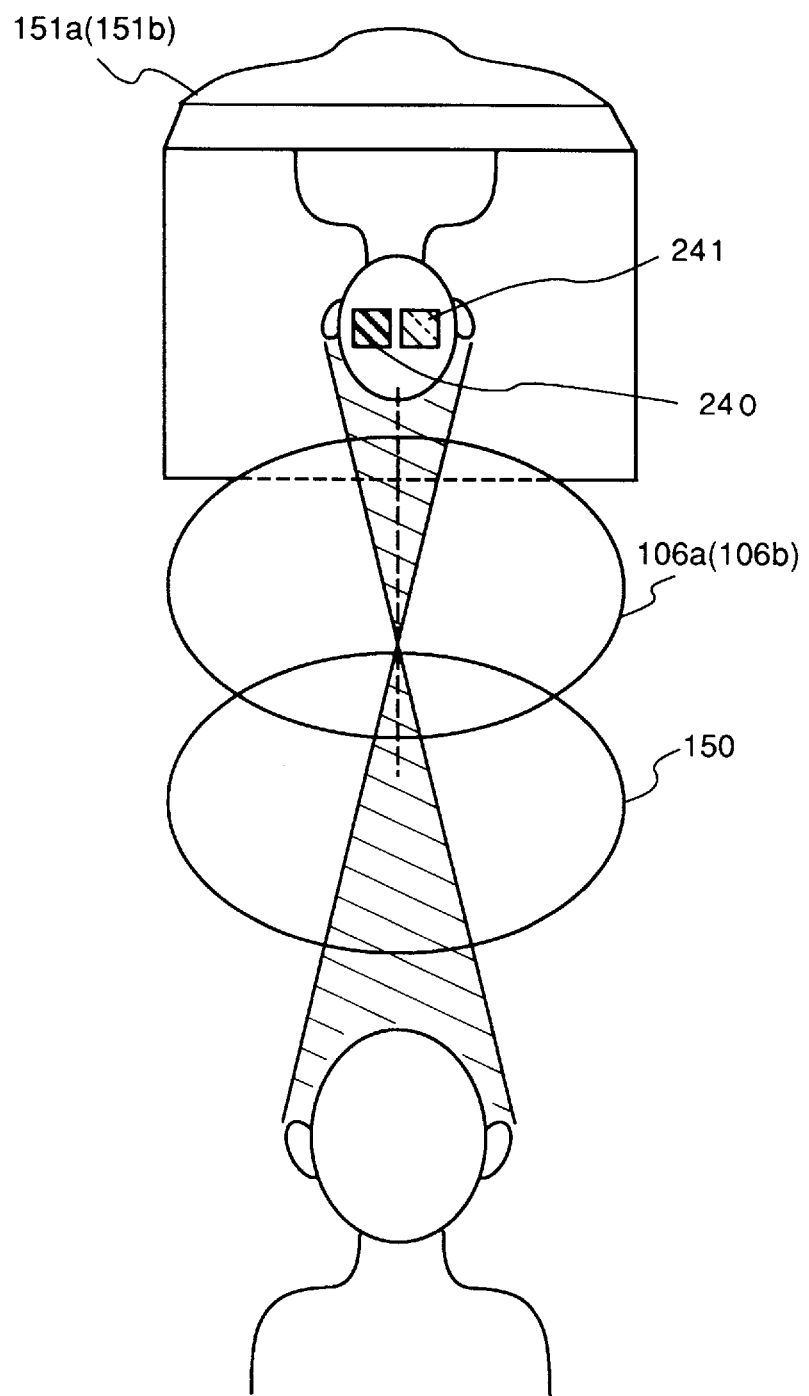
FIG. 28 is an explanatory view showing the operation of the stereoscopic image communication apparatus of the eighth embodiment.

FIG. 28 shows a state where the viewer sees the images of the viewer's own face (obtained by the CCD cameras 103a and 103b) as virtual images. For the purpose of simplification, FIG. 28 shows the CRT's 151a and 151b as one CRT, and the lenses 106a and 106b as one lens. The viewer's images are converted by the lenses 106a and 106b as virtual images, and displayed on the CRT/s 151a and 151b, to be used as backlight control figures. As the description is made about how the viewer sees the viewer's images as virtual images displayed on the CRT's 151a and 151b, the half mirror and the LCD's are omitted from FIG. 28.

In FIG. 28, areas 240 and 241 are image areas, converted by the lenses 106a and 106b and the lens group 150 into virtual images, to function as backlight control figures. As the lens 106a (106b) and the lens group 150 function as a combination lens, an imaginary lens 106' is provided for setting the positions of the respective elements based on the focal distance and right/left image separating function of the lens 106'.

FIG. 28 shows the two image areas 240 and 241 on one CRT, however, actually, the backlight source for right eye and the backlight source for left eye are separated in accordance with wavelength band, accordingly, the areas 210 and 241 are not displayed on the same CRT.

The operation of the stereoscopic image communication apparatus having the above construction will be described with reference to FIGS. 24 to 28. In FIG. 24, the LCD 105a displays a screen image (R) and the LCD 105b displays a screen image (L), reversed as a reflected image. The two screen images are combined by the half mirror 110 in one screen image for the viewer to obtain stereoscopic vision. As described above, the screen image (R) passes through the half mirror 110, whereas the screen image (L) is reflected by the half mirror 110, for this reason, the screen image (L) displayed on the LCD 105b is reversed in a right-and-left direction.

More specifically, in FIG. 24, the right-half face image displayed on the CRT 151a functions as the backlight control figure (R) for the LCD 105a, which displays the screen image (R), while the left-half face image displayed on the CRT 151b functions as the backlight control figure (L) for the LCD 105b, which displays the screen image (L). The two screen images are combined by the half mirror 110, and the viewer obtains a stereoscopic vision.

As described above, the positions of the LED's 104a and 104b are determined so as to respectively irradiate the right-half face area 220a and the left-half face area 220b of the viewer. As shown in FIG. 26, the LED's 104a and 104b emit light having the wavelength band 225a with the central wavelength 850 nm and light having the wavelength band 225b with the central wavelength 950 nm, and the light intensities of the band portions overlapped with each other are at the half level or less, thus, the LED's 104a and 104b are used as light sources of two different wavelengths. As shown in FIG. 27, the CCD cameras 103a and 103b have the interference filters 231a and 231b respectively having an 850±20 nm wavelength band and a 950±20 nm wavelength band between the image sensing devices 232 and the lenses 230. When the images of the object 234 are formed by the image sensing devices 232, only the areas 226a and 226b remain as images. Accordingly, the CCD camera 103a displays only the area 220a, turned upside down, on the CRT 151a, and the CCD camera 103b displays only the area 220b, turned upside down, on the CRT 151b. The luminance and the contrast of the CRT's 151a and 151b which display the areas 220a and 220b and the focal distances of the CCD cameras 103a and 103b are adjusted in advance so that the areas 220a and 220b are displayed with high luminance.

Next, the operation of the Fresnel lenses 106a and 106b will be described with reference to FIGS. 28 and 29. The Fresnel lens 106a (106b) is set so that the viewer can see the backlight control image (R) (backlight control image(L)) displayed on the CRT 151a (151b) as a virtual image. The distance between the Fresnel lens 106a (106b) and the CRT 151a (151b) is longer than the focal distance of the Fresnel lens and the lens group 150 as a combination lens. Thus, the area 240 (241) is enlarged within the effective diameter of the Fresnel lens 106a (106b) to the right eye (left eye) of the viewer. When the area 240 (241) passes the back light, the light from the area 240 (241) functions as a backlight having the effective diameter of the Fresnel lens 106a to the right eye (left eye). At this time, the light from the CRT 151a (151b) does not enter the opposite eye. When the area 241 (240) passes light, the light from the CRT 151b (CRT 151a) does not enter the right eye (left eye).

Accordingly, as the right-half face area 220a displayed on the CRT 151a corresponds to the area 240 in FIG. 28, the viewer sees the bright virtual image with only the right eye. On the other hand, as the left-half face area 220b displayed on the CRT 151b corresponds to the area 241 in FIG. 28, the viewer sees the bright virtual image with only the left eye. Note that the image displayed on the CRT 151b is reversed in the right-and-left direction to be reflected by the half mirror 110 as shown in FIG. 24.

The screen image (R) displayed on the LCD 105a is backlighted to be visible to the viewer's right eye, while the screen image (L) displayed on the LCD 105b is backlighted to be visible to the viewer's left eye, thus the viewer can see the images simultaneously, to obtain stereoscopic vision. If the viewer moves, so far as the irradiation condition as shown in FIG. 25 is maintained, the stereoscopic vision can be continued.

FIG. 29 shows the positional relation among the Fresnel lens 106a (106b), an imaginary lens 106', the lens group 150, and the CRT 151a (151b). If the CRT 151a (151b) is positioned outside of the focal distance of the imaginary lens 106', as a combination lens formed with the lens 106a (106b) with the lens group 150, the image displayed on the CRT 151a (151b) functions as the backlight control figure (R) (backlight control figure (L)). On the other hand, the lens group 150 is positioned so that the LCD 105a (105b) is within the focal distance of the imaginary lens 106'. Actually, the lens group 150 functions as a zoom lens for image enlargement/reduction, and the focal distance of the lens group 150 is changed from outside of the apparatus. The Fresnel lenses can reduce the thickness of the combination lens, thus attains downsizing of the apparatus.

Displaying arrangement of screen images and control figures on the displays according to the present embodiment will be explained below.

The R screen image is input to the display 105a with turned upside down, thus inverted also right-to-left. Such turned R screen image is corrected by the lens 150 to enter the right eye of the viewer properly. The R backlight control figure which is derived from the image of the right half face of the viewer is displayed in a left region of the display 151a without special inversion. As set forth, the R control figure of the right half face should be inverted only upside down.

The L screen image is input to the display 105b with inverted only upside down. Such L screen image is reflected by the mirror 110 and then made upright properly by the lens 150 to enter the left eye. The L backlight control image which is derived from the image of the left half face of the viewer is input to the display 151b so that it is displayed in a left region of the LCD 11b. The L control figure at the left position introduce the L screen image on the display 105b into the left eye properly by virtue of the lens 150 and the mirror 110. The control figure of the left half face should be turned upside down.

According to the eighth embodiment having the above construction, the stereoscopic image communication apparatus provides the following features:

① Stereoscopic vision can be obtained without any specific tool such as image-separating glasses.

② The screen images displayed on the LCD's can be enlarged or reduced in accordance with the viewer's purpose.

③ The backlight source, based on the viewer's image obtained by the cameras 103, moves in accordance with the movements of the viewer. In other words, if the viewer moves, as the backlight source moves following the movement of the viewer, stereoscopic vision can be continuously obtained.

④ The viewer's images are used for stereoscopic vision without depending upon the viewer's position, and are transmitted to the receiving-side apparatus as screen images.

FIG. 24 further illustrates how to set the displays 105a, 105b, 151a, and 151b in order to achieve the inversions of screen images and control figures according to the present embodiment.

The luster scan of the display 105a is set to start at upper left position thereon. The luster scan of the display 105b is set to start at upper left position thereon. Data of R control figure is inputted into the display 151a with inverted in a vertical direction. The luster scan of the display 105b is set to start at upper left position thereon. Data of L screen image is inputted into the display 105b with electronically inverted in a right-to-left direction. The luster scan of the display 151b is set to start at upper left position thereon. Data of L control figure is inputted into the display 151b with inverted in vertical and right-to-left directions.

<Ninth Embodiment>

Figure 30:
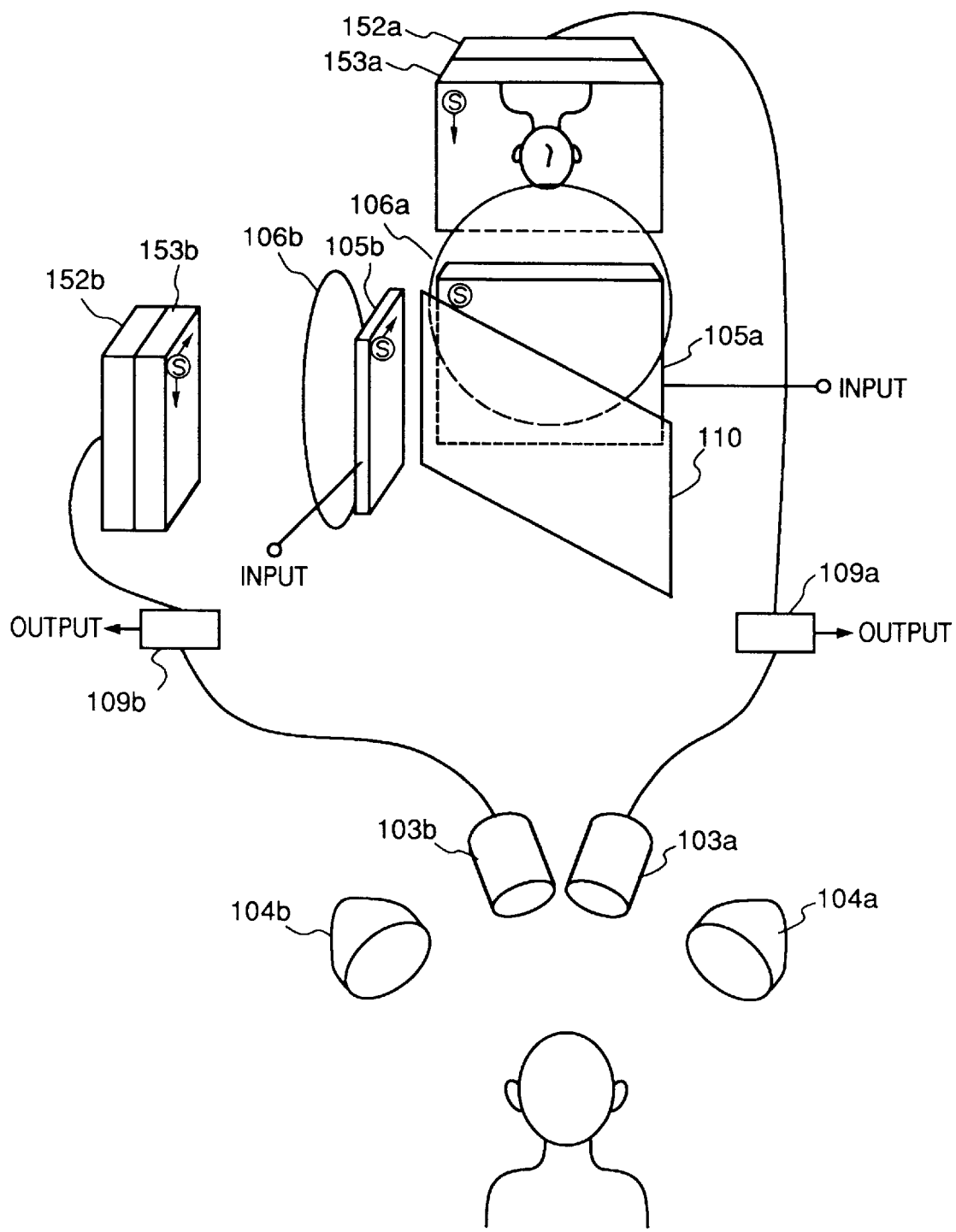
FIG. 30 is a perspective view showing the construction of a stereoscopic image communication apparatus according to a ninth embodiment of the present invention.

FIG. 30 shows the construction of a stereoscopic image communication apparatus according to a ninth embodiment of the present invention. Similar to the eighth embodiment, the ninth embodiment employs backlight control figures, however, different from the eighth embodiment, the ninth embodiment uses circularly polarizing plates between backlights and space modulators. Similar to the previous embodiments, in the apparatus according to the present embodiment comprises a plurality of displays. The displays are set "normally" unless otherwise specified.

In FIG. 30, numerals 105a and 105b denote light-transmitting type color LCD's for displaying screen images; 106a and 106b, Fresnel lenses respectively having a 150 mm focal distance, located behind the LCD's 105a and 105b; 152a and 152b, monochromatic LCD's as backlight sources, located at positions 160 mm (longer than the focal distance of the lenses 106a and 106b) distant from the lenses 106a and 106b, opposite to the LCD's 105a and 105b; 15, a half mirror for combining images displayed on the LCD's 105a and 105b; and 153a and 153b, circularly polarizing plates located in front of the LCD's 152a and 152b, for polarizing the lights from the LCD's 152a and 152b. The LCD's 152a and 152b are backlighted by light sources (not shown) such as fluorescent tubes.

The relation between illumination light sources (LED's) 104a and 104b, and cameras 103a and 103b is the same as that of the eighth embodiment, therefore, the explanation of this relation between these elements will be omitted.

Image processors 109a and 109b have the same function as that in the eighth embodiment. The LCD's 105a and 105b as image displaying means respectively display screen images of the receiving-side speaker transmitted from the receiving-side visual telephone. The images displayed on the LCD's 151a and 151b function as "backlight control figures".

Figure 31:
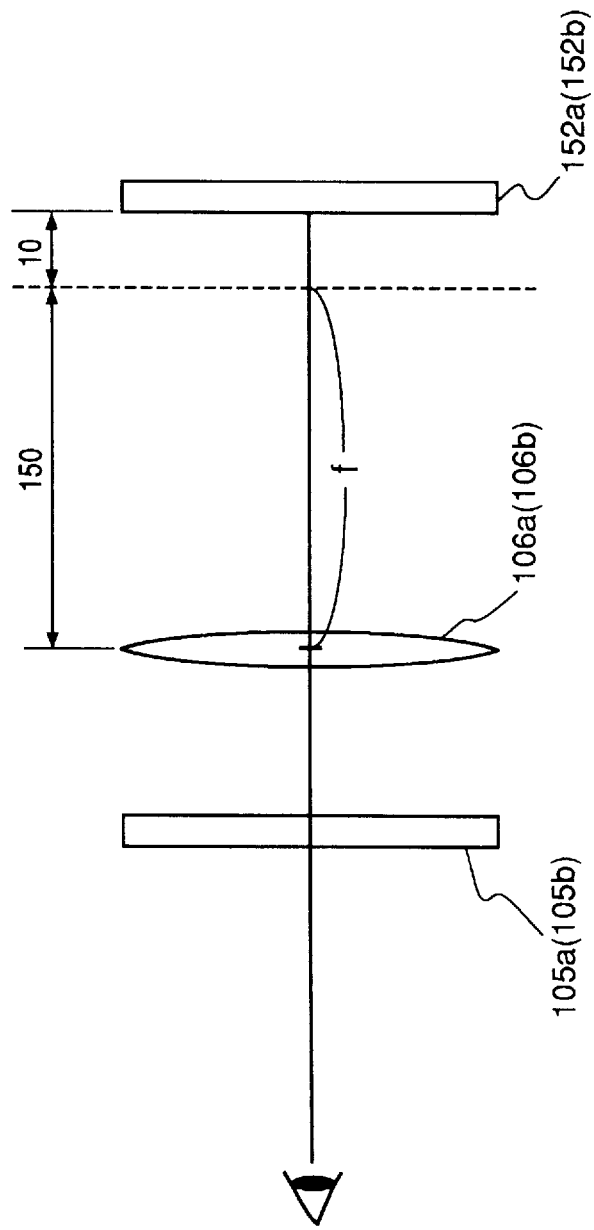
FIG. 31 is an explanatory views showing the principle of the ninth embodiment.

The operation of the Fresnel lenses 106a and 106b will be described with reference to FIG. 31. The Fresnel lens 106a (106b) is set so that the viewer sees the viewer's image displayed on the LCD 152a (152b) as a virtual image with the right eye. As shown in FIG. 31, the distance between the Fresnel lens 106a (106b) and the LCD 152a (152b) is set to be longer than the focal distance of the Fresnel lens 106a (106b), thus the image displayed on the LCD 152a (152b) is enlarged within the effective diameter of the Fresnel lens 106a only for the viewer's right (left) eye, and the light from the LCD 152a (152b) enters only the right (left) eye.

The present apparatus having the above construction operates so that the screen image (R) displayed on the LCD 105a is backlighted to be visible only to the viewer's right eye, while the screen image (L) displayed on the LCD 105b is backlighted to be visible only to the viewer's left eye. Thus, the viewer can see the screen images simultaneously and obtain stereoscopic vision. If the viewer moves, so far as the condition of illumination by the LED's is maintained, the stereoscopic vision can be continued.

Next, the operation of the circularly polarizing plates 153a and 153b will be described with reference to FIG. 32.

Figure 32:
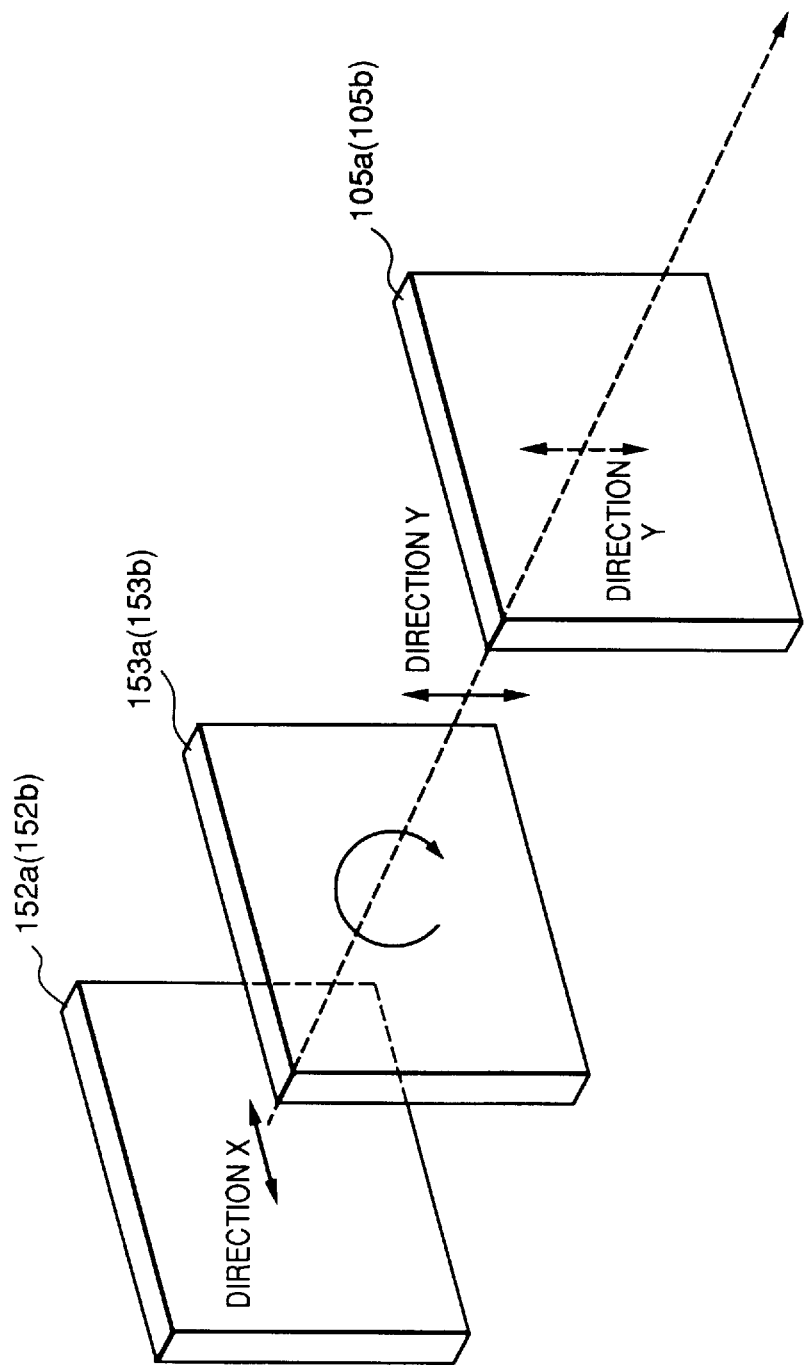
FIG. 32 is an explanatory view showing the reason for using polarized light in the ninth embodiment.

FIG. 32 shows the transmission of light from the LCD 152a (152b), where the circularly polarizing plate 153a (153b) changes the polarized direction of the light so as to correspond with the polarized-light passing characteristic of the LCD 105a (105b).

As described above, the present embodiment employs monochromatic LCD's as backlight sources for the color LCD's 105a (105b). The LCD's polarize incident light in a predetermined direction. For this reason, in this embodiment, the light from the LCD 152a (152b) is polarized in the direction X. As shown in FIG. 32, the color LCD 152a (152b) has the polarizing direction Y, therefore, the amount of light that passes through the LCD 105a (105b) is extremely reduced.

The circularly polarizing plate 153a (153b) circular-polarizes the light from the LCD 152a (152b). The circularly polarizing plate 153a (153b) is adjusted so that the polarized direction of the light from the LCD 152a (152b) approximately correspond with the polarizing direction of the LCD 105a (105b). In this manner, extreme reduction of the amount of light passing through the LCD 105a (105b) can be prevented.

According to the stereoscopic image communication apparatus according to the ninth embodiment, as the backlight control figures correspond to the right-half face and the left-half face of the viewer, if the position of the viewer moves, the backlight control figures shift corresponding to the movement of the viewer. In other words, the backlighting positions move in correspondence with the movement of the viewer, the viewer can obtain stereoscopic vision continuously. Further, the lights from the backlight source LCD's are circular-polarized, so that a predetermined amount of light can pass through the color LCD's, thus, the viewer can see bright stereoscopic images.

Displaying arrangement of screen images and control figures on the displays according to the present embodiment will be explained below.

The screen image (R) is input to the display 105a so that the image is displayed upright thereon. The upright screen image (R) enters the right eye of the viewer. The screen image (L) is input to the display 105b with inverted right to left. The inverted image is corrected by the mirror 110 to the left eye.

The right half face is displayed in a relatively left region of the display 153a. Therefore, the R control figure should be input to the display 152a with inverted only upside down. Through inversions of the figure in right to left and longitudinal directions by the lens 106a, the right control figure works as a backlight for the right eye against the movements of the viewer in a longitudinal and transverse directions.

The left control figure should be input to the display 152b with inverted not only in a longitudinal direction but in a transverse direction. In other words, the L control figure is displayed in a relatively right region of the display 152b. The L figure in the right region is reflected by the mirror 110 and thus works as control figure for the left eye.

FIG. 30 further illustrates another example of arrangement of the displays according to the present embodiment. The settings of the displays and the method of data inversion are similar to those of the ninth embodiment illustrated in FIG. 24.

<Tenth Embodiment>

Figure 33:
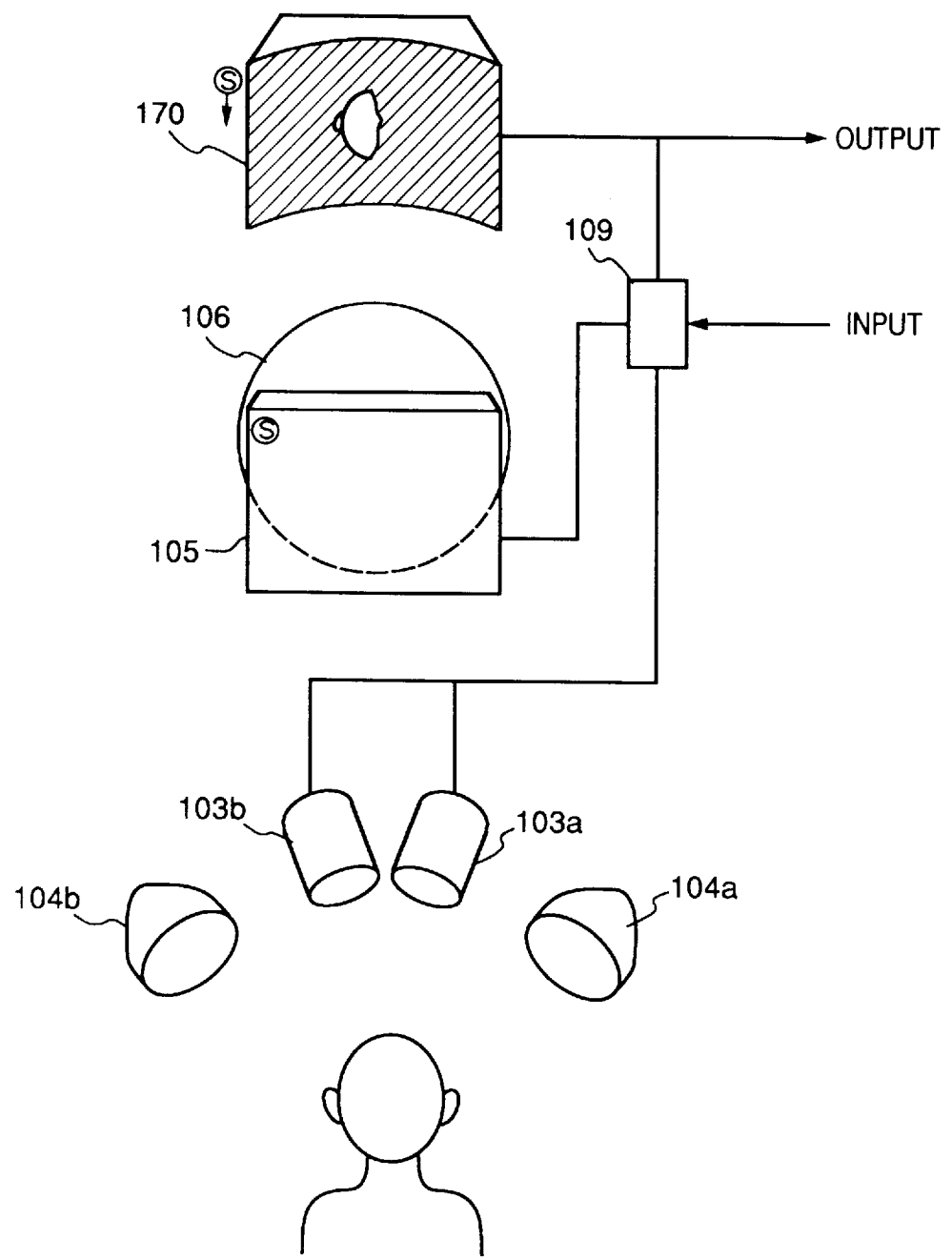
FIG. 33 is a perspective view showing the construction of a stereoscopic image communication apparatus according to a tenth embodiment of the present invention.

FIG. 33 shows the construction of a stereoscopic image communication apparatus according to a tenth embodiment of the present invention. In the apparatus of the tenth embodiment, the backlight has a warped light-emitting surface. Similar to the previous embodiments, in the apparatus according to the present embodiment comprises a plurality of displays. The displays are set "normally" unless otherwise specified.

In FIG. 33, numeral 105 denotes a light-transmitting type LCD as a space modulator; 106, a Fresnel lens as an optical device, located behind the LCD 105; and 170, a backlight as a light emitting device.

The backlight 170 has a light-emitting surface (display surface) which is warped inward. As a display device having a warped light-emitting surface, various devices such as an LCD and a CRT may be used, however, in consideration of manufacturing simplicity and costs, a light comprising optical fibers may preferably be used.

Figure 34:
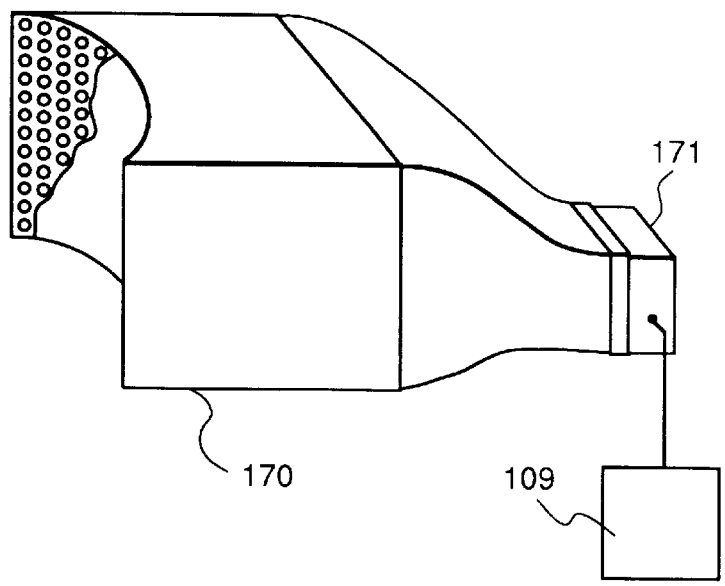
FIG. 34 is a perspective view showing the construction of a backlight device in the tenth embodiment.
Figure 35:
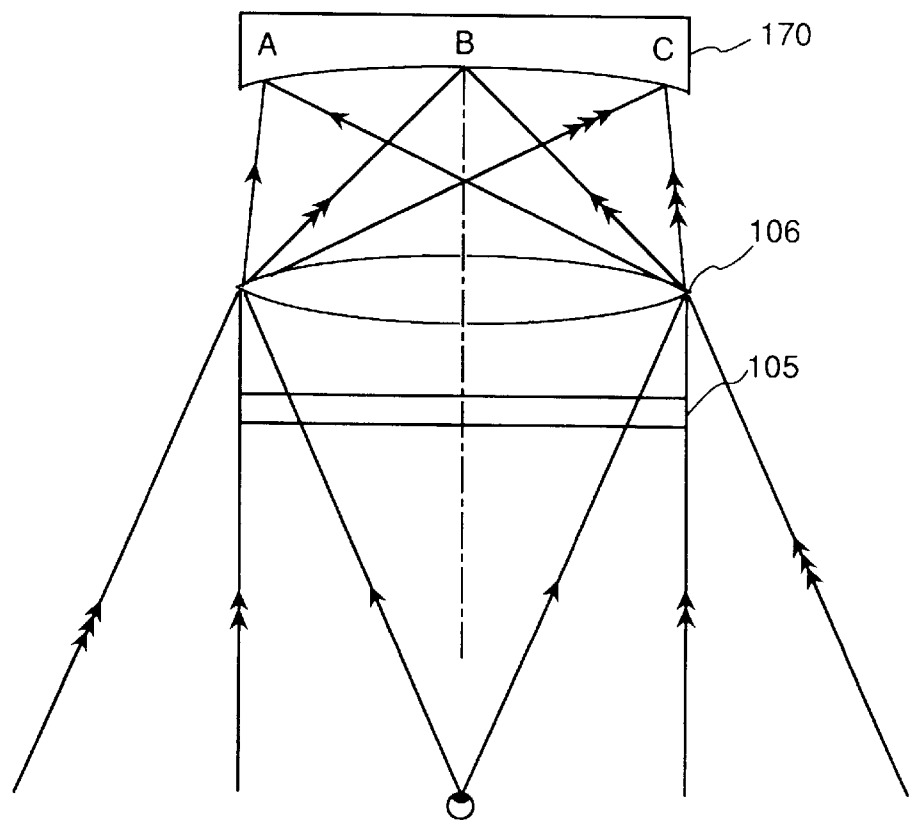
FIG. 35 illustrates the construction of the backlight device in the tenth embodiment.

FIGS. 34 and 35 receptively show the construction of the backlight 170 in the tenth embodiment. In FIG. 34, numeral 171 denotes a backlight emitting device.

Note that the backlight 170 may detect the position of the viewer using a position detecting device and display a pre-registered backlight control figure, in place of the viewer's image, at the obtained coordinate position.

FIG. 33 further illustrates another example of arrangement of the displays according to the present embodiment. The legends of indicators "ⓢ" and arrow "→" are the same as those of the first embodiment.

<Eleventh Embodiment>

Figure 36:
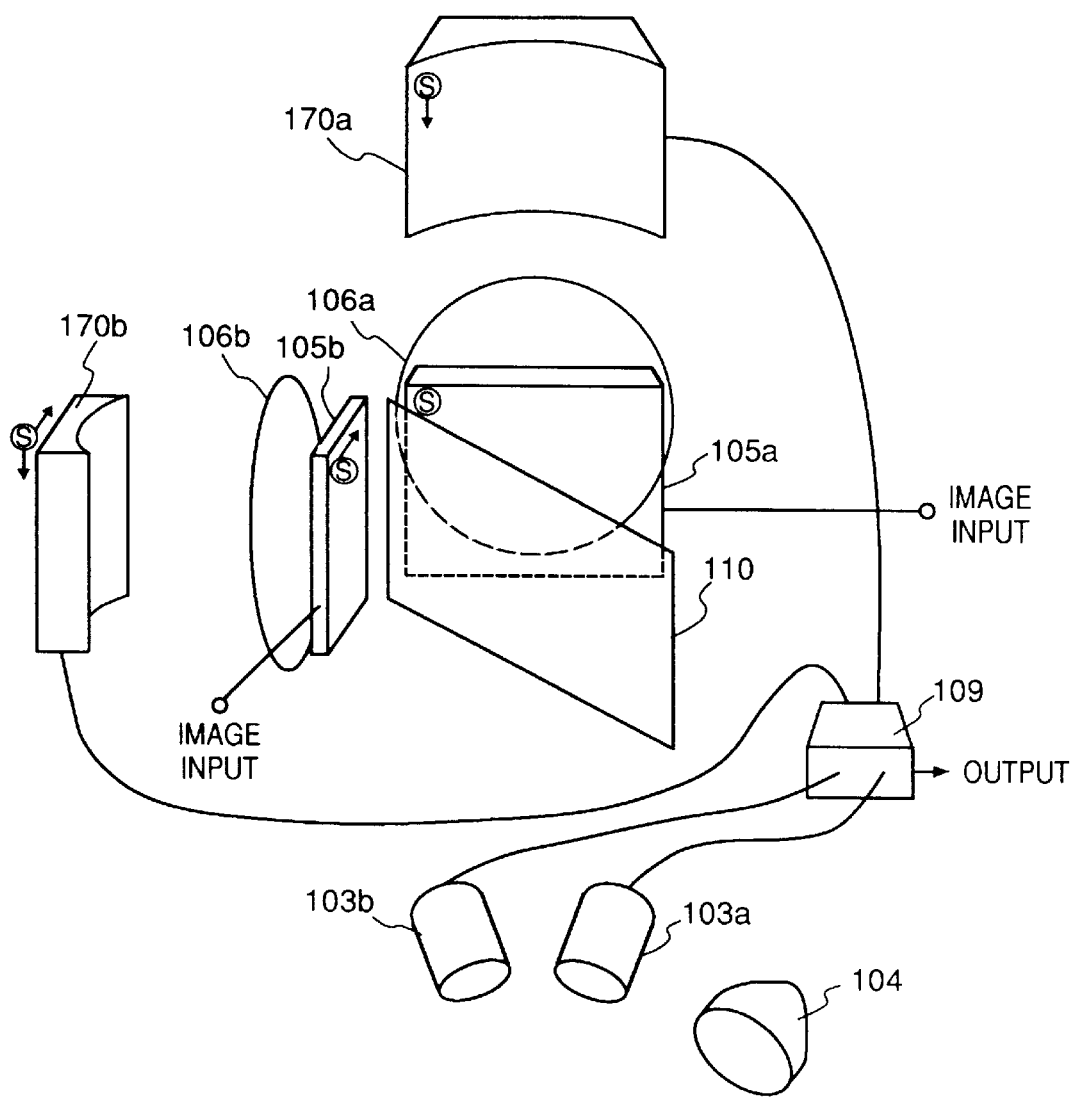
FIG. 36 shows the construction of a stereoscopic image communication apparatus according to an eleventh embodiment of the present invention.

FIG. 36 shows the construction of a stereoscopic image communication apparatus according to an eleventh embodiment of the present invention. Similar to the previous embodiments, in the apparatus according to the present embodiment comprises a plurality of displays. The displays are set "normally" unless otherwise specified.

In FIG. 36, numeral 103a and 103b denote a CCD camera as an image sensing device; 105a and 105b, light-transmitting type LCD's as space modulators; 106a and 106b, convex lenses as optical devices respectively having a 150 mm focal distance, located behind the LCD's 105a and 105b; 170a and 170b, backlighting devices having light-emitting function, located at positions 160 nm (longer than the focal distance of the lenses 106a and 106b) distant from the lenses 106a and 106b, opposite to the LCD's 105a and 105b; 104, an infrared light; 110, a half mirror as an image combining means for combining screen images displayed on the LCD's 105a and 105b; and 109, an image processor.

The operation of the stereoscopic image communication apparatus having the above construction is basically the same as that of the apparatus of the tenth embodiment, therefore, the elements corresponding to those in the tenth embodiment have the same reference numerals, the explanations of these elements will be omitted, and only the difference from the tenth embodiment will be described.

The difference from the tenth embodiment is that the tenth embodiment employs one display device for time-divisionally displaying screen images, whereas the eleventh embodiment employs two display devices for displaying screen images in parallel, and a half mirror for combining the screen images. In the eleventh embodiment, the screen image displayed on the LCD 105b and the image displayed on the backlighting device 170 are reversed in a transverse direction in advance in consideration of reflection by the half mirror 110.

Further, the tenth embodiment employs two image sensing devices to obtain viewer's images respectively corresponding to right/left half faces of the viewer as backlight control figures, whereas the eleventh embodiment employs one image sensing device (CCD camera 103a) to obtain the viewer's image corresponding to the right half face of the viewer as a backlight control figure (R). The right-half face image is negative/positive-inverted to obtain a backlight control figure (L). The backlighting device 170a displays the backlight control figure (R), while the backlighting device 170b displays the backlight control figure (L). The LCD 105a displays the screen image (R), while the LCD 105b displays the screen image (L). In this manner, the eleventh embodiment obtains the same advantage as that in the tenth embodiment. The camera 113b is used to generate a screen image for transmission.

Figure 37A:
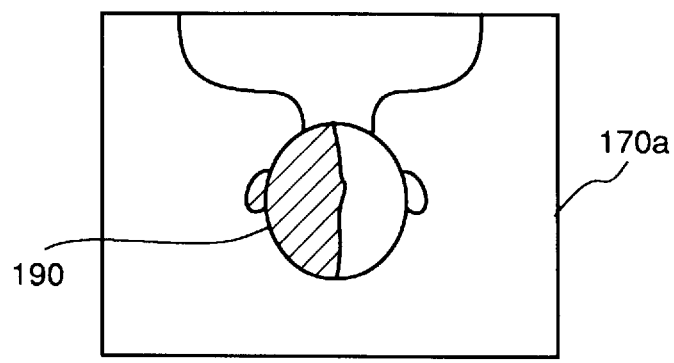
FIGS. 37A and 37B are explanatory views respectively showing a backlight control figure used in the eleventh embodiment.
Figure 37B:
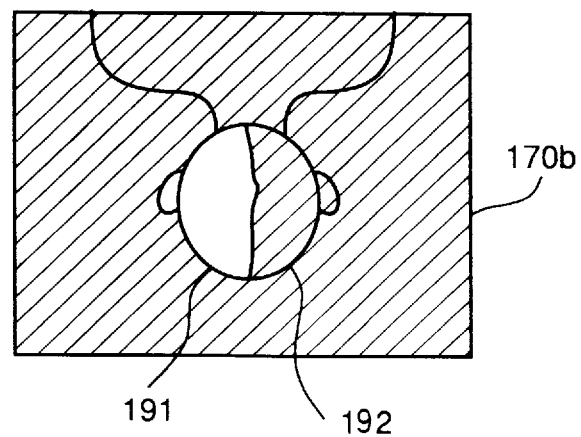

FIG. 37A shows the backlight control figure (R) displayed on the backlight 170a. FIG. 37A shows the backlight control figure (L), obtained by negative/positive inversion from the backlight control figure (R), displayed on the backlighting device 170b. In FIG. 37A, the backlighting device 170a emits light at a hatched area 190 as a light-emitting portion, on the other hand, in FIG. 37B, the backlighting device 170b does not emit light at an area 191 corresponding to the area 190 in FIG. 37A, but emits light at a hatched area 192, i.e., the whole area except a non-hatched area 191. Note that the light from the area 190 is enlarged only to the right eye by the Fresnel lens 106a, and similarly, the light from the area 192 is enlarged only to the left eye by the Fresnel lens 106b (not shown). Different from the backlight control figure (L) in the tenth embodiment, the area 192 includes an area except the viewer's image area (background area), however, the backlight control figure (L) fulfills the same function as that in the tenth embodiment, since the viewer cannot see the background area with both eyes.

Note that the visual telephones of the ninth and tenth embodiments can attain similar advantages as that in the eleventh embodiment.

FIG. 36 further illustrates another example of arrangement of the displays according to the present embodiment. The legends of indicators "(S)" and arrow "→" are the same as those of the first embodiment.

<Twelfth Embodiment>

Figure 38:
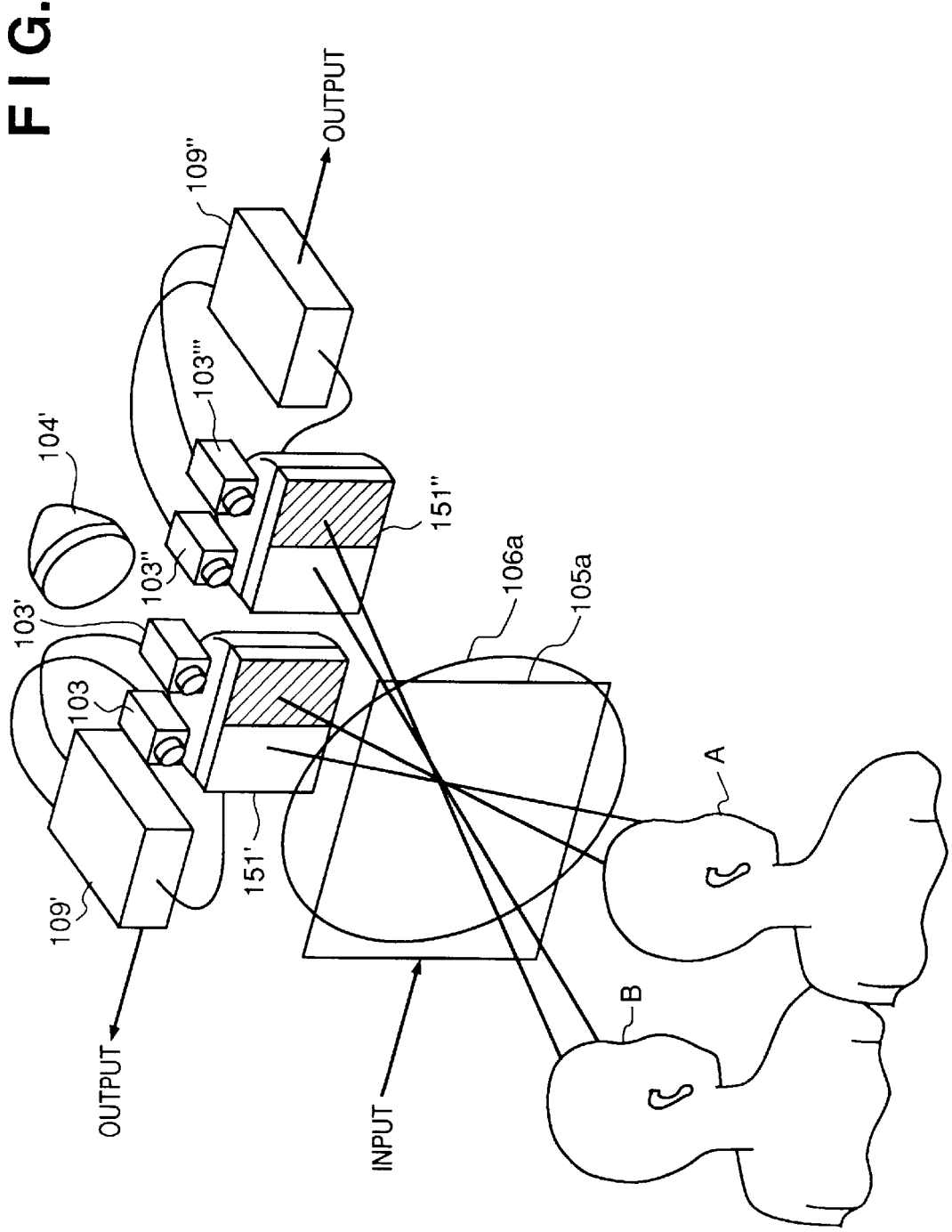
FIG. 38 shows a construction example of an image sensing device, a display control device and a backlight device in a stereoscopic image communication apparatus according to a twelfth embodiment of the present invention.

FIG. 38 shows the construction of a stereoscopic image communication apparatus as a visual telephone according to a twelfth embodiment of the present invention. Similar to the previous embodiments, in the apparatus according to the present embodiment comprises a plurality of displays. The displays are set "normally" unless otherwise specified.

In the twelfth embodiment, the visual telephone has a construction similar to that of the eighth embodiment. The twelfth embodiment employs a set of backlighting devices, a light and two cameras, for each of a plurality of viewers. Note that FIG. 38 shows only the systems for the viewers' right eyes, and omits the systems for the left eyes, for the purpose of simplicity.

In FIG. 38, numeral 104' denotes a light for irradiating a viewer A (a light for a viewer B is omitted); 151' and 151", backlighting devices comprising monochromatic CRT's respectively for the viewers A and B; 103, 103', 103" and 103''', CCD cameras for image sensing the viewers A and B. In this manner, a set of two cameras, one light and backlighting devices is provided for each viewer.

An image processor 109' detects the center of gravity in the viewer A's face from the viewer A's image obtained by the camera 103. The center of gravity corresponds to the central portion (approximately the position of the nose) of the viewer. The image processor 109' adjusts the center of gravity to the center of the display surface of the backlight 151', and drives the backlight 151' so that the left portion from the center of the display surface becomes a light-emitting (bright) portion.

In the present embodiment, the positions of the viewers A and B are respectively set within a predetermined range. As it is understood from FIG. 39, to cover the movement of the viewer in a wide rage, it is adjusted such that, in a case where the viewer stands at the center of the predetermined range, the border between an irradiated part and an unirradiated part in the face corresponds to the center of the display surface of the backlight.

Figure 39:
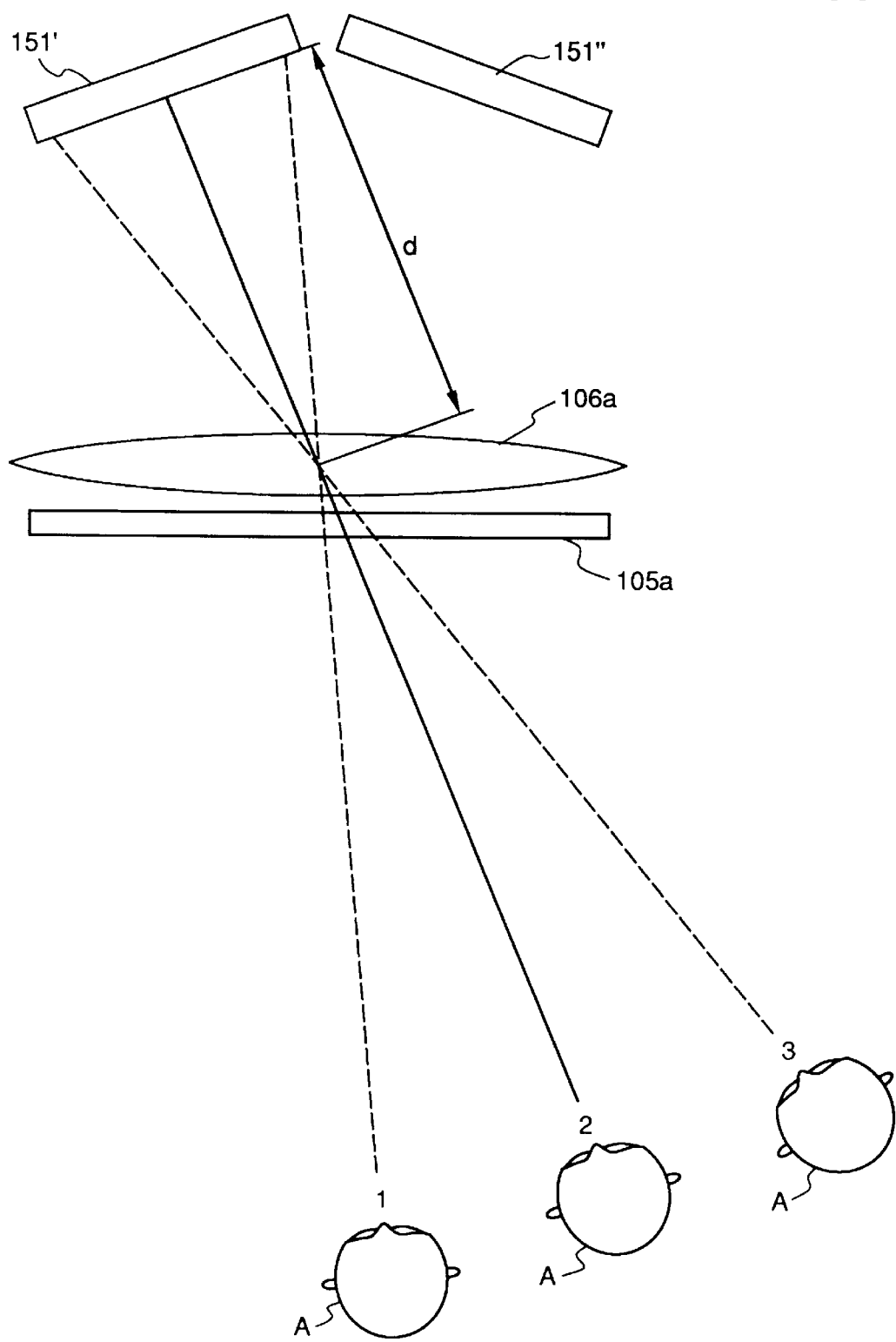
FIG. 39 is a top plan view showing the construction example of the image sensing device, the display control device and the backlight device in FIG. 38.

More specifically, in the display surface of the backlight 151' in FIG. 39, the border between the light-emitting (bright) portion and the light-blocked (dark) portion is set to the center of the display surface when the viewer A stands at a position 2. If the viewer A stands at a position 3, the viewer A sees no bright portion on the display surface. If the viewer A stands at a position 1, the viewer A sees the whole image area as the bright portion. Accordingly, the allowable moving range of the viewer A' is within the interval between the position 3 and the position 1. In this manner, the relation between the viewer's position and the backlight position is adjusted in advance, and later, the border between the bright and dark portions of the display surface of the backlight is moved corresponding to the movement of the viewer.

The CCD camera 103' which is a pair with the camera 103 is used to generate images for transmission.

Regarding the viewer B, the CCD camera 103, 103", an image processor 109" and the backlight 151" operate in the same manner as that of the camera 103, 103', the image processor 109' and the backlight 151' for the viewer A. Further, the backlights for left eye (not shown) operate in the same manner as that of the backlights 151' and 151" except that the bright portion of the display surface of the backlight for left eye is a right portion from the center of the display screen.

In this manner, the setting of the light and the backlights is made with respect to each viewer, so that the viewer's position can be obtained more exactly by each viewer.

<Thirteenth Embodiment>

Figure 40:
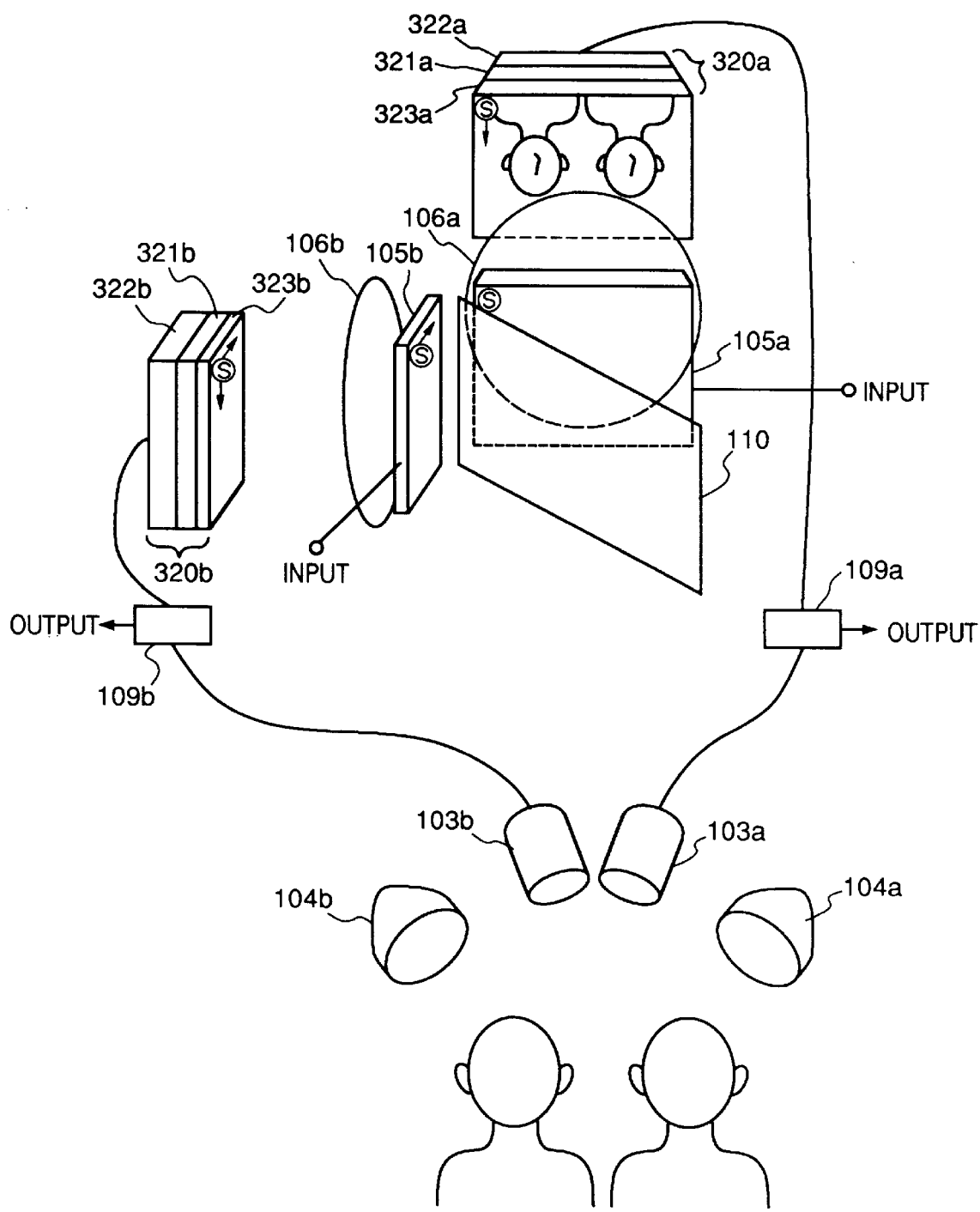
FIG. 40 shows the construction of a stereoscopic image communication apparatus according to a thirteenth embodiment of the present invention.

FIG. 40 shows the construction of a stereoscopic image communication apparatus according to a thirteenth embodiment of the present invention. The thirteenth embodiment employs an optical fiber plate in front of the display screen of a backlight. Similar to the previous embodiments, in the apparatus according to the present embodiment comprises a plurality of displays. The displays are set "normally" unless otherwise specified.

For the purpose of downsizing of the apparatus, the thirteenth embodiment employs LCD panels 320a and 320b respectively having a backlight as a light-emitting device. Specifically, the LCD panels 320a and 320b respectively comprise liquid crystal panels 321a and 321b, backlight sources 322a and 322b, and optical fiber plates 323a and 323b. The optical fiber plates 323a and 323b, respectively comprising optical fibers, are provided in front of the liquid crystal panels 321a and 321b, at positions away from the liquid crystal panels 321a and 321b by a predetermined distance.

It should be noted that an LCD device has a problem in contrast adjustment when it is employed as a backlight device. That is, the image displayed on the backlight device must have good contrast and sharpness so as to pass the backlight to one eye but at the same time block the backlight to the opposite eye.

However, in a case where the backlight device comprises a liquid crystal panel and a backlight source, the light from the backlight source includes scattered light, and the black level at a light-blocked area of the liquid crystal panel is low. As a result, the image backlighted through the liquid crystal panel cannot obtain good contrast and sharpness. This may cause crosstalk, i.e., a phenomenon that the backlight control image for one eye may be caught by the opposite eye as an image at a very low contrast level. In the present embodiment, the optical fiber plates 323a and 323b are provided to solve this problem.

FIG. 41 shows the construction of the LCD panel 320a (320b) as a light-emitting device. The optical fiber plate 323a (323b) is provided in front of a display device comprising the liquid crystal panel 321a (321b) and the backlight source 322a (322b), with a predetermined gap 324a (324b) from the display device.

The gap 324a (324b) effectively eliminates unnecessary scattered light from the display device. For this purpose, the gap is 0.1 to 1 mm. The incident light having an angle of incidence larger than a predetermined angle is reflected by the end surfaces of the optical fibers. The unnecessary scattered light cannot pass through the optical fiber plate, which improves the contras and sharpness of the displayed image.

According to the stereoscopic image communication apparatus, the following advantages are obtained.

① Stereoscopic vision can be obtained without any specific tool such as image-separating glasses.

② The optical fiber plate is provided in front of the LCD with a predetermined gap from the LCD to reflect scattered light from the LCD by the end surfaces of the optical fibers. This arrangement effectively eliminates scattered light, and enables the LCD as a light-emitting device to obtain good contrast. Thus, stereoscopic vision can be obtained without crosstalk.

③ The backlight source, based on the viewer's image obtained by the camera 103a (103b), moves in accordance with the movements of the viewer. In other words, if the viewer moves, as the backlight shifts following the movement of the viewer, stereoscopic vision can be continuously obtained.

FIG. 40 further illustrates another example of arrangement of the displays according to the present embodiment. The settings of the displays and the method of data inversion are similar to those of the ninth embodiment illustrated in FIG. 24

<Modification to Thirteenth Embodiment>

The thirteenth embodiment employs the light-transmitting type LCD as a space modulator, however, the space modulator may be any device that passes light and displays a screen image; for example, the space modulator may be a film on which an image is printed. Further, the light may be any irradiation device that emits lights of two different wavelengths within an infrared wavelength area; for example, the light may be a halogen lamp having a wavelength band filter to limit irradiation wavelength band.

Further, the lens 106a (106b) may be replaced with a concave mirror.

<Fourteenth Embodiment>

Figure 42:
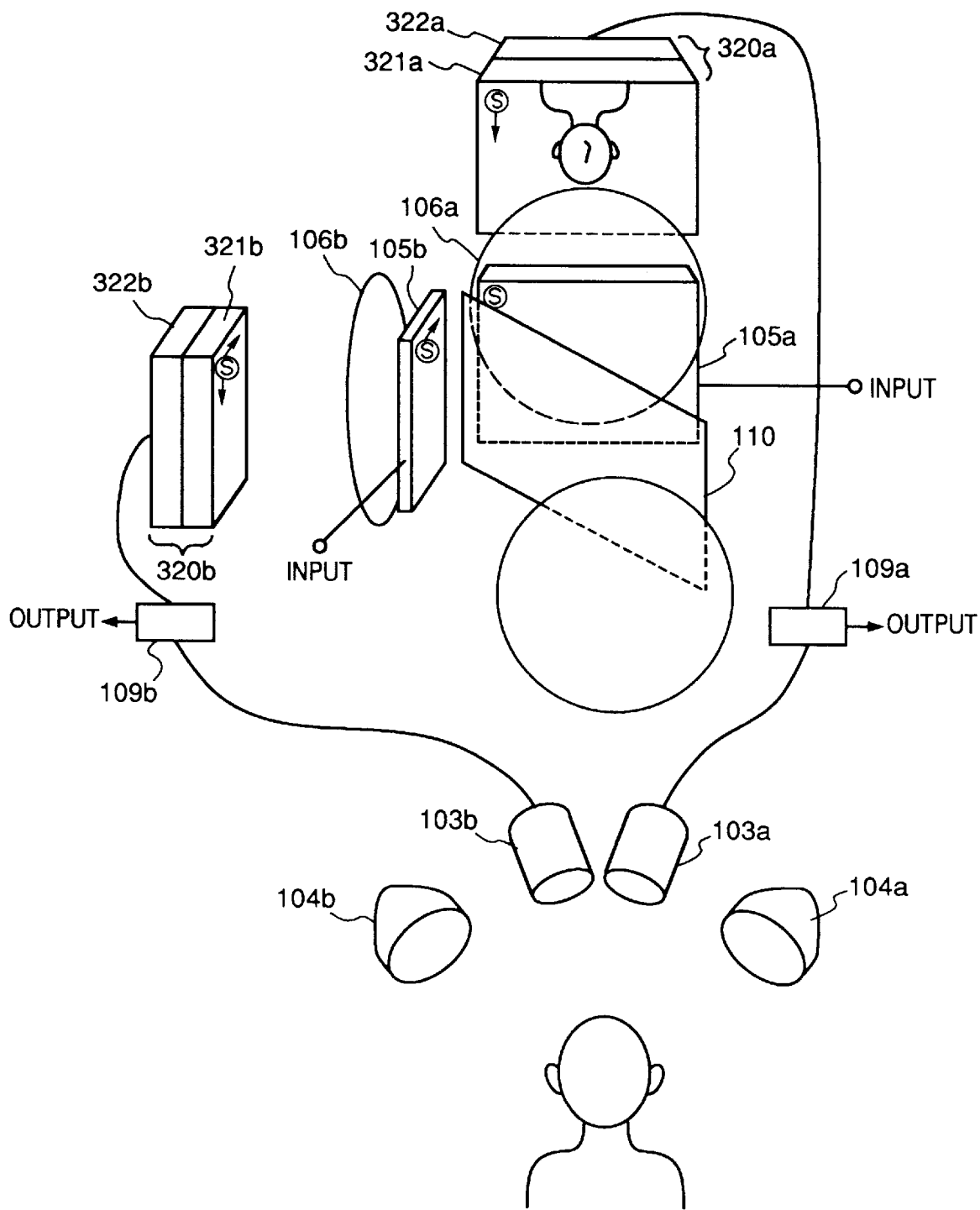
FIG. 42 shows the construction of a stereoscopic image communication apparatus according to a fourteenth embodiment of the present invention.
Figure 45:
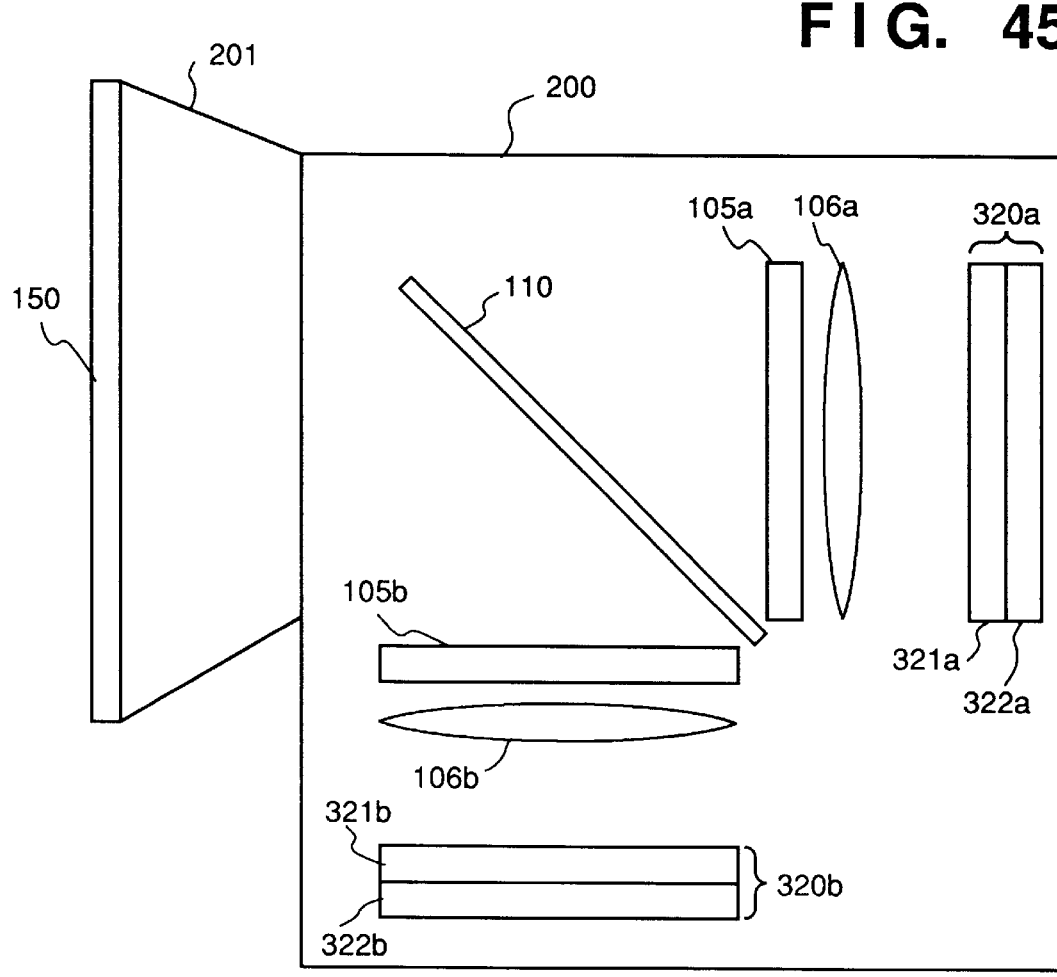
FIG. 45 illustrates a cross-sectional view of a casing 200 separately containing the stereoscopic image communication apparatus of the fourteenth embodiment and a lens group 150.
Figure 46:
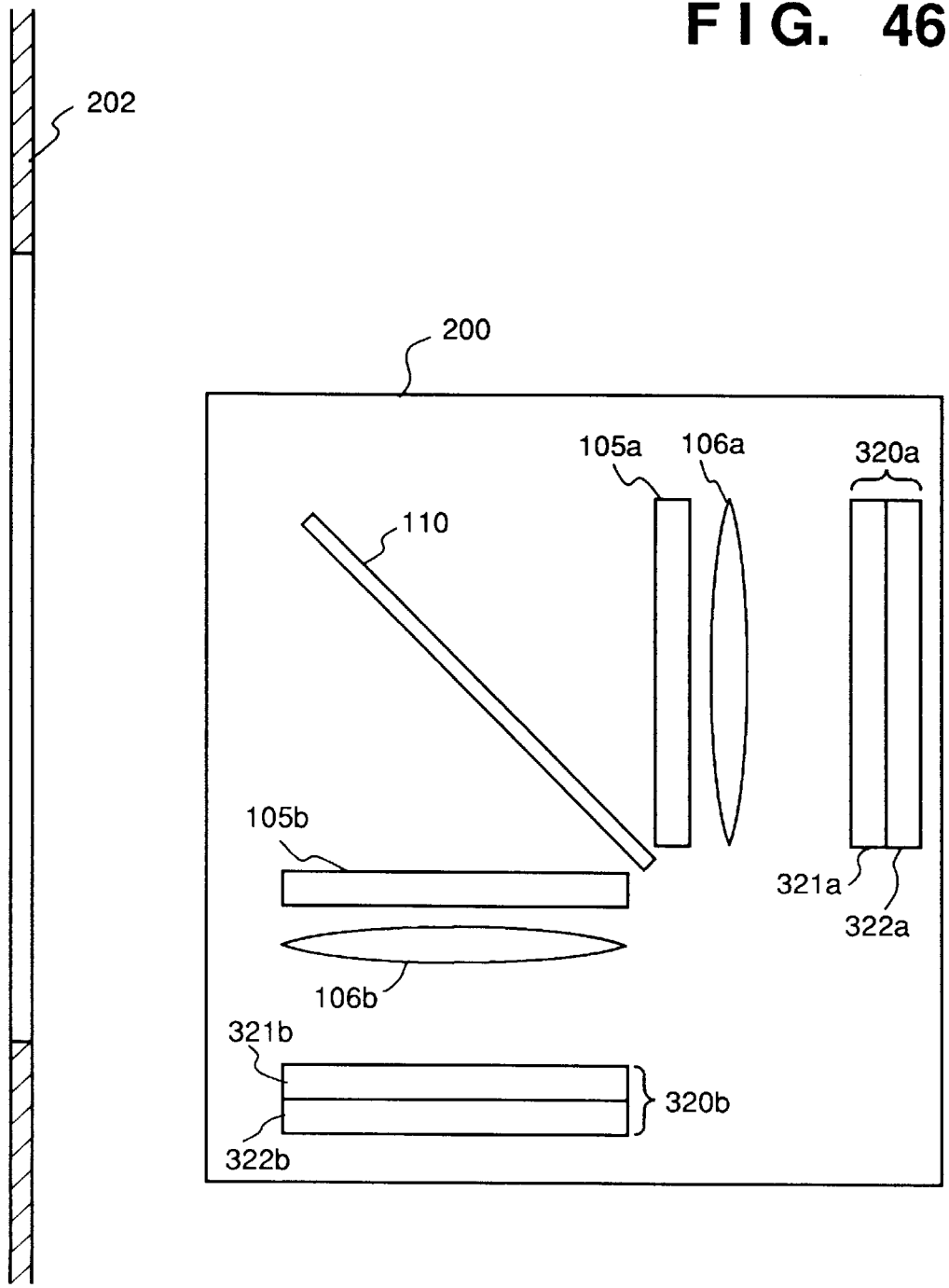
FIG. 46 illustrates a cross-sectional view of the casing 200 and the lens group 150 attached to a partition (e.g., wall) of a room to raise magnification ratio.

FIG. 42 shows the construction of a stereoscopic image communication apparatus as a visual telephone according to a fourteenth embodiment of the present invention. Similar to the eighth embodiment (FIG. 24), the fourteenth embodiment employs a magnification lens. However, different from the eighth embodiment, the fourteenth embodiment employs a casing for containing the apparatus, and as shown in FIGS. 45 and 46, the magnification lens is separately provided from the casing. Similar to the previous embodiments, in the apparatus according to the present embodiment comprises a plurality of displays. The displays are set "normally" unless otherwise specified.

In the first embodiment, as the viewer directly sees the screen image displayed on the LCD 105, this display arrangement is not suitable for enlarging/reducing the screen image. For the purpose of image enlargement/reduction, the fourteenth embodiment employs a lens group.

In FIG. 42, numeral 150 denotes a group of lenses for enlarging or reducing screen images displayed on LCD's 105a and 105b. The lens group 150 comprises the combination of convex lens(es) and concave lens(es) for image enlargement/reduction. Preferably, the lens group 150 comprises a combination lens to reduce aberration. In a case where only an enlarged image is required, the lens group 150 may comprise the combination of convex lenses, in consideration of costs.

For the purpose of downsizing of the casing for containing the stereoscopic image communication apparatus, the present embodiment employs LCD panels 320a and 320b respectively having a backlight as a light-emitting device. The LCD panels 320a and 320b comprise liquid crystal panels 321a and 321b and backlight sources 322a and 322b.

Figure 43:
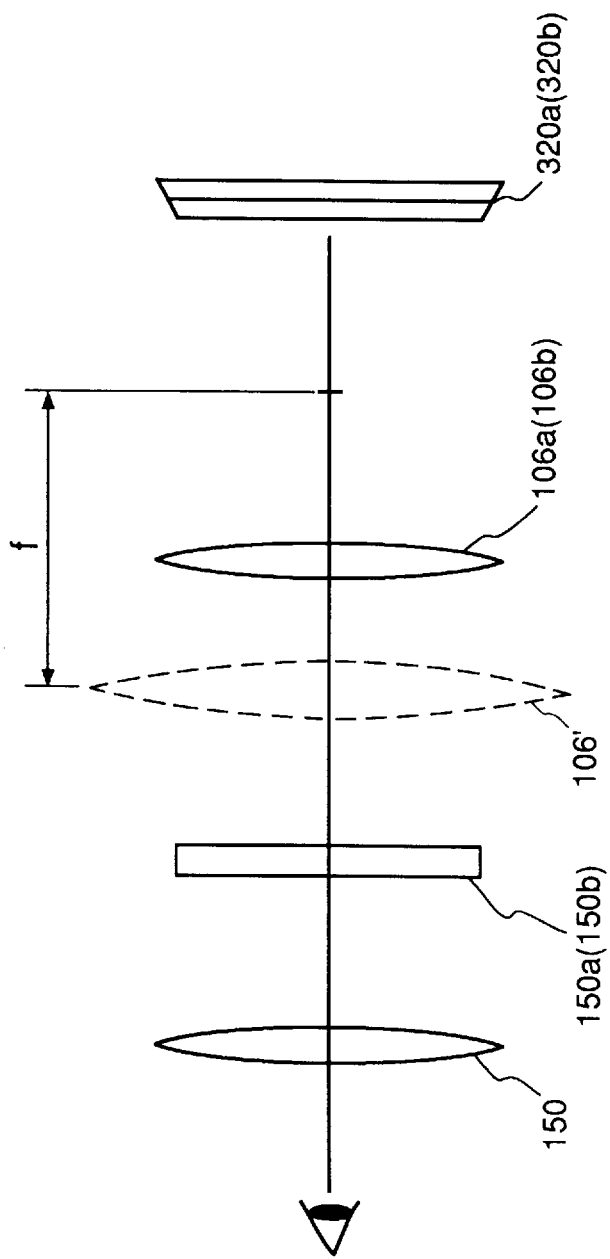
FIG. 43 is an explanatory view showing the positional relation among an optical units and an LCD panel in the fourteenth embodiment.

FIG. 43 shows the positional relation among Fresnel lens 106a (106b), the lens group 150, and the LCD panel 320a (320b). The LCD panel 320a (320b) is located without the focal distance of an imaginary lens 106' as a combination lens formed with the lens 106a (106b) with the lens group 150, so that the viewer's image displayed on the LCD panel 320a (320b) functions as a backlight control figure. On the other hand, the lens group 150 is positioned so that LCD 105a (105b) is within the focal distance of the imaginary lens 106'. Actually, to change an image enlargement/reduction ratio, the lens group 150 is used as a zoom lens, and the focal distance of the zoom lens may be changed from the outside of the apparatus. The Fresnel lens 106a (106b) reduces the thickness of the zoom lens, thus attaining downsizing of the apparatus.

Figure 44:
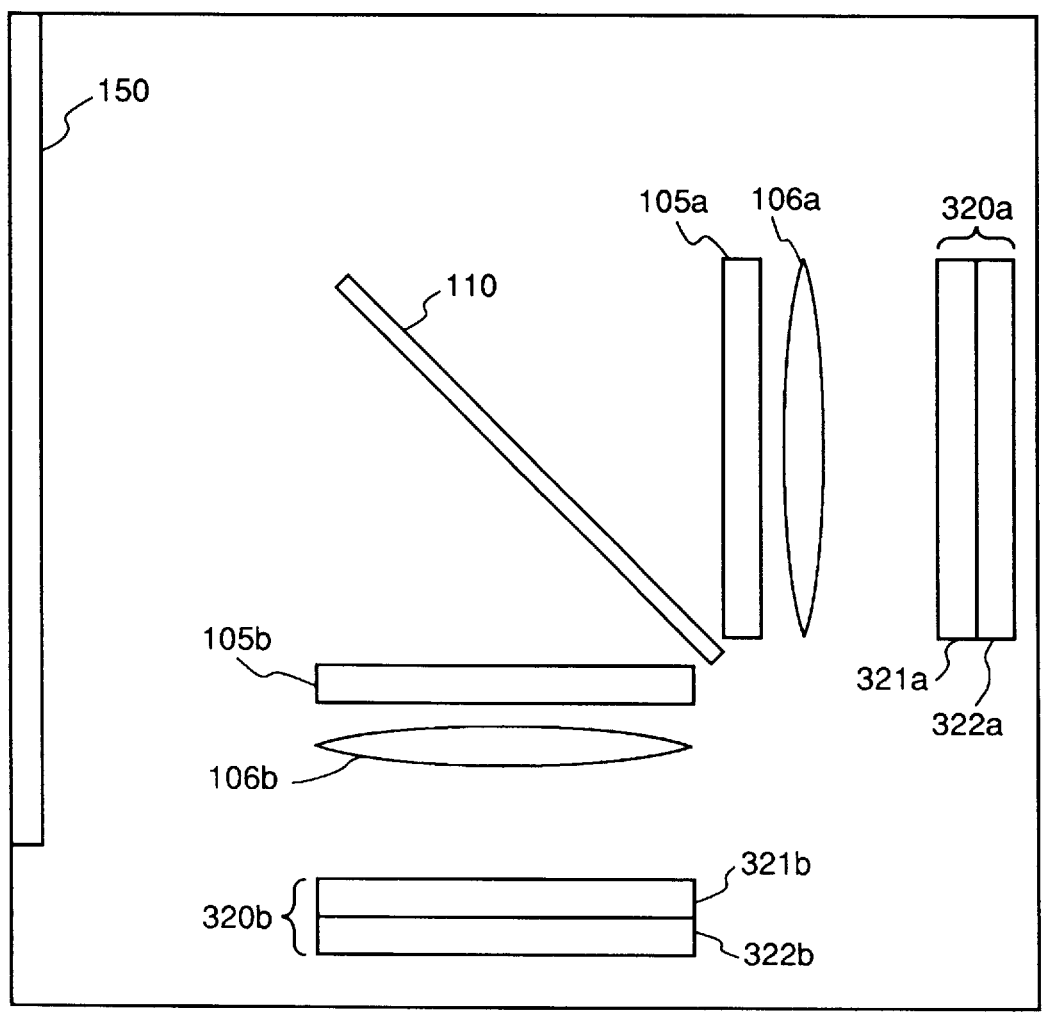
FIG. 44 illustrates a cross-sectional view of a casing containing the stereoscopic image communication apparatus of the fourteenth embodiment.

Preferably, the casing containing the above optical devices prevents extraneous light from entering the optical path and maintains the positional relation among optical the devices. FIG. 44 shows a casing containing the stereoscopic image communication apparatus. It is understood from FIG. 44 that in a case where the lens group 150 is for magnifying a screen image, as the screen size becomes larger, the size of the lens group and that of the casing become larger. In the fourteenth embodiment, to suppress enlargement of the casing size, the lens group 150 is separated from the casing.

FIG. 45 shows a casing 200 containing the stereoscopic image communication apparatus separated from the lens group 150. The lens group 150 is attached to the apparatus via a hood 201 surrounding the lens group 150. The hood 201 maintains the optical positional relation between the lens group 150 and the other optical devices, further, the hood 201 prevents extraneous light into the optical path.

This portion formed with the hood 201 and the lens group 150 is detachable from the casing 200. This arrangement reduces the size of the casing 200, and enables easy conveyance and setting of the apparatus.

FIG. 46 shows the casing 200 and the lens group 150 attached to a partition of a room (e.g., the wall) to raise the magnification ratio. In this case, to prevent extraneous light between the casing 200 and the lens group 150, the room where the casing 200 is set is preferably a darkroom.

In the present embodiment, LED's 104a and 104b and CCD cameras 103a and 103b are provided outside of the casing 200, however, these devices may be contained within the casing 200. Further, the present embodiment employs the LCD panel as a light-emitting device, for downsizing of the casing, however, the present embodiment may employ a CRT in place of the LCD panel.

According to the stereoscopic image communication apparatus according to the fourteenth embodiment having the above construction, the following advantages can be obtained.

① Stereoscopic vision can be obtained without any specific tool such as image-separating glasses.

② The screen images displayed on the LCD's can be enlarged or reduced in accordance with the viewer's purpose.

③ The lens group for image enlargement/reduction, separated from the casing, may be exchanged with another lens group in accordance with the viewer's purpose, without changing the casing. This attains flexibility upon changing the enlargement/reduction ratio.

④ The stereoscopic image communication apparatus is separated into two systems, i.e., a display driving system contained in the casing 200 and an image enlargement/reduction system (the lens group and the hood). This attains downsizing of the casing of the display driving system comprising various minute parts, thus enables easy conveyance and setting of the apparatus.

⑤ The backlight source, based on the viewer's image obtained by the cameras 103, moves in accordance with the movements of the viewer. In other words, if the viewer moves, as the backlight source moves following the movement of the viewer, stereoscopic vision can be continuously obtained.

⑥ The viewer's images are used for stereoscopic vision without depending upon the viewer's position, and are transmitted to the receiving-side apparatus as screen images.

FIG. 42 further illustrates another example of arrangement of the displays according to the present embodiment. The settings of the displays and the method of data inversion are similar to those of the ninth embodiment illustrated in FIG. 24

<Modification to Fourteenth Embodiment>

The fourteenth embodiment employs the light-transmitting type LCD as a space modulator, however, any device that passes light and displays a screen image can be used as a space modulator; for example, a film on which an image is printed may be employed. Further, the light may be any irradiation device that emits lights of two different wavelengths within an infrared wavelength area; for example, a halogen lamp having a wavelength band filter to limit irradiation wavelength band may be used.

Further, the lens 106a (106b) and the lens group 150 may be replaced with concave mirrors.

<Fifteenth Embodiment>

Figure 47:
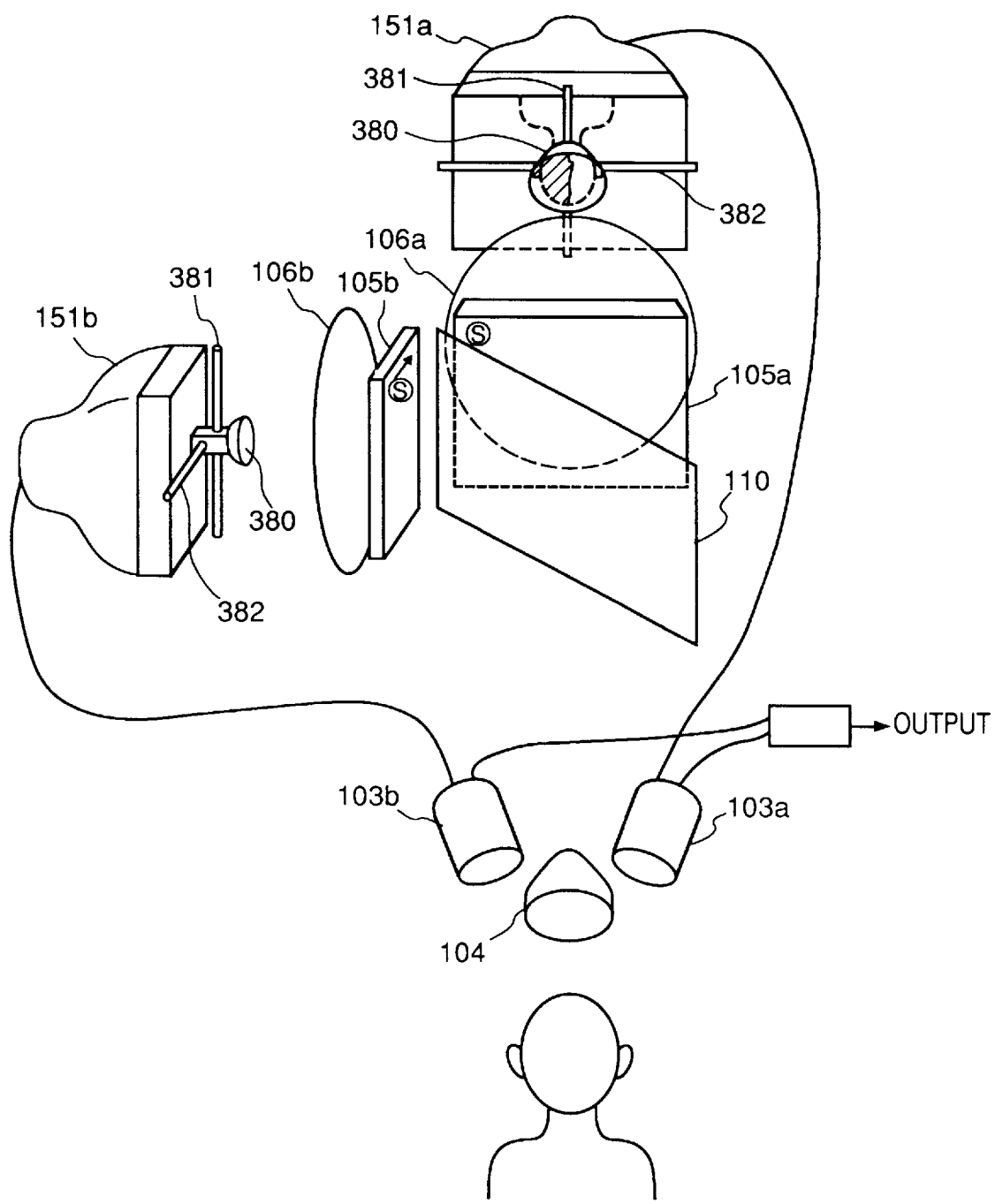
FIG. 47 shows the construction of the stereoscopic image communication apparatus of the fourteenth embodiment.

FIG. 47 shows the construction of the stereoscopic image communication apparatus as a visual telephone according to a fifteenth embodiment of the present invention. The fifteenth embodiment has a high-luminance backlight that can detect and follow the movement of viewer. Similar to the previous embodiments, in the apparatus according to the present embodiment comprises a plurality of displays. The displays are set "normally" unless otherwise specified.

In the embodiments that utilize backlight technique, the apparatus displays backlight control figures on CRT's or LCD's. However, such light devices cannot produce high luminance light. Further, as the backlight control figures are similar to the shape of viewer's face, thus, crosstalk occurs. The backlight control figures of the fifteenth embodiment are of ideal shape for stereoscopic vision by using a high luminance lamp having a shape suitable for human eye.

In FIG. 47, reference numerals 105a and 105b denote light-transmitting type LCD's as space modulators; 106a and 106b, Fresnel lenses respectively having a 150 mm focal distance, located behind the LCD's 105a and 105b; 151a and 151b, monochromatic CRT's as light-emitting image display devices for displaying viewer's images, located at positions 160 mm (longer than the focal distance of the lenses 106a and 106b) distant from the lenses 106a and 106b, opposite to the CRT's 105a and 105b; 104, an LED for emitting light of 850 nm wavelength as an irradiation device; 103, CCD cameras as an image sensing device; 110, a half mirror for combining screen images displayed on the CRT's 105a and 105b; and 380, light sources located at the intersection of a horizontal shaft 382 and a vertical shaft 381 on the display screen of the CRT's 151a and 151b.

The feature of the stereoscopic image communication apparatus having the above construction is as follows; one of the cameras 103 obtains the viewer's front image and displays the image on the CRT's 151a and 151b, and the light source 380 on the CRT 151a emits light at the right-half portion of the image as backlight to the viewer's right eye, and the light source 380 on the CRT 151b emits light at the left-half portion of the image as backlight to the viewer's left eye. In this case, the apparatus requires only one light 104 and only one of the cameras 103 in order to generate the backlight control figure. The other one of the camera 103 is used for capture of screen image of the viewer for transmission.

Figure 48:
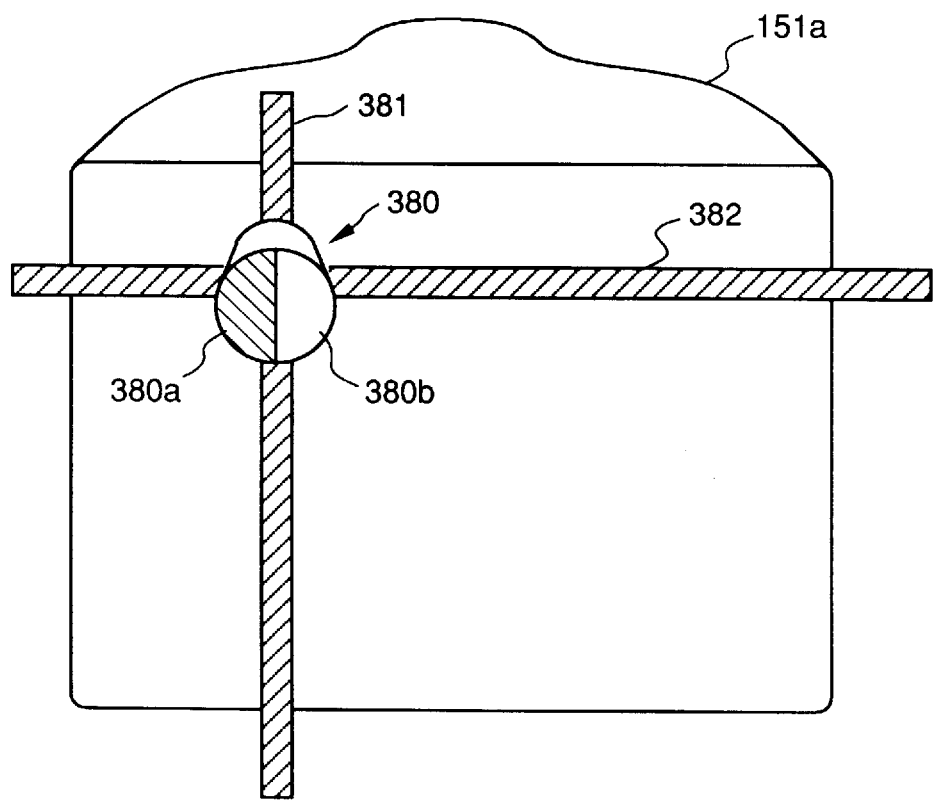
FIG. 48 is a front view showing a construction example of a backlight device in a fifteenth embodiment.

FIG. 48 shows the construction of the backlight of the present embodiment. Note that FIG. 48 only shows the light source for right eye on the CRT 151a.

In FIG. 48, the CRT 151a displays the viewer's image from the camera 103. The light source 380 comprising a high-luminance lamp such as an LED is provided in front of the CRT 151a. The light source 380 is located at the intersection of the horizontal shaft 382 and the vertical shaft 381 so as to move following the movement of the viewer's image displayed on the CRT 151a. The movement of the light source 380 is attained by various techniques used e.g. in an XY plotter. In this example, screw grooves are formed on the shafts 381 and 382, and the light source 380, having screw groove engaged with the screw grooves on the shafts, is moved by the rotation of the shafts 381 and 382. The light source 380 emits light at the left-half portion 380a and does not emit light at the right-half portion 380b. The light-emitting portion corresponds to the right-half face area of the viewer's image turned upside down. Accordingly, the light source for left eye (not shown) emits light at the right-half portion and does not emit light at the left-half portion.

The movement of the viewer's image on the CRT 151a is followed in the two procedures as follows.

Figure 49:
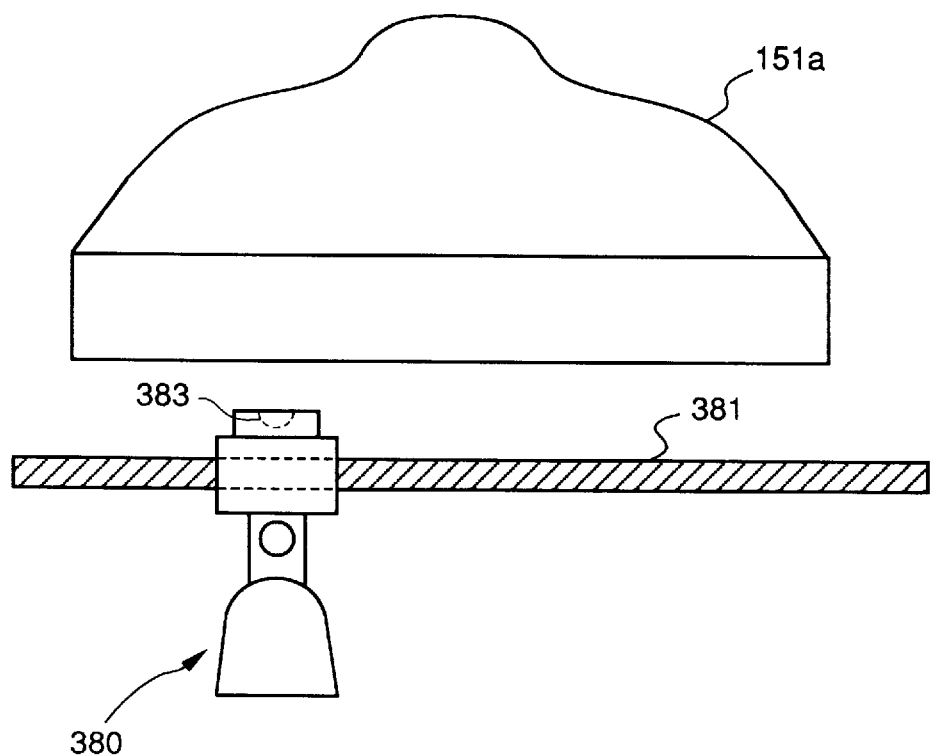
FIG. 49 is a top plan view showing the construction of the backlight device in FIG. 48.

First, the movement of the viewer's image displayed on the CRT 151a is detected. As shown in FIG. 49, the light source 380 has a light point tracking sensor 383, having e.g. nine light sensors as shown in FIG. 50, on its CRT 151a side. In FIG. 50, the light sensor comprising nine light point sensors detect the movement of light points on the display surface in eight directions.

Next, the light source 380 moves on the shafts 381 and 382 in accordance with the detected directions, thus follows the movement of the light points, namely the movement of viewer.

Figure 52:
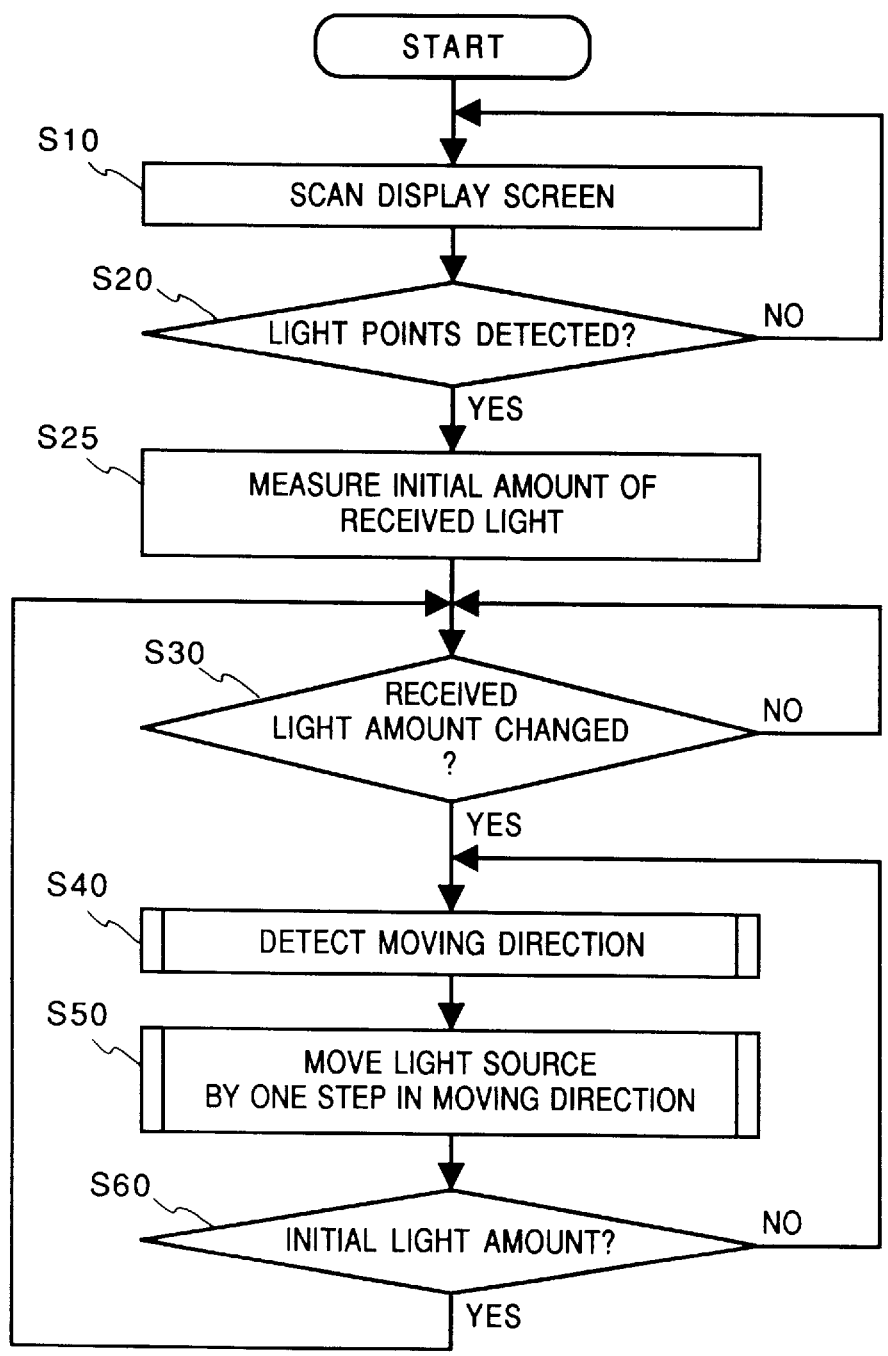
FIG. 52 is a flowchart showing light-point tracking control procedure according to the fifteenth embodiment.

The light-point tracking control procedure will be described with reference to the flowchart of FIG. 52.

In step S10, in the initial operation of the light point tracking sensor, the display screen of the CRT 151a is scanned in the horizontal and vertical directions. In step S20, whether or not light points have been detected is determined. If YES, the initial amounts of the received light at the nine light point sensors is measured in step S25, then in step S30, whether or not the light points have moved is determined from the change of the light amounts. If NO, the position of the light source 380 is maintained. The movement of the image is determined, e.g., by detecting one of the light point sensors where the received light amount has been reducers to a predetermined level or lower. To determine the movement of the image more accurately, the number of light point sensors may be increased and the change of the sensed light amounts may be detected.

If it is determined that the light points have moved in correspondence with the movement of the viewer, the process proceeds to step S40, in which the moving direction is detected. The detection of the moving direction is made, e.g., by determining a direction opposite to the direction from the central light point sensor to a light point sensor where received light amount has changed to the lowest level among the nine sensors (see FIG. 51). As the moving direction of the image is determined, the light source 380 is moved by one step in the direction determined in step S50. Note that the "one step" may be, e.g., the half of the distance between the central light point sensor to each peripheral sensor in FIG. 50. Note that in step S50, if the moving step of the light source 380 is divided into a normal moving step and a minute moving step, more accurate movement can be attained.

In step S60, whether or not the received light amount is of the initial level at all the light point sensors is determined. If YES, the process returns to step S30, while if NO, the process returns to step S40 to continue the light-point tracking operation.

Note that FIG. 48 shows the construction in case of one viewer, however, although the construction becomes complicated, the light source and the moving mechanism may be increased for a plurality of viewers.

FIG. 47 further illustrates another example of arrangement of the displays according to the present embodiment. The legends of indicators "(s)" and arrow "→" are the same as those of the first embodiment.

<Sixteenth Embodiment>

Next, a stereoscopic image communication apparatus according to a sixteenth embodiment of the present invention, applied to a teleconference system as the seventh embodiment will be described. Similar to the previous embodiments, in the apparatus according to the present embodiment comprises a plurality of displays. The displays are set "normally" unless otherwise specified.

The stereoscopic image communication apparatus of the sixteenth embodiment has the same construction as that of the seventh embodiment except that the sixteenth embodiment employs a plurality of LED's as irradiation devices with parabola mirrors to improve directivity of the lights to the viewers. Accordingly, the following description will be made in accordance with the construction shown in FIG. 21.

FIG. 53 shows irradiation state where the LED 104 irradiates the right half faces of viewers 16 and 17. If the viewers 16 and 17 stand at positions as shown in FIG. 53 to obtain stereoscopic vision, the viewer 17 is irradiated under proper irradiation condition, however, the viewer 16 is not irradiated under proper irradiation condition. The viewer 1t is irradiated at a portion greater than the half-face area, i.e., the irradiated portion extends into the left-half face area. In this irradiation state, the backlight for the viewer's right eye is enlarged inappropriately, which may cause the left eye to see a screen image (R). Contrary, if the irradiated portion is too small, the viewer's right eye cannot see the screen image (R). Further, if the viewer 17 moves to the viewer 16's position, similar problems may occur.

To solve the above problems, the present embodiment employs a plurality of irradiation devices to irradiate viewers under proper irradiation condition. FIG. 54 shows irradiation state according to the present embodiment, where a plurality of LED's irradiate the viewers respectively. In this manner, the viewers 16 and 17 are irradiated correctly at the right half face.

Preferably, the irradiation ranges of the LED's do not overlap with each other, as shown in FIGS. 53 and 54. More specifically, the LED for the viewer 16 have directivity of a certain degree not to irradiate the viewer 17.

FIG. 55 shows the construction of the irradiation device of the present embodiment. The LED has directivity by comprising a parabola mirror 1200. Thus, the sixteenth embodiment can provide appropriate irradiation for a plurality of viewers in a wide range, by employing such irradiation devices having different irradiation ranges. In FIG. 55, numeral 1201 denotes a lamp as a light source.

According to the stereoscopic image communication apparatus, even if a viewer moves in a wide range, or even if there are a plurality of viewers within a wide range, each of the viewers can he irradiated under proper irradiation condition. Thus, the apparatus always obtains viewer's images as backlight control figures from each viewer. This provides stereoscopic vision to the viewers at positions in a wide range.

Further, to enlarge or reduce the screen images on the LCD's 105a and 105b, a group of lenses for image enlargement/reduction may be provided between the half mirror 110 and the viewers. For the purpose of image enlargement/reduction, the lens group comprises convex lens(es) and concave lens(es). To reduce aberration, the lens group is preferably a combination lens. Further, to obtain only enlarged screen images, the lens group preferably comprise convex lenses.

In addition, the parabola mirror may have a coating layer having wavelength selectivity on the reflecting surface. In this case, one common irradiation device may be used for a plurality of viewers. This enables easy maintainability. Note that the wavelength-selecting coating has a reflecting characteristic as shown in FIG. 26.

It should be noted that in the first to sixteenth embodiments, the screen images are displayed turned in longitudinal and transverse directions on CRT's or LCD's, while the control figures (including backlight control figures, transmission control figures and polarization control figures) are displayed only in the longitudinal direction. Because the screen images are turned and seen through an optical device which has directivity, they should be turned in the longitudinal and transverse directions. However, the control figures functions to track the movement of viewer, thus the rotation of the figures is necessary only in the longitudinal direction.

As described above, according to the embodiments, the present invention provides a stereoscopic image communication apparatus that displays a screen image for right eye and a screen image for left eye in such manner that the user can obtain stereoscopic vision without using any tool for separating screen images for right and left eyes such as image separating glasses.

Further, the present invention provides a stereoscopic image communication apparatus that enables a plurality of viewers to obtain stereoscopic vision simultaneously, and further enables the viewers to obtain stereoscopic vision under the same condition, even if the viewers move from the initial positions.

In the above embodiments, the stereoscopic image communication apparatus uses the image sensing device for obtaining screen images to be transmitted to the receiving-side apparatus, and uses the same image sensing device for obtaining images to control light from screen images to the right and left eyes of the viewer. This simplifies the construction of the apparatus for various practical uses.

Furthermore, the mirrors may be substituted by any type of beam splitters.

The present invention is not limited to the above embodiments and various changes and modifications can be made within the spirit and scope of the present invention. Therefore, to appraise the public of the scope of the present invention, the following claims are made.

What is claimed is:

1. An image communication apparatus which shows a viewer a first image and a second image different from the first image, while transmitting an image of the viewer to outside, said apparatus having:

at least one image display means for displaying at least one of the first and second images; and light guide means for selectively distributing the first and second images to the right eye and the left eye of the viewer, said image display means comprising:

image sensing means for image-sensing the viewer to obtain the viewer's image;

transmission means for transmitting the image of the viewer obtained by said image sensing means to the outside so that the viewer's image can be used at the outside of said apparatus; and generation means for generating at least one figure indicative of a position of one of the right eye and a position of the left eye of the viewer, based on the viewer's image obtained by said image sensing means, wherein said light guide means selectively separates the first and second images based on the figure generated by said generation means, and guides the separated images to the right and left eyes of the viewer.

2. The apparatus according to claim 1, further comprising input means for inputting the first and second images from the outside of said apparatus to said image display means.

3. The apparatus according to claim 2, wherein said transmission means transmits the viewer's image in the form of a television signal, and wherein said input means inputs the first and second images in the form of a television signal from the outside of said apparatus.

4. The apparatus according to claim 1, wherein the figure is an image of the viewer's face.

5. The apparatus according to claim 1, wherein the figure has a predetermined shape generated from the image of the viewer's face.

6. The apparatus according to claim 1, wherein said image displays means has a space modulating device.

7. The apparatus according to claim 6, wherein the space modulating device has a liquid crystal display device.

8. The apparatus according to claim 1, wherein said image sensing means has an irradiation device for emitting infrared light and an image sensing device sensitive to the infrared light.

9. The apparatus according to claim 1, wherein said light guide means comprises:

a display unit for displaying the figure generated by said generation means on a display surface thereof and emitting light only at a portion of the display screen where the figure is displayed; and an optical device having directivity for introducing light from the figure displayed on the display unit into the right eye or the left eye of the viewer.

10. The apparatus according to claim 9, wherein the display unit has a backlight source for irradiating the display surface from the rear of the display surface.

11. The apparatus according to claim 9, wherein said image display means has one display surface for displaying the first and second images in a time-divisional manner, said image sensing means obtains an image corresponding to the right half face of the viewer and an image corresponding to the left half face of the viewer, and said generation means generates a figure for the viewer's right eye and a figure for the viewer's left eye based on one of the image corresponding to the viewer's right half face and the image corresponding to the viewer's left half face, and the display unit displays the figure for the viewer's right eye and the figure for the viewer's left eye in time-divisional manner, in synchronization with display of the first and second images by said image display means.

12. The apparatus according to claim 9, wherein said image display means has one display surface for displaying the first and second images in a time-divisional manner, said image sensing means obtains an image corresponding to the right half face of the viewer and an image corresponding to the left half face of the viewer, said generation means generates a figure for the viewer's right eye and a figure for the viewer's left eye based on the image corresponding to the viewer's right half face and the image corresponding to the viewer's left half face respectively, and the display unit displays the figure for the viewer's right eye and the figure for the viewer's left eye in time-divisional manner, in synchronization with display of the first and second images by said image display means.

13. The apparatus according to claim 9, further comprising combining means for combining two images by bringing two optical paths of the images into one optical path, wherein said image display means has a first display device and a second display device for displaying the first and second images respectively, said generation means generates a first figure indicative of a position of the viewer's right eye and a second figure indicative of a position of the viewer's left eye based on the viewer's image obtained by said image sensing means, the display unit has a third display device and a fourth display device for displaying the first and second figures respectively, and said combining means brings first light, from a light-emitting area of the first figure on the third display device, that passes through a portion where the first image is displayed on the first display device, and second light, from a light-emitting area of the second figure on the fourth display device, that passes through a portion where the second image is displayed on the second display device, into one optical path.

14. The apparatus according to claim 13, wherein said combining means is a half mirror.

15. The image display apparatus according to claim 14, wherein said combining means comprises a beam splitter.

16. The apparatus according to claim 13, wherein said combining means is a beam splitter.

17. The apparatus according to claim 9, wherein the optical device a lens or a concave mirror.

18. The apparatus according to claim 1, wherein said light guide means comprises:

a space modulating device for displaying the figure generated by said generation means as an image transmission area; and an optical device having directivity for introducing light from the image transmission area on the space modulating device into one of the viewer's right eye or the viewer's left eye.

19. The apparatus according to claim 18, wherein said image display means has one display surface for displaying the first and second images in a time-divisional manner, said image sensing means obtains an image corresponding to the right half face or the left half face of the viewer, said generation means generates a figure for the viewer's right eye and a figure for the viewer's left eye based on the obtained image corresponding to the viewer's right half face or the viewer's left half face, and wherein the space modulating device displays the figure for the viewer's right eye and the figure for the viewer's left eye in time-divisional manner, in synchronization with display of the first and second images by said image display means.

20. The apparatus according to claim 18, wherein said image display means has one display surface for displaying the first and second images in a time-divisional manner, said image sensing means obtains an image corresponding to the right half face of the viewer and an image corresponding to the left half face of the viewer, said generation means generates a figure for the viewer's right eye and a figure for the viewer's left eye based on the image corresponding to the viewer's right half face and the image corresponding to the viewer's left half face, and the space modulating device displays the figure for the viewer's right eye and the figure for the viewer's left eye in time-divisional manner, in synchronization with display of the first and second images by said image display means.

21. The apparatus according to claim 18, further comprising combining means for combining two images by bringing two optical paths of the images into one optical path, wherein said image display means has a first display device and a second display device for displaying the first and second images simultaneously, said generation means generates a first figure indicative of a position of the viewer's right eye and a second figure indicative of a position of the viewer's left eye based on the viewer's image obtained by said image sensing means, the space modulating device has a third display device and a fourth display device for displaying the first and second figures as image transmission areas, and said combining means brings first light, from the first image on the first display device, that passes through the first figure as an image transmission area on the third display device, and second light, from the second image on the second display device, that passes through the second figure as an image transmission area on the fourth display device, into one optical path.

22. The apparatus according to claim 21, wherein said combining means is a half mirror.

23. The apparatus according to claim 21, wherein said combining means is a screen.

24. The apparatus according to claim 18, wherein said image display means has a first display device for displaying the first image and emitting first polarized light and a second display device for displaying the second image and emitting second polarized light different from the first polarized light, and wherein the space modulating device has a first image transmission area for passing only the first polarized light and a second image transmission area for passing only the second polarized light.

25. The apparatus according to claim 24, wherein the polarized direction of the first polarized light and the polarized direction of the second polarized light are orthogonal to each other.

26. The apparatus according to claim 24, wherein the space modulating device include:

a light-transmitting type display device for displaying an image; and a polarizing plate, provided on one surface of the display device, the polarizing plate having polarizing direction parallel to one of the polarized direction of the first polarized light and the polarized direction of the second polarized light.

27. The apparatus according to claim 24, wherein the display device is a light-transmitting type monochromatic liquid crystal display device, and when a voltage is applied to the display device, the display device passes one of the first and second polarized lights, while when no voltage is applied to the display device, the display device passes one of the first and second polarized lights, different from the polarized light passed when the voltage is applied to the display device.

28. The image display apparatus according to claim 24, wherein said combining means comprises a beam splitter.

29. The apparatus according to claim 18, wherein the optical device is a lens or a concave mirror.

* * * * *

UNITED STATES PATENT AND TRADEMARK OFFICE
CERTIFICATE OF CORRECTION

PATENT NO. : 5,818,399

DATED : October 6, 1998

INVENTOR(S) : Shigeru OMORI et al

It is certified that error appears in the above-identified patent and that said Letters Patent is hereby corrected as shown below:

On the title page, insert item:

In Section [56], kindly delete "WO 93/02169" and insert -- WO 83/02169 --.

In Column 12, line 4, delete "P" and insert -- R --.

In Column 22, line 24, delete "FIG. 29" and insert -- FIG. 24 --.

In Column 35, line 52, delete "1t" and insert -- 16 --.

Signed and Sealed this

Twenty-fifth Day of May, 1999

Attest:

Q. TODD DICKINSON

*Attesting Officer*    Acting Commissioner of Patents and Trademarks